(12) United States Patent
Stiller et al.

(10) Patent No.: US 11,306,401 B2
(45) Date of Patent: Apr. 19, 2022

(54) METHODS AND APPARATUSES FOR PRODUCTION OF CARBON, CARBIDE ELECTRODES, AND CARBON COMPOSITIONS

(71) Applicant: WEST VIRGINIA UNIVERSITY RESEARCH CORPORATION, Morgantown, WV (US)

(72) Inventors: Alfred H. Stiller, Morgantown, WV (US); Christopher L. Yurchick, Fairmont, WV (US)

(73) Assignee: West Virginia University Research Corporation, Morgantown, WV (US)

( * ) Notice: Subject to any disclaimer, the term of this patent is extended or adjusted under 35 U.S.C. 154(b) by 28 days.

(21) Appl. No.: 15/866,660

(22) Filed: Jan. 10, 2018

(65) Prior Publication Data

US 2018/0195181 A1    Jul. 12, 2018

Related U.S. Application Data

(63) Continuation of application No. 14/886,319, filed on Oct. 19, 2015, now Pat. No. 9,909,222.
(Continued)

(51) Int. Cl.
*C25B 1/00*    (2021.01)
*H01B 1/04*    (2006.01)
(Continued)

(52) U.S. Cl.
CPC ........... *C25B 1/00* (2013.01); *C01B 32/00* (2017.08); *C01B 32/05* (2017.08); *C01B 32/182* (2017.08);
(Continued)

(58) Field of Classification Search
CPC ................ H01M 10/05; H01M 14/00
(Continued)

(56) References Cited

U.S. PATENT DOCUMENTS

| 380,775 A | 4/1888 | Thowless |
| 1,271,713 A | 7/1918 | Hutchins |

(Continued)

FOREIGN PATENT DOCUMENTS

| CN | 1498976 | 5/2004 |
| CN | 1590288 A | 3/2005 |

(Continued)

OTHER PUBLICATIONS

Morris et al., "Galvanic Cell Studies Involving Calcium Carbide Solutions", J. Electrochem. Soc.: Solid-State Science and Technology, Apr. 1973, pp. 570-575.*

(Continued)

*Primary Examiner* — Khanh T Nguyen
(74) *Attorney, Agent, or Firm* — STIP Law Group, LLC

(57) ABSTRACT

An apparatus containing at least one electrochemical cell with an electrode structure. The electrode structure contains at least one carbide chemical compound. The carbide chemical compound may be a salt-like carbide. The electrode may contain at least one electronically conductive element different from the carbide. Carbon compositions of various forms may be formed by the methods and apparatus using the electrode structure. Large pieces of pure carbon may be produced. Post-reaction processing of the carbon may be carried out such as exfoliation.

39 Claims, 71 Drawing Sheets

Related U.S. Application Data

(60) Provisional application No. 62/066,456, filed on Oct. 21, 2014, provisional application No. 62/174,760, filed on Jun. 12, 2015.

(51) Int. Cl.
*C01B 32/00* (2017.01)
*C01B 32/05* (2017.01)
*C01B 32/20* (2017.01)
*C01B 32/182* (2017.01)
*C01B 32/184* (2017.01)
*C01B 32/25* (2017.01)
*C25B 11/043* (2021.01)
*B82Y 40/00* (2011.01)

(52) U.S. Cl.
CPC ............ *C01B 32/184* (2017.08); *C01B 32/20* (2017.08); *C01B 32/25* (2017.08); *C25B 11/043* (2021.01); *H01B 1/04* (2013.01); *B82Y 40/00* (2013.01); *C01B 2204/22* (2013.01)

(58) Field of Classification Search
USPC .............................. 429/220, 231.8; 205/340
See application file for complete search history.

(56) References Cited

U.S. PATENT DOCUMENTS

| | | | |
|---|---|---|---|
| 1,319,148 A | 10/1919 | Freeman | |
| 1,528,824 A | 3/1925 | Hackspill et al. | |
| 1,889,951 A | 12/1932 | Cox | |
| 2,323,597 A | 7/1941 | Hansgirg | |
| 2,382,713 A | 8/1945 | Hansgirg | |
| 2,729,689 A | 1/1956 | Blanchard et al. | |
| 2,739,041 A | 3/1956 | Andersen | |
| 2,760,847 A | 8/1956 | Oblad et al. | |
| 2,813,017 A | 11/1957 | Mathieu | |
| 2,892,762 A | 6/1959 | Stern et al. | |
| 3,031,413 A | 4/1962 | Barber | |
| 3,066,099 A | 11/1962 | Mohun | |
| 3,201,052 A | 8/1965 | Feldmann et al. | |
| 4,105,440 A | 8/1978 | Gentaz et al. | |
| 4,275,050 A | 6/1981 | French et al. | |
| 4,508,666 A | 4/1985 | Pietzarka et al. | |
| 4,738,759 A | 4/1988 | Bienvenu et al. | |
| 4,820,339 A | 4/1989 | Bienvenu et al. | |
| 4,990,403 A | 2/1991 | Ito | |
| 5,384,016 A | 1/1995 | Lin et al. | |
| 5,560,898 A | 10/1996 | Uchida et al. | |
| 5,599,624 A | 2/1997 | Prochazka | |
| 5,680,292 A | 10/1997 | Thompson, Jr. et al. | |
| 5,939,224 A * | 8/1999 | Bito ...................... H01M 10/05 429/220 |
| 5,997,832 A | 12/1999 | Lieber et al. | |
| 6,214,309 B1 | 4/2001 | Shaw et al. | |
| 6,355,377 B1 * | 3/2002 | Sheem ............... C04B 35/62802 429/231.8 |
| 6,451,279 B1 | 9/2002 | Froes et al. | |
| 6,479,028 B1 | 11/2002 | Kaner et al. | |
| 6,514,897 B1 | 2/2003 | Moy et al. | |
| 6,579,833 B1 | 6/2003 | McNallan et al. | |
| 6,670,058 B2 | 12/2003 | Muradov | |
| 6,793,875 B1 | 9/2004 | Shaw et al. | |
| 6,995,115 B2 | 2/2006 | Wang et al. | |
| 7,025,945 B2 | 4/2006 | Nishi et al. | |
| 7,157,167 B1 | 1/2007 | Muradov | |
| 7,744,843 B2 | 6/2010 | Gogotsi | |
| 7,972,725 B2 | 7/2011 | Krause et al. | |
| 8,242,030 B2 | 8/2012 | Hannon et al. | |
| 9,701,539 B2 | 7/2017 | Stiller | |
| 9,764,958 B2 | 9/2017 | Stiller | |
| 10,035,709 B2 | 7/2018 | Stiller | |
| 2001/0047980 A1 | 12/2001 | McNallan et al. | |
| 2002/0151604 A1 | 10/2002 | Detering et al. | |
| 2002/0197200 A1 | 12/2002 | Froes et al. | |
| 2003/0008772 A1 | 1/2003 | Ma et al. | |
| 2004/0028948 A1 | 12/2004 | Nishi | |
| 2005/0058875 A1 | 3/2005 | Jerome | |
| 2005/0063900 A1 | 3/2005 | Wang et al. | |
| 2005/0170181 A1 | 8/2005 | Nishi et al. | |
| 2005/0171370 A1 | 8/2005 | Nishi et al. | |
| 2006/0068125 A1 | 3/2006 | Radhakrishnan | |
| 2006/0140846 A1 | 6/2006 | Leis et al. | |
| 2006/0165584 A1 | 7/2006 | Gogotsi et al. | |
| 2006/0165988 A1 | 7/2006 | Chiang et al. | |
| 2006/0251565 A1 | 11/2006 | Leis et al. | |
| 2008/0159938 A1 | 7/2008 | Mauthner et al. | |
| 2008/0169749 A1 | 7/2008 | Kim et al. | |
| 2008/0210908 A1 | 9/2008 | Zhu et al. | |
| 2008/0219913 A1 | 9/2008 | Gogotsi | |
| 2008/0248310 A1 | 10/2008 | Kim et al. | |
| 2008/0263954 A1 | 10/2008 | Hammel et al. | |
| 2009/0036302 A1 | 2/2009 | Gogotsi et al. | |
| 2009/0117094 A1 | 5/2009 | Leis et al. | |
| 2009/0213529 A1 | 8/2009 | Gogotsi et al. | |
| 2009/0258782 A1 | 10/2009 | Gogotsi | |
| 2009/0301902 A1 | 12/2009 | Gogotsi et al. | |
| 2010/0012576 A1 | 1/2010 | Hoffman et al. | |
| 2010/0233546 A1 | 9/2010 | Nesper et al. | |
| 2011/0033366 A1 | 2/2011 | Wagner | |
| 2011/0123428 A1 | 5/2011 | Liu et al. | |
| 2011/0287174 A1 | 11/2011 | Calabrese Barton et al. | |
| 2011/0290655 A1 | 12/2011 | Nishikiori et al. | |
| 2012/0148473 A1 | 6/2012 | Kramarenko | |
| 2012/0219488 A1 | 8/2012 | Dash | |
| 2012/0241327 A1 | 9/2012 | Suib et al. | |
| 2012/0256121 A1 | 10/2012 | Wolf et al. | |
| 2013/0001094 A1 * | 1/2013 | Cable ................... H01M 14/00 205/340 |
| 2013/0089769 A1 * | 4/2013 | Proctor ................. H01G 11/46 429/127 |
| 2014/0142007 A1 | 5/2014 | Lim et al. | |
| 2014/0271441 A1 | 9/2014 | Stiller | |
| 2014/0311292 A1 | 10/2014 | McCann | |
| 2014/0328749 A1 | 11/2014 | Hammel et al. | |
| 2015/0071847 A1 | 3/2015 | Ishikawa et al. | |
| 2015/0191355 A1 | 7/2015 | Kang et al. | |
| 2015/0210547 A1 | 7/2015 | Kang et al. | |
| 2016/0002049 A1 | 1/2016 | Stiller | |
| 2016/0115600 A1 | 4/2016 | Stiller et al. | |

FOREIGN PATENT DOCUMENTS

| | | | |
|---|---|---|---|
| CN | 101125652 | 2/2008 | |
| CN | 100439238 C | 12/2008 | |
| CN | 102390828 A | 3/2012 | |
| CN | 103436904 A | 12/2013 | |
| CN | 105037988 | 11/2015 | |
| DE | 1667532 | 7/1971 | |
| DE | 259147 A1 | 8/1988 | |
| EP | 1916233 A1 | 4/2008 | |
| FR | 1071197 | 8/1954 | |
| JP | S 52128525 | 4/1976 | |
| JP | 58-501430 | 8/1983 | |
| JP | H-07-048111 | 2/1995 | |
| JP | 11302826 | 11/1999 | |
| JP | 2008-105922 A | 5/2008 | |
| JP | 2008-542184 | 11/2008 | |
| JP | 101746758 A * | 6/2010 | ............ C01B 31/36 |
| JP | 2011-037693 | 2/2011 | |
| JP | 2012-166980 | 9/2012 | |
| KR | 10-1472313 | 12/2014 | |
| RU | 2181795 c2 | 4/2002 | |
| SU | 996324 A1 | 2/1983 | |
| SU | 1175869 A1 | 8/1985 | |
| WO | WO 83/00038 | 1/1993 | |
| WO | WO 2001/016054 | 3/2001 | |
| WO | WO 2002/086180 | 10/2002 | |
| WO | WO 2004/094307 A1 | 4/2004 | |
| WO | WO 2005/030391 | 4/2005 | |
| WO | WO 2006/127017 A2 | 11/2006 | |
| WO | WO 2008/102357 A2 | 8/2008 | |

(56) References Cited

FOREIGN PATENT DOCUMENTS

| WO | WO 2013/086273 | 6/2013 |
|---|---|---|
| WO | WO 2014/019880 A1 | 2/2014 |
| WO | WO 2014/144374 | 9/2014 |

OTHER PUBLICATIONS

Abanades A., et al., "Development of methane decarbonisation based on Liquid Metal Technology for CO2-free production of hydrogen", Int'l J. of Hydrogen Energy, Elsevier Sci. Publishers B.V., Barking GB, vol. 41(19) Dec. 23, 2015, pp. 8159-8167.
Abbas et al., "Hydrogen production by methane decomposition: A review", I nt'l Journal of Hydrogen Energy, 3 5 (2010) 1160-1190.
Aiello et al., "Hydrogen production via the direct cracking of methane over Ni/SiO2", Applied Catalysis A: General, vol. 192 (2000) pp. 227-234.
Chen et al., "Highly active and durable nanostructured molybdenum carbide electrocatalysts for hydrogen production", Energy Environ. Sci. 2013, 6, pp. 943-951.
Chen et al., "In Situ Synthesized Al4C3 Nanorods with Excellent Strengthening Effect in Aluminum Matrix Composites", Adv. Eng. Mat., 2014, vol. 16, No. 8, pp. 972-975.
De Oliveira et al., "Metal Matrix Composites Added of Nanostructured Tantalum Carbide", Sintering Techniques of Materials, 2015, Chapter 6, p. 107 (InTech).
Dimovski et al.; Synthesis of Graphite by Chlorination of Iron Carbide at Moderate Temperatures; J. Mater. Chem.; 14, 238-243 (2004).
El-Naas et al., "Solid Phase Synthesis of Calcium Carbide in a Plasma Reactor", Plasma Chemistry and Plasma Processing, 18, 3 (1998).
Fan et al. (Eds.) Silicon Carbide Nanostructures, Fabrication, Structure, and Properties, Springer International Publishing Switzerland, (2014).
Gulevich et al., "Technologies for hydrogen production based on direct contact of gaseous hydrocarbons and evaporated water with molten Pb or PB—Bi", Energy Conversion and Management, Elxwevier Sci. Pub. Oxford, GB, vol. 49 (7), Jul. 1, 2008, pp. 1946-1950.
He et al., "Fabrication of aluminum carbide nanowires by a nano-template reaction", Carbon, 48, (2010), pp. 931-938.
Kosolapova, Carbides, Properties, Production, and Applications, Plenum Press, 1971.
Nishi et al., "Formation and magnetic characteristics of cobalt—carbon nanocluster magnets embedded in amorphous carbon matrices", Chem. Phys. Letters, 369, 1-2, 198-203 (2003).
Nuernberg et al., "Methane conversion to hydrogen and nanotubes on Pt/Ni catalysts supported over spinel MgAl2O4", Catalysis Today, vol. 176, Issue 1, Nov. 1, 2011, pp. 465-469.
Odegard et al.; On the Solubility of Aluminum Carbide and Electrodeposition of Carbon in Cryolitic Melts; J. Electrochem. Soc. 1088-1092; May 1987.
Presser [Gogotsi] et al., "Carbide-Derived Carbons-from Porous Networks to Nanotubes and Graphene", Adv. Functional Mater., 21, 810-833, (2011).
S. Reynaud, "Fabrication and characterization of carbon and boron carbide nanostructured materials", PhD thesis, Rutgers Univ., 2010.
Rodygin et al., Calcium Carbide: A Unique Reagent for Organic Synthesis and Nanotechnology, Chem. Asian J., 2016, 11, 7, 965-976.
Schmuecker et al., "Formation Mechanism of Nanostructured Metal Carbides via Salt-Flux Synthesis", Inorganic Chemistry, 2015, 54(8), pp. 3889-3895.
Schnepp et al., Synthesis of Highly Magnetic Iron Carbide Nanoparticles via a Biopolymer Route, Chem. Mater. vol. 22(8), pp. 5340-5344 (2010).
Serban et al., "Hydrogen Production by Direct Contact Pyrolysis of Natural Gas", Fuel Chemistry Division Preprints 20 02, 47(2), 746.

Streletskii et aL,"Mechanochemical Actuvatuib of Aluminum. 4. Kinetics of Mechanochemical Synthesis of Aluminum Carbide", Colloid Journal, 2006, vol. 68, No. 4, pp. 470-480.
Sun et al., "Field nanoemitter: One-dimension Al4C3 ceramics", Nanoscale, 2011, 3, 2978-2982.
Sun et al., "Carbon-in-Al4C3 Nanowire Superstructures for Field Emitters", ACSNano, 2011, vol. 5, No. 2, 932-941.
Sun et al., "Synthesis of Al4C3 nanowalls via thermal evaporation and potential application in vacuum microelectronic devices as cold electron emitters", Cryst. Eng. Comm., 2012, 14, 7951-7957.
Vorozhtsov et al., "Synthesis, Structure, and Phase Composition of AL-Al4C3 Nanostructured Materials", Russian J. of Non-Ferrous Metals, 2012, 53, 5, pp. 420-424.
Yushin et al., "Carbide Derived Carbon" in Nanomaterials Handbook, CRC Press, Jan. 26, 2006; Chpt 8.
Zhang et al., "Lithium-Assisted Self Assembly of Aluminum Carbide Nanowires and Nanoribbons" Nano Letters, (2002), vol. 2(2), pp. 105-108.
Ke Wang, "The preparation of hydrogen over molten metal and the synthesis of methyl 3, 3-dimethylpropionate over homogeneous catalyst", thesis, Hunan University (2009)—in Chinese with English abstract.
Zhou et al., Unsupported nickel catalysts for methane catalytic decomposition, AIChE Journal, vol. 60(8), Aug. 2014, pp. 2907-2917 (Abstract only).
Davenport, "Harry Kroto's last words on carbine", vol. 94, issue 20, pp. 8-10 (2016).
Khanna R., et al, "Formation of carbyne-like materials during low temperature pyrolysis of lignocellulosic biomass: A natural resource of linear sp carbons", Scientific Reports, 7, 1, (2017).
Davenport, "Contention Over Carbyne", vol. 93, issue 46, pp. 30-31(2015).
Bitao Pan et al, "Carbyne with finite length: The one-dimensional sp carbon", Science Advances.
Casari, et al, "Carbyne: from the elusive allotrope to stable carbón atom wires", Department of Energy, Politecnico di Milano via Ponzio (2018).
Povov, A., Molecular Nanostructures, Carbon hybridization and allotropes.
Leduc et al., "Chemical and Electrochemical Oxidation of Aqueous Solutions of NADH and Model Compounds," Bioelectrochemistry and Bioenergetics, 1, 96-107 (1974).
Kikuti et al., "Chemical and Electrochemical Coloration of Stainless Steel and Pitting Corrosion Resistance Studies," J. Braz. Chem. Soc., vol. 15, No. 4, Jul./Aug. 2004.
Lunak et al. "One Electron vs. Two Electron Electrochemical and Chemical Oxidation of Electron-Donor Substituted Diketo-pyrrolo-pyrroles," Electrochemica Acta, 106, Sep. 1, 2013, 351-359. (Abstract only).
Zabik et al. "Selective Electrochemical versus Chemical Oxidation of Bulky Phenol," J. Phys. Chem. B, 2016, 120 (34), 8914-8924. (Abstract Only).
Inzelt (Ed.), "Chemical and Electrochemical Syntheses of Conducting Polymers," Conducting Polymers, Chapter 4, pp. 123-135, Springer 2008.
Anonoymous: "Calciumcarbid", Oct. 31, 2014 (Oct. 31, 2014), XP055475945,Retrieved from the Internet: URL:https://de.wikipedia.org/w/index.php?title=Calciumcarbid&oldid=133583939 [retrieved on May 16, 2018].
Anonymous: "Carbide", Oct. 12, 2014 (Oct. 12, 2014), XP055475952, Retrieved from the Internet: URL:https://en.wikipedia.org/w/index.php? title=Carbide&oldid=629275255 [retrieved on May 16, 2018].
Database WPI, Thormpson Scientific, London, GB, AN May 26, 2004, pp. 605110.
International Search Report and Written Opinion received in connection with International Application No. PCT/US2017/028405; dated Dec. 8, 2017.
Supplemental European Search Report Received in connnection with European Application EP 14764834.9 (dated May 12, 2017)—Replaces ESR of Nov. 16, 2016.
Search Report received in connection with Singapore Application No. 11201703092Q; dated Jul. 5, 2018.

(56) References Cited

OTHER PUBLICATIONS

Atkins, Elements of Physical Chemistry, 5$^{th}$ Ed. (2009) NIST webbook (Table of Contents only).

Banhart, "Chains of carbon atoms: A vision or a new nanomaterial?", Beilstein J. of nanotechnology, vol. 6, (2015) pp. 559-569.

Bonaccorso et al., "Production and processing of graphene and 2d crystals", Materials Today, vol. 15(12), (2012) pp. 564-589.

Chen, Electrodeposition of Diamond-Like Carbon Films, Thesis, 2002, Univ. N. Texas.

Cherkasov et al., "Bomb calorimetry as a bulk characterization tool for carbon nanostructures", Carbon, vol. 63, pp. 324-329 (2013).

Chu et al., "Characterization of amorphous and nanocrystalline carbon films", Materials Chemistry and Physics, 96 (2006) pp. 253-277.

Cotton & Wilkinson, Ed., Advanced Inorganic Chemistry, 4th ed., 1980, pp. 361-363.

Gogotsi et al., "Formation of sp$^3$-bonded carbon upon hydrothermal treatment of SiC", Diamond and Related Materials, vol. 5 (1996), pp. 151-162.

Kraft et al., "Carbon formed by hydrothermal treatment of α-SiC crystals",J. Mater. Chem., vol. 10, (2000) pp. 671-680.

Kulak et al., "Eiectrodeposition of Nanostructured Diamond-like Films by Oxidation of Lithium Acetylide", Electrochemistry Communications, vol. 5, Issue 4, Apr. 2003, pp. 301-305.

Presser, "Oxidation and Wet Wear of Silicon Carbide", PhD dissertation, Universität Tübingen, (2009).

Wu et al.,"The effects of electrolyte on the supercapacitive performance of activated calcium carbide-derived carbon", Journal of Power Sources, vol. 226 (2013), pp. 202-209.

Yolshina et l., "A novel electrochemical method for the synthesis of boron doped graphene in the molten salt electrolyte", Synthetic Metals, 205 (2015): 85-91.

International Searching Authority (ISA/US), International Application No. PCT/US14/028755, PCT International Search Report, dated Sep. 19, 2014, p. 1-3.

International Preliminary Report on Patentability received in connection with International Application No. PCT/US2014/028755 dated Sep. 15, 2015.

Invitation to pay additional fees and partial search report received in connection with international application No. PCT/US2015/056175; dated Feb. 12, 2016.

Osetzky, "Macrocrystalline Graphite From Magnesium Carbide", Carbon, vol. 12, pp. 517-523, (1974).

Fedorov et al., "Mesoporous carbon Adsorbents from Calcium Carbide", J. Appl. Chem. USSR, 54, 2253-2255, (1982).

Federov et al, "Theoretical Foundations of Carbide-Thermal Technology for Production of Activated Carbon and Sorption-Active Materials", Russ J. Appl. Chem., vol. 71, 584-588, (1998).

Federov et al., "Production, Pore Structure, Adsorption Properties, and Fields of Application of Composite Sorbents from Calcium Carbide", Russ. J. Appl. Chem., vol. 71, 795-798, (1998).

Ivakhnyuk, Z. Prikladnoi Khimii, 60, 852-856, 1987.

Ivakhnyuk, Z. Prikladnoi Khimii, 60, 1413-1415, 1987.

Samonin, Z. Prikladnoi Khimii, 60, 2357-2358, 1987.

International Search Report and Written Opinion received in connection with, International Application No. PCT/US2015/056175, dated May 30, 2016.

Anonymous: "Graphit—Wikipedia", Jul. 15, 2014 (Jul. 15, 2014), XP055273296, Retrieved from the Internet: URL:https://de.wikipedia.org/w/index.php?title=Graphit&oldid=132168437 [retrieved on May 18, 2016].

Anonymous: "Graphene—Wikipedia, the free encyclopedia", Aug. 17, 2014 (Aug. 17, 2014), XP055273317, Retrieved from the Internet: URL:https://en.wikipedia.org/w/index.phptitle=Graphene&oldid=621692371 [retrieved on May 18, 2016].

Anonymous: "Diamond—Wikipedia, the free encyclopedia", Aug. 5, 2014 (Aug. 5, 2014), XP055273274, Retrieved from the Internet: URL:https://en.wikipedia.org/w/index.phptitle=Diamond&oldid=620007262 [retrieved on May 18, 2016].

Bae et al: "Roll-to-roll production of 30-inch graphene films for transparent electrodes", Nature Nanotechnology, val. 5, No. 8, Aug. 1, 2010 (Aug. 1, 2010), pp. 574-578, XP055049935, ISSN: 1748-3387, DOI: 10.1038/nnano.2010.132.

Camargo et al., "Carbide-Derived Carbon by Electrochemical Etching of Vanadium Carbides", J. Electrochem. Soc.., 2015, 162, 10, H811-H815.

Carbon Nanomaterials, 2nd Ed., CRC Press, 2014, Chapter 11, "Carbide-Derived Carbon," (Y. Korenblit et al.), pp. 303-329.

Dai et al., "Synthesis of nanostructured carbon by chlorination of calcium carbide at moderate temperatures and its performance evaluation", Mat. Chem. Phys., 112, 2, 2008, pp. 461-465.

Gogotsi, (Ed.), Carbon Nanomaterials, 2006, Chapter 6, "Carbide-Derived Carbon," (G. Yushin et al.), pp. 211-254.

Gogotsi et al., "Nanoporous Carbide Derived Carbon with Tunable Pore Size", Nature Materials, vol. 2 (9), 2003, 591-594 (Retrieved from http://repository.upenn.edu/mse_papers/60).

Han et al., "Preparation of Carbon Nano-Onions and Their Applicatio as Anode Materials for Rechargeable Lithium-Ion Batteries", J. Phys. Chem. C2011, 115, pp. 8923-8927.

Kawamura et al, "Electrodeposition of cohesive carbon films on aluminum in a LiCl—KCl—K2CO3 melt", J. Appl. Electrochem., 30: 571 (2000).

Lukatskaya et al., Room-Temperature Carbide-Derived Carbon Synthesis by Electrochemical Etching of MAX Phases, Angew. Chem. Int. Ed. Engl. , vol. 53, 19, pp. 4887-4880 (2014).

Morishita et al, "Carbon-coated tungsten and molybdenum carbides for electrode of electrochemical capacitor",Electrochemica Acta, 52, 7, Feb. 1, 2007, 2478.

Pang et al. , "Synthesis of Carbon Spheres via a Low-Temperature Metathesis Reaction", J. Phys. Chem. C, 2008, 112, 12134-12137.

Pillai et al., "Solid-State Synthesis of Calcium Carbide by Using 2.45 GHz Microwave Reactor", Ind. Eng. Chem. Res. 2015, 54(44) 11001-11010, 2015.

Xie et al., "Preparation of high purity carbon nanospheres by the chemical reaction of calcium carbide and oxalic acid", Carbon, 2009, 47, 2292-2295.

Xie et al., "Chemical reactions between calcium carbide and chlorohydrocarbon used for the synthesis of carbon spheres containing well-ordered graphite", Carbon 2010, 48, 2023-2029.

Xie et al., "Low temperature synthesis of high quality carbon nanospheres through the chemical reactions between calcium carbide and oxalic acid", Mater. Chem. Phys., 2010, 124, 482-487.

Zheng et al., "The preparation and performance of calcium carbide-derived carbon/polyaniline composite electrode material for supercapacitors", J. Power Sources, 195, 6, Mar. 5, 2010, 1747.

Senthilnathan et al., "Synthesis of carbon films by electrochemical etching of SiC with hydrofluoric acid in nonaqueous solvents", Carbon, 71 (2014) pp. 181-189.

Morris et al., "Galvanic Cell Studies Involving Calcium Carbide Solutions", J. Electrochem. Soc., 1973, 120, 4, 570-575.

Boehm et al., "Structural Parameters and Molecular Sieve Properties of Carbons Prepared from Metal Carbides", Proc. 12th Biennial Conf. on Carbon, 149-150, Pergamon, Oxford, 1975.

Yang et al, "Nanostructured tungsten carbide catalysts for polymer electrolyte fuel cells", Applied Physics Letters, vol. 86, 224104 (2005).

\* cited by examiner

METHODS AND APPARATUSES FOR PRODUCTION OF CARBON, CARBIDE ELECTRODES, AND CARBON COMPOSITIONS

RELATED APPLICATIONS

This application claims priority to U.S. provisional application Ser. No. 62/066,456 filed Oct. 21, 2014 and Ser. No. 62/174,760 filed Jun. 12, 2015, which are each hereby incorporated by reference in their entireties.

BACKGROUND

Carbon is a commercially essential element which in elemental form is a material both found in nature (e.g., coal) and is also made from industrial processes. Methods of making carbon are essential to traditional and advanced technology industries. Elemental carbon can be found in various forms and allotropes including, for example, amorphous carbon, crystalline carbon, carbon black, graphite, and diamond. Other forms of carbon include, for example, glassy carbon, diamond like carbon, carbene, and carbyne. Nature also provides different forms of coal which is largely carbon. Carbon powder and carbon fibers are other forms of carbon essential to industry.

Nanoscale forms of carbon are also known including fullerenes (including $C_{60}$ and $C_{70}$ fullerenes), carbon nanotubes (both single walled and multi-walled), graphene (single layered or multi-layered), and aerogels. Diamond can be made synthetically by high pressure/high temperature routes or by physical or chemical vapor deposition routes. Vapor deposition can produce microcrystalline or nanocrystalline diamond in thin film form. Nanoscale forms of carbon represent a critical aspect of newer and better devices ranging from the next generation of miniaturized transistors to more efficient batteries. Large area forms of nanoscale forms of carbon such as thin diamond films and graphene are also critical.

In general, carbon production is associated with arduous process conditions such as high temperature, high pressure, vacuum, and/or high energy sources like plasma. Such conditions generate expense and are energy-intensive. They also generally lack versatility (e.g., inability for a single process to be altered to produce different allotropes of carbon, or different size scales of carbon).

For example, DE 1667532 Greiner (1971) describes what is said to be low temperature diamond production from an electrochemical system which can include use of carbide in the electrolyte with use of temperatures of 600° C. to 1000° C. However, no data are provided.

Also, U.S. Pat. No. 4,738,759 (1988) describes an electrolysis process wherein calcium carbide can be subjected to electrolysis to form graphite sponge at the anode. Temperatures are used such as 700° C. to 1,000° C.

A Chen M. S. thesis, August 2002, Univ. N. Texas, describes electrochemical deposition of films of amorphous carbon and diamond like carbon (DLC). Electrochemical deposition was carried out using a low temperature (less than −40° C.) solution of acetylene in liquid ammonia.

Kulak, *Electrochem. Comm.*, 5, 2003, 301-305 describes room temperature electrodeposition of very thin, porous film containing carbon (50-100 nm thick) from a solution of lithium acetylide. However, the microscopic images of the film indicate a low quality material (FIG. 2) and much of the film is not carbon apparently.

US 2011/0290655 (Nishikiori; Toyota) describes a method for electrochemically depositing carbon film on an anode substrate using a molten salt electrolyte bath comprising a carbide ion and applying a DC voltage to deposit the carbon film. The bath temperature is 250° C. to 800° C. The carbon film is said to be mainly amorphous carbon including graphite-like carbon according to x-ray diffraction.

Despite such advances, a need exists for better, commercially friendly, and environmentally friendly approaches to elemental carbon material production. This includes elemental carbon material that has high elemental purity and also a commercially useful structure and morphology. One also wants to be able to control the form and morphology of the elemental carbon material. Inexpensive methods are also needed.

SUMMARY

Embodiments and aspects described and claimed herein include, for example, methods of making, apparatuses for carrying out methods of making, components used in the apparatuses for method of making, methods of using, and compositions produced by the methods of making. Devices and derivative compositions which comprise compositions of elemental carbon materials are also described and claimed herein.

For example, a first aspect is a method comprising providing at least one solid carbide chemical compound and reducing a metal cation with use of the solid carbide chemical compound.

In one embodiment, the carbide chemical compound has an electronic conductivity of at least $10^{-8}$ S/cm. In one embodiment, the carbide chemical compound is a salt-like carbide. In another embodiment, the carbide chemical compound is calcium carbide or aluminum carbide.

In another embodiment, elemental carbon material is formed. In another embodiment, elemental carbon material is formed which is more than 50% sp2 carbon. In another embodiment, elemental carbon material is formed which is more than 50% sp3 carbon. In another embodiment, elemental carbon material is formed which is more than 90% carbon.

In another embodiment, the reducing is carried out at a temperature of about 15° C. to about 50° C. In another embodiment, the reducing is carried out at a pressure of about 720 torr to about 800 torr. In another embodiment, the reducing is carried out at a temperature of about 15° C. to about 50° C. and at a pressure of about 720 torr to about 800 torr.

In another embodiment, the cation is a zinc, tin, iron, copper, or silver cation. In another embodiment, the cation is a zinc or tin cation.

In another embodiment, the reducing is carried out in an electrochemical cell with a cathode compartment comprising the metal cation and an anode compartment comprising the solid carbide chemical compound.

In another embodiment, the reducing is carried out in a galvanic cell with a cathode compartment comprising the metal cation and an anode compartment comprising the solid carbide chemical compound. In another embodiment, the reducing is carried out in a galvanic cell with a cathode compartment comprising the metal cation and an anode compartment comprising the solid carbide chemical compound, and the galvanic cell further comprises at least one external voltage source.

In another embodiment, the reducing is carried out in a galvanic cell with a cathode compartment comprising the metal cation and an anode compartment comprising the solid carbide chemical compound, and the galvanic cell does not comprise at least one external voltage source.

In another embodiment, the reducing is carried out without contact between the metal cation and the solid carbide chemical compound. In another embodiment, the reducing is carried out with contact between the metal cation and the solid carbide chemical compound. In another embodiment, the reducing is carried out with contact between the metal cation and the solid carbide chemical compound, and the metal cation is dissolved in at least one organic solvent.

In addition, a second aspect provides for a method comprising: producing elemental carbon material from the oxidation of carbide in at least one carbide chemical compound in at least one anode of an electrochemical cell apparatus. More particularly, a method is providing comprising: producing elemental carbon material from the oxidation of carbide in at least one carbide chemical compound in at least one anode of a galvanic cell apparatus In one embodiment, the electrochemical cell apparatus is a galvanic cell apparatus or an electrolytic cell apparatus. In another embodiment, the electrochemical cell apparatus is a galvanic cell apparatus.

In another embodiment, the carbide chemical compound is a salt-like carbide or an intermediate transition metal carbide. In another embodiment, the carbide chemical compound is a salt-like carbide. In another embodiment, the carbide chemical compound is a methanide, an acetylide, or a sesquicarbide. In another embodiment, the carbide chemical compound is calcium carbide, aluminum carbide, sodium carbide, magnesium carbide, lithium carbide, beryllium carbide, iron carbide, copper carbide, and chromium carbide. In another embodiment, the carbide chemical compound is calcium carbide or aluminum carbide. In another embodiment, the carbide chemical compound has sufficient electronic conductivity to function as an anode. In another embodiment, the carbide chemical compound has an electronic conductivity of at least $10^{-8}$ S/cm.

In another embodiment, the electrochemical cell apparatus further comprises at least one cathode. In another embodiment, the electrochemical cell apparatus further comprises at least one cathode which is a metal cathode. In another embodiment, the electrochemical cell apparatus further comprises at least one metal cathode, wherein the cathode is a zinc, tin, iron, copper, or silver cathode. In another embodiment, the electrochemical cell apparatus further comprises at least one metal cathode, wherein the cathode is a zinc or tin cathode.

In another embodiment, the electrochemical cell apparatus anode is contacted with at least one first solution comprising at least one solvent and at least one salt and a galvanic cell apparatus cathode is also contacted with at least one solution comprising at least one solvent and at least one salt.

In another embodiment, the electrochemical cell apparatus further comprises at least one salt bridge. In another embodiment, the electrochemical cell apparatus further comprises at least one ion exchange membrane.

In another embodiment, the reaction temperature for producing the elemental carbon material is about 10° C. to about 90° C. In another embodiment, the reaction temperature for producing the elemental carbon material is about 15° C. to about 50° C. In another embodiment, the reaction temperature for producing the elemental carbon material is about room temperature. In another embodiment, the reaction pressure for producing the elemental carbon material is about 0.1 torr to about 5 atmospheres. In another embodiment, the reaction pressure for producing the elemental carbon material is about 720 torr to about 800 torr. In another embodiment, the elemental carbon material is produced at about normal pressure.

In another embodiment, the production of elemental carbon material is carried out without use of an external voltage source. In another embodiment, the electrochemical cell apparatus comprises an external voltage source to regulate the oxidation reaction. In another embodiment, the production of carbon is carried out with use of an external voltage source to regulate the oxidation reaction. In another embodiment, the production of carbon is carried out with use of an external voltage source to regulate the oxidation reaction, and an external voltage is used at a particular voltage to enhance production of one elemental carbon material product over other different elemental carbon products.

In another embodiment, the elemental carbon material is more than 50% sp2 carbon. In another embodiment, the elemental carbon material is more than 50% sp3 carbon. In another embodiment, the elemental carbon material is more than 90% carbon.

In another embodiment, the elemental carbon material comprises two-dimensional plate-like structures. In another embodiment, the elemental carbon material comprises two-dimensional plate-like structures stacked on top of one another. In another embodiment, the elemental carbon material comprises at least some three-dimensional structures. In another embodiment, the elemental carbon material comprises at least some pieces which have a lateral dimension of at least one mm.

In another embodiment, the elemental carbon material is subjected to at least one purification step. In another embodiment, the elemental carbon material is treated with acid and water. In another embodiment, the elemental carbon material is subjected to at least one step which produces particles of the elemental carbon material. In another embodiment, the elemental carbon material is subjected to at least one exfoliation step to produce graphene.

In another embodiment, the electrochemical cell apparatus is a galvanic cell apparatus which produces electrical power to power at least one load which is another electrochemical cell.

In another embodiment, the electrochemical cell apparatus is a galvanic cell apparatus, the carbide chemical compound is calcium carbide or aluminum carbide, wherein the galvanic cell apparatus anode is contacted with a solution comprising at least one organic solvent and at least one dissolved salt, and the galvanic cell apparatus cathode is also contacted with a solution comprising at least one organic solvent and at least one dissolved salt, and wherein the elemental carbon material is produced at about 15° C. to about 50° C. and about 720 torr to about 800 torr.

Another aspect provides for an apparatus comprising at least one electrochemical cell apparatus comprising: at least one anode comprising at least one carbide chemical compound, and at least one cathode. More particularly, an apparatus is provided comprising at least one galvanic cell apparatus comprising: at least one anode comprising at least one carbide chemical compound, and at least one cathode. In one embodiment, the electrochemical cell apparatus is a galvanic cell apparatus or an electrolytic cell apparatus. In another embodiment, the electrochemical cell apparatus is a galvanic cell apparatus.

In another embodiment, the carbide chemical compound is a salt-like carbide or an intermediate transition metal carbide. In another embodiment, the carbide chemical compound is a salt-like carbide. In another embodiment, the carbide chemical compound is calcium carbide or aluminum carbide. In another embodiment, the carbide chemical compound has sufficient electronic conductivity to function as an anode. In another embodiment, the carbide chemical compound has an electronic conductivity of at least $10^{-8}$ S/cm. In another embodiment, the carbide chemical compound is in the form of individual pieces or particles. In another embodiment, the carbide chemical compound is in the form of individual pieces or particles having a size of less than one cm. In another embodiment, the carbide chemical compound contacts at least one electrically conductive material. In another embodiment, the carbide chemical compound is held in an electrically conductive container.

In another embodiment, the electrochemical cell apparatus anode is contacted with a solution comprising at least one organic solvent and at least one dissolved salt. In another embodiment, the electrochemical cell apparatus cathode is contacted with a solution comprising at least one organic solvent and at least one dissolved salt. In another embodiment, the electrochemical cell apparatus cathode is a metal cathode. In another embodiment, the electrochemical cell apparatus comprises at least one salt bridge or at least one ion exchange membrane. In another embodiment, the electrochemical cell apparatus comprises an external voltage source to regulate an oxidation reaction of carbide in the carbide chemical compound. In another embodiment, the apparatus further comprises at least one solution comprising at least one solvent and at least one dissolved salt, and the solution is free of dissolved carbide chemical compound.

In another embodiment, an electrochemical cell apparatus is provided for carrying out the methods described herein. In particular, a galvanic cell apparatus is provided for carrying out the methods described herein.

In another embodiment, the anode is an anode electrode structure comprising at least one carbide chemical compound, wherein optionally the carbide chemical compound is a salt-like carbide; and at least one electronically conductive structural element different from the carbide chemical compound and contacting the at least one carbide chemical compound.

Still further, another aspect provides for an electrode structure comprising at least one carbide chemical compound, wherein optionally the carbide chemical compound is a salt-like carbide; and at least one electronically conductive structural element different from the carbide chemical compound and contacting the at least one carbide chemical compound. The electrode structure can be a solid electrode structure; also, the electrode structure can be adapted to function as an anode.

In one embodiment, the carbide chemical compound is methanide, acetylide, or sesquicarbide. In another embodiment, the carbide chemical compound is calcium carbide, aluminum carbide, sodium carbide, magnesium carbide, lithium carbide, or beryllium carbide. In another embodiment, the carbide chemical compound is calcium carbide or aluminum carbide. In another embodiment, the carbide chemical compound has sufficient electronic conductivity to function as an anode. In another embodiment, the carbide chemical compound has an electronic conductivity of at least $10^{-8}$ S/cm. In another embodiment, the carbide chemical compound is in the form of individual pieces or particles. In another embodiment, the carbide chemical compound is in the form of individual pieces or particles having a size of less than one cm. In another embodiment, the carbide chemical compound is in the form of individual pieces or particles having a size of at least one micron. In another embodiment, the carbide chemical compound is divided into separate portions which are each contacted with at least one electrically conductive structural element. In another embodiment, the carbide chemical compound is at least about 95% pure.

In another embodiment, the electronically conductive structural element is a binder for the carbide chemical compound. In another embodiment, the electronically conductive structural element is a container and the carbide chemical compound is held in the container. In another embodiment, the electronically conductive structural element is a container and the carbide chemical compound is held in the container, and the container has openings which allow fluid to enter the container and contact the carbide chemical compound. In another embodiment, the electronically conductive structural element is a metallic container and the carbide chemical compound is held in the metallic container. In another embodiment, the electronically conductive structural element comprises at least one conductive rod. In another embodiment, the electrode structure is adapted to be removably attached to an apparatus. In another embodiment, the electronically conductive structural element of the electrode structure comprises at least one current collector. In another embodiment, the electrode structure is adapted for use as an anode in an electrochemical cell apparatus for production of an elemental carbon material. In another embodiment, the electrode structure is adapted for use as an anode in a galvanic cell apparatus for production of elemental carbon material.

Another aspect provides for a method comprising operating at least one anode in an electrochemical cell, wherein the anode comprises at least carbide chemical compound.

In one embodiment, the anode consists essentially of at least one carbide chemical compound. In another embodiment, the anode consists of at least one carbide chemical compound. In another embodiment, the anode is part of an anode structure which further comprises at least one electronically conductive structural element different from the carbide chemical compound and contacting the at least one carbide chemical compound. In another embodiment, the anode is part of an anode structure which further comprises at least one metallic structural element different from the carbide chemical compound and contacting the at least one carbide chemical compound. In another embodiment, the carbide chemical compound has sufficient electronic conductivity to function as an anode. In another embodiment, the carbide chemical compound has an electronic conductivity of at least $10^{-8}$ S/cm. In another embodiment, the carbide chemical compound is a salt-like carbide. In another embodiment, the carbide chemical compound is calcium carbide or aluminum carbide. In another embodiment, the electrochemical cell is a galvanic cell.

Another aspect is for a method comprising: producing elemental carbon material from the oxidation of carbide in at least one carbide chemical compound which is in contact with a solution comprising at least one organic solvent and at least one dissolved salt comprising at least one metal cation which is reduced.

In one embodiment, the reaction temperature for producing the elemental carbon material is about 10° C. to about 90° C. In another embodiment, the reaction temperature for producing the elemental carbon material is about 15° C. to about 50° C. In another embodiment, the reaction temperature for producing the elemental carbon material is about room temperature. In another embodiment, the reaction pressure for producing the elemental carbon material is about 0.1 torr to about 5 atmospheres. In another embodiment, the reaction pressure for producing the elemental carbon material is about 720 torr to about 800 torr.

In another embodiment, the carbide chemical compound is a salt-like carbide or an intermediate transition metal carbide. In another embodiment, the carbide chemical compound is a salt-like carbide. In another embodiment, the carbide chemical compound is a methanide, an acetylide, or a sesquicarbide. In another embodiment, the carbide chemical compound is calcium carbide or aluminum carbide.

Another aspect provides for an elemental carbon material composition (i) prepared by the methods described and/or claimed herein; and/or (ii) characterized as described and/or claimed herein. The elemental carbon material can be in an unpurified form, a partially purified form, a purified form, a processed form, a doped form, and/or a reacted form.

In one embodiment, the elemental carbon material is more than 50% sp2 carbon. In another embodiment, the elemental carbon material is more than 50% sp3 carbon. In another embodiment, the elemental carbon material is more than 90% carbon.

In another embodiment, the elemental carbon material comprises two-dimensional plate-like structures. In another embodiment, the elemental carbon material comprises two-dimensional plate-like structures stacked on top of one another. In another embodiment, the elemental carbon material comprises graphene structures. In another embodiment, the elemental carbon material comprises graphite structures. In another embodiment, wherein the elemental carbon material comprises three-dimensional structures. In another embodiment, the elemental carbon material comprises diamond. In another embodiment, the elemental carbon material comprises diamond structures and/or diamond-like structures. In another embodiment, the elemental carbon material comprises at least one piece which has a lateral dimension of at least one mm, at least one cm. In another embodiment, the elemental carbon material comprises at least one piece which has a volume of at least one cubic mm, or at least one cubic cm.

Also provided herein are one or more composition comprising the elemental carbon material compositions described herein. For example, the elemental carbon material can be mixed with one or more different ingredients.

Also provided herein are one or more devices, apparatuses, or systems comprising the compositions described herein such as, for example, a battery device, an electronic device, or a filtration device. Other embodiments include making and using such devices, apparatuses, and systems.

At least some advantages for at least some embodiments described and/or claimed herein include, for example, (i) an ambient temperature and/or a normal pressure reaction process to form high purity elemental carbon materials of very high carbon content; (ii) cost-effectiveness; (iii) environmental friendliness; and/or (iv) ability to control the nature of the elemental carbon material product in versatile ways.

More particularly, one of the most important advantages for at least some of the embodiments is the ability to produce an array of different elemental carbon material reaction products in different forms. Therefore, the technology can yield numerous processes with many value added end products. Also, because of the physical states when the reaction occurs (the liquid state and solid state), one can enable the production of the various allotropes of elemental carbon material at a higher quality level than any of the competing elemental carbon production technologies.

Another major advantage for at least some embodiments is scalability. For example, the electrochemical and galvanic reaction mechanism for oxidizing carbides to various allotropes and forms of elemental carbon materials is very scalable, meaning that the technology can be increased in size without any major re-designs. Typically, the main obstacles with increasing the scale of a process are physical limitations of the equipment at extreme conditions and gradients (e.g., temperature, concentration, etc.) within larger equipment as the scale increases. However, in most embodiments presently described and claimed, there are no extreme conditions in these processes. For example, preferably, the process is operated at or near room temperature and atmospheric pressure so there is little concern about the limitations of the equipment at extreme conditions as size is increased. Still other advantages are described and evident in this application.

BRIEF DESCRIPTION OF THE FIGURES

The figures provide more description for representative embodiments including many working examples.

DETAILED DESCRIPTION

I. Introduction

The various aspects and claims summarized above and claimed below are described in more detail hereinafter including with use of working examples.

References cited herein are incorporated by reference.

Priority U.S. provisional application Ser. No. 62/066,456 filed Oct. 21, 2014 and Ser. No. 62/174,760 filed Jun. 12, 2015 are each hereby incorporated by reference in their entireties including their summaries, detailed descriptions, working examples, and figures.

Figure 6:
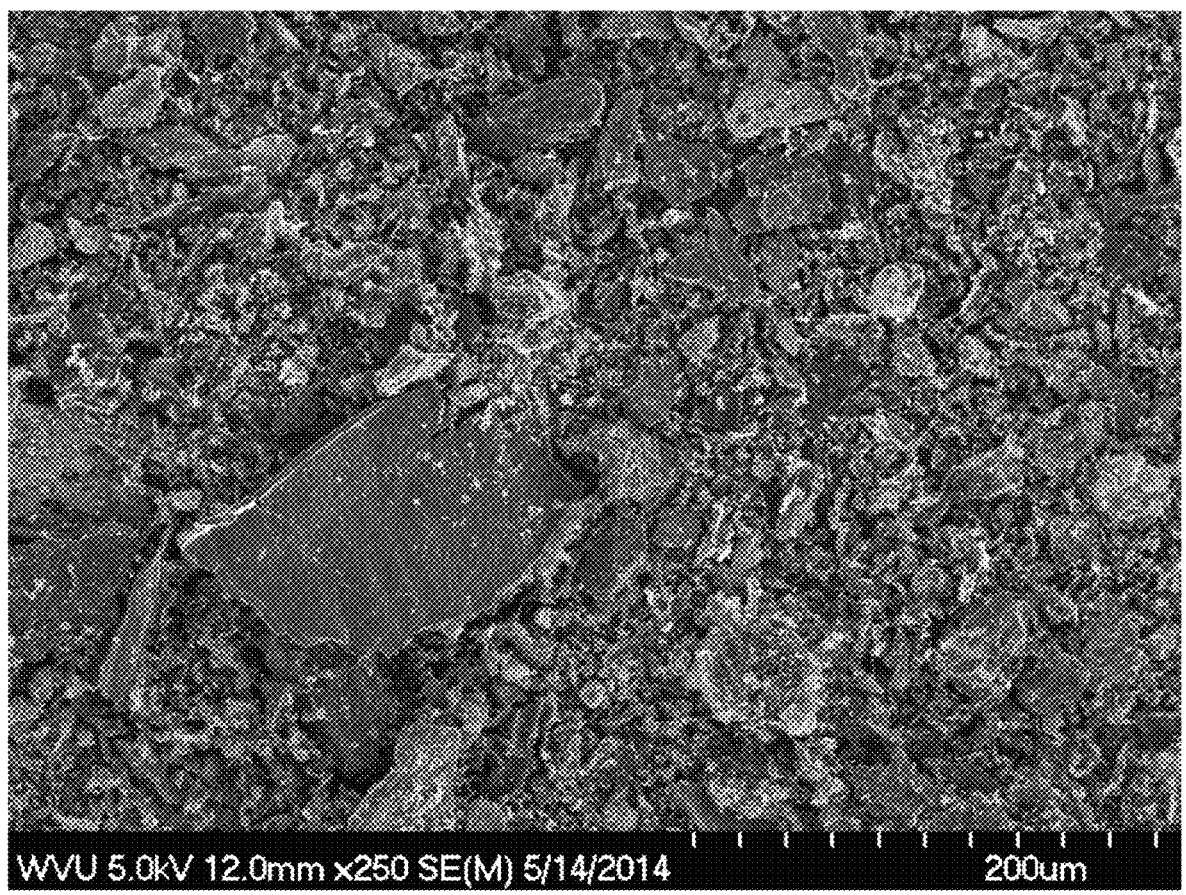
FIG. 6 shows SEM data for elemental carbon material prepared by a comparative thermal method (U.S. application Ser. No. 14/213,533 and PCT Application PCT/US2014/028755; scale bar 200 microns). One relatively larger piece is evident.
Figure 7:
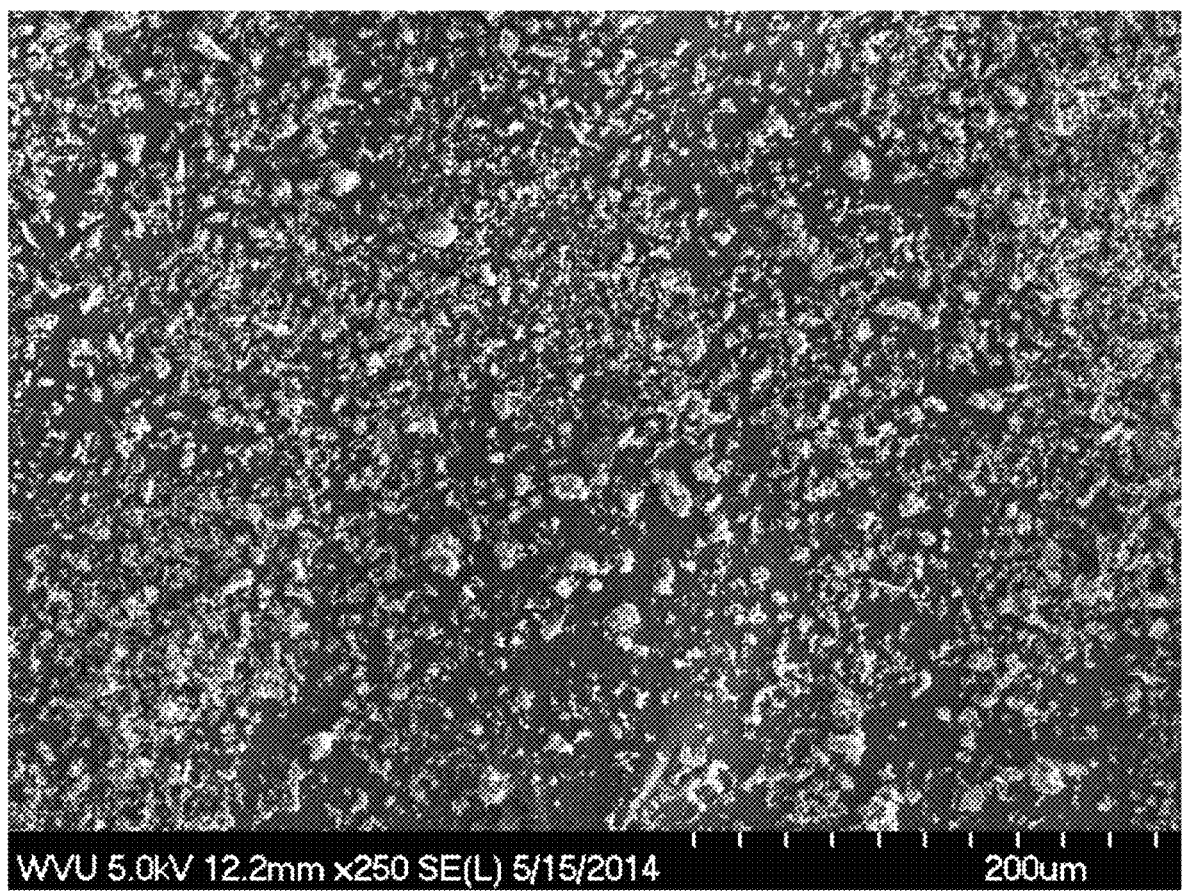
FIG. 7 shows additional SEM data for elemental carbon material prepared by a comparative thermal method ((U.S. application Ser. No. 14/213,533 and PCT Application PCT/US2014/028755; scale bar 200 microns).

U.S. application Ser. No. 14/213,533, filed Mar. 14, 2014 and published as 2014/0271441, describes a method of making carbon from carbide and molten, metal salts in a thermal process but at relatively low temperature compared to prior art processes. PCT Application PCT/US2014/028755, filed Mar. 14, 2014 and published as WO 2014/144374, also describes a method of making carbon from carbide and molten, metal salts in a thermal process but at a relatively low temperature. Also described are processing steps to purify and treat the elemental carbon material. FIGS. 6 and 7 show examples of elemental carbon materials prepared by these methods.

In addition, the claim transitions "comprising," "consisting essentially of" and "consisting of" can be used to describe and/or claim the various embodiments described herein. Basic and novel features of the invention are described herein.

In a nutshell, embodiments for the present inventions provide for, among other things, methods of reacting carbides to produce elemental carbon material and carbon allotropes.

In some embodiments of the present inventions, a voltage is varied, changed, or altered in a cell in which one of the cells contains a carbide electrode to change the nature of the elemental carbon materials formed by the oxidation of carbide anions. Voltage may be varied, changed, or altered in a cell in which one of the cells is a carbide to change the nature of the carbon materials formed by the oxidation of acetylide anions, methanide anions, and/or sesquicarbide anions. In some embodiments, the carbon allotropes produced by the process are controlled by controlling the voltage between the cells in which one of the cells is a carbide.

Figure 1:
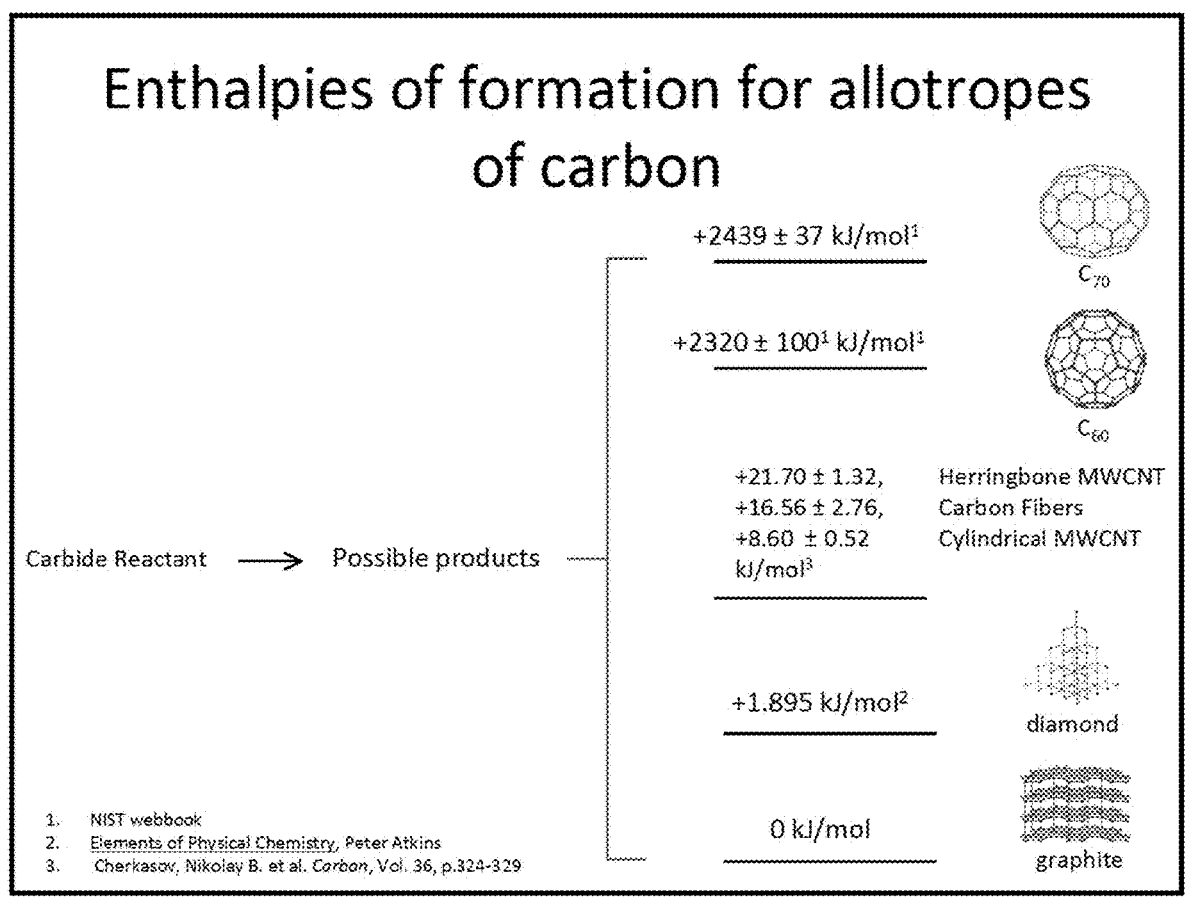
FIG. 1 is a chart that provides the enthalpies of formation for various allotropes of carbon.

For more background to the presently claimed inventions, FIG. 1 is a chart that provides the enthalpies of formation for forms and allotropes of carbon prepared from a carbide reactant. FIG. 1 provides the associated heats of formation $DH_{(formation)}$ in descending order with the lower the $DH_{(formation)}$ value the more stable the state of carbon, with graphite being in the most stable state. The sources for FIG. 1 are an NIST webbook, the textbook *Elements of Physical Chemistry* (Peter Atkins), and Cherkasov, Nikolay B. et al., *Carbon*, vol. 36, p. 324-329.

II. Methods of Production

A first aspect for a method of making is a method comprising providing at least one solid carbide chemical compound and reducing a metal cation with use of the solid carbide chemical compound. The reducing can result from a spontaneous, galvanic reaction, optionally with application of an external voltage. Alternatively, the reducing can be carried out with a non-spontaneous reaction with application of an external voltage.

A second aspect for a method of making provides for a method comprising: producing elemental carbon material from the oxidation of carbide in at least one carbide chemical compound in at least one anode of an electrochemical cell apparatus. Apparatuses which can used to carry out this method are described further in, for example, Part III of this application (see also, for example, Schematics in FIGS. 2-5 and 19). Also, carbide electrode structures which can be used to carry out this method are described further in, for example, Part IV of this application (including methods of using carbide electrodes).

Still further, a third aspect for a method of making is for a method comprising: producing elemental carbon material from the oxidation of carbide in at least one carbide chemical compound which is in contact with a solution comprising at least one organic solvent and at least one dissolved salt comprising at least one metal cation which is reduced.

Finally, elemental carbon material reaction products which can be formed from these methods are described further in Part V of this application.

The method of making can be based on a electrochemical cell apparatus which can be galvanic (spontaneous reaction) or electrolytic (non-spontaneous reaction). Preferably, the method makes use of a galvanic reaction using a galvanic cell apparatus. Preferably, the reaction is a spontaneous redox reaction. A galvanic reaction is generally known in the art as a spontaneous redox reaction wherein one moiety is oxidized and another moiety is reduced. The moieties are connected electrically to allow current to flow and the redox reaction to occur. A multimeter can be used to measure voltage and current flow for such a reaction. No external electrical potential is needed to induce the spontaneous reaction in a galvanic reaction. However, an external electrical potential can be used to control or modify the galvanic reaction, while the reaction is still called a "galvanic reaction" or a "spontaneous reaction." The discharge of the current flow can be regulated. The galvanic reaction can be a source of power, voltage, and current, and these reactions can be used to power other systems and loads as known in the art.

The elements of a method using a galvanic reaction are known and described more hereinbelow. They include, for example, at least one anode, at least one cathode, and connections between the anode and cathode to allow current flow and form a circuit. The connections can provide electronic or ionic current flow. For example, wiring can be used and devices can be used to measure the potential and current flow. Ionic flow can be enabled with use of salt bridges or ion exchange membranes. The salt bridge or ion exchange membrane can have a geometry and length which help to determine the rate of the redox reaction. The transport of the appropriately charged moiety, an anion, can be mediated through the salt bridge or the ion exchange membrane to complete the circuit. For instance, in one embodiment, a cation such as a zinc cation dissolved in the solution in the metal cell cannot migrate or transfer through the ion exchange membrane. However the anion (e.g., Cl—) is able to diffuse through the membrane and into the carbide cell. In one embodiment, the salt bridge is replaced with, or used with, or comprises an ion exchange membrane. In any event, the salt bridge or ion exchange membrane can be adapted to avoid being a rate limiting step ("bottle neck") for the process and pass as much charge as possible.

The elements of a method using an electrolytic reaction are also known.

In one embodiment, the electrochemical cell (e.g., galvanic cell) apparatus further comprises at least one cathode which can be a metal cathode. Mixtures of metals can be used.

The cathode can be used in conjuction with a solution comprising a dissolved salt including a metal cation and an anion. In principle, any ion/metal combination where the ion can be reduced to the metal can be used for a cathode employing this method. More specifically, in principle, any elemental metal immersed in a solution containing ions of that metal, where the ions can be reduced to the elemental state in order to facilitate the oxidation of the carbide ions to elemental carbon, can be used. Examples include zinc metal in a solution of zinc ions, tin metal in a solution of stannous ions, silver metal in a solution of silver ions, and iron in a solution of ferrous ions. In selecting the cathode, practical considersations can be taken into account. For example, issues like corrosion of the metal cathode can be considered. Other factors to consider include, for example, the characteristics of the solvent and the overall solution and how they would interact with the different components of the reaction system. Solubility of the various metallic salts in the different solvents or solvent combinations would also be an issue.

In one embodiment, the electrochemical cell (e.g., galvanic cell) apparatus further comprises at least one metal cathode, wherein the cathode is a zinc, tin, iron (include steel), copper, or silver metal cathode. In another embodiment, the electrochemical cell (e.g., galvanic cell) apparatus further comprises at least one metal cathode, wherein the cathode is a zinc or tin metal cathode.

In one embodiment, the galvanic cell apparatus anode is contacted with at least one first solution comprising at least one first solvent and at least one first salt and a galvanic cell apparatus cathode is also contacted with at least one second solution comprising at least one second solvent and at least one second salt. The solvent and salt combination for both the anode and cathode sides of the cell should provide sufficient ionic conductivity for the process to be enabled. The viscosity of the solvent can be also considered in solvent selection for first and second solvent. For first and second solvent, the solvent can be, for example, a polar organic solvent such as an alcohol such as methanol or ethanol, or an ether such as tetrahydrofuran, or an aprotic solvent such as DMSO or NMP. Examples of solvents include N-methyl pyrrolidone, dimethyl formamide, acetone, tetrahydrofuran, pyridine, acetonitrile, methanol, ethanol, tetramethylurea, and/or dichlorobenzene. Mixtures of solvents can be used. In general, water is avoided in the solvent, and solvents can be dried. In some cases, slow reaction between the solvent and the carbide chemical compound may occur. For example, methanol can reaction with calcium carbide to form calcium methoxide. Typically, the reaction apparatus should be relatively inert to the solvent so that side reactions are minimized or avoided.

The salts for the cathode and anode sides of the cell can be selected to provide the cation or the anion which enable the reaction to work well. For example, the cathode metal being reduced can be used in conjunction with a salt which has the oxidized metal as cation. The anion of the salt can be a halide such as fluoride, chloride, bromide, or iodide. However, the fluoride can cause a high heat of reaction which can generate problems so fluoride salts can be avoided. Chloride salts generally are preferred. Examples of salts include zinc chloride, calcium chloride, stannous chloride, ferrous chloride, cupric chloride, silver chloride, aluminum chloride, lithium chloride, calcium fluoride, stannous fluoride, aluminum fluoride, and lithium fluoride.

An important factor also is that the cation of the carbide must form a soluble salt with the anion of the cathode cell. This may not be possible in some cases such as some sulfate salts including calcium sulfate.

In one embodiment, the galvanic cell apparatus further comprises at least one salt bridge and/or at least one ion exchange membrane. Ion exchange membranes are known in the art and typically are made of a polymeric material attached to charged ion groups. Anion exchange membranes contain fixed cationic groups with mobile anions; they allow the passage of anions and block cations. Cation exchange membranes contain fixed anionic groups with mobile cations; they allow the passage of cations and block anions. See, for example, Y. Tanaka, *Ion Exchange Membranes: Fundamentals and Applications,* $2^{nd}$ Ed., 2015. Herein, the use of ion exchange membranes can help prevent formation of unwanted side products and migration of undesired materials from one cell to the other cell.

In one embodiment, steps are taken so that the reaction is carried out under anhydrous conditions. Moisture can be excluded to the extent needed. Also, inert gases can be used such as argon or nitrogen.

The reaction time can be adapted to the need. Reaction time can be, for example, one minute to 30 days, or one day to 20 days.

In one embodiment, the production of carbon is carried out without use of an external voltage source. The current flow from the spontaneous reaction is not controlled by external voltage in this embodiment.

In another embodiment, however, the galvanic cell apparatus comprises an external voltage source which is used to regulate the oxidation reaction, and in another embodiment, the production of carbon is carried out with use of an external voltage source to regulate the oxidation reaction. This can also be called a "forced current" embodiment. The application of an external voltage source allows one to control the voltage over time using a controlled voltage over time curve, including a step curve, for example. Constant voltage and/or constant current regimes can be used. Over time, voltage can be increased or decreased. Reaction rate can be controlled and increased using the external voltage. For example, reaction rate (current flow in amperage) might increase at least ten times, or at least twenty times, or at least fifty times, or at least 100 time, or at least 250 times, for example, with the application of external voltage compared to cases with no external voltage applied. The level of external voltage can be determined for a particular system. One wants to avoid side reactions. One often will want to increase reaction rate. Voltage can be, for example, 0 V to 40 V, or 0 V to 30 V, or 0 V to 20 V, or 10 V to 20 V. The external voltage source can be applied with use of a potentiostat as known in the art.

In one embodiment, the electrochemical cell apparatus is an electrolytic cell apparatus. Here, the reaction is not spontaneous, and an external voltage needs to be and is applied to drive the reaction. An example is making lithium or sodium.

The Carbide Chemical Compound Starting Material

Carbide chemical compounds or "carbides" are known in the art. See, for example, Cotton & Wilkinson, *Advanced Inorganic Chemistry*, $4^{th}$ Ed., 1980, pages 361-363. This text classifies types of carbides as saltlike carbides, interstitial carbides, and covalent carbides.

Known carbide chemical compounds include, for example, aluminum, arsenic, beryllium, boron, calcium, chromium (in five different Cr:C ratios), cobalt, hafniuim, iron (in seven different Fe:C ratios), lanthanum, manganese (in two different Mn:C ratios), magnesium (in two different Mg:C ratios), molybdenum (in three different Mo:C ratios), nickel (in two different Ni:C ratios), niobium (in two different Nb:C ratios), plutonium (in two different Pu:C ratios), phosphorous, scandium, silicon, tantalum (in two different Ta:C ratios), thorium (in two different Th:C ratios), titanium, tungsten (in two different W:C ratios), uranium (in two different U:C ratios), vanadium (in two different V:C ratios), and zirconium carbide. Also, a carbide can form with two different metals such as cobalt tungsten carbide.

In one embodiment, the carbide chemical compound is a salt-like carbide or an intermediate transition metal carbide. More particularly, the carbide chemical compound is a salt-like carbide in one embodiment. In another embodiment, the carbide chemical compound is a methanide, an acetylide, or a sesquicarbide.

Methanides react with water to produce methane. Methane is a carbon atom bonded to four hydrogen atoms in an sp3 hybridization. Two examples of methanides are aluminum carbide ($Al_4C_3$) and beryllium carbide ($Be_2C$). Acetylides are salts of the acetylide anion $C_2^{-2}$ and also have a triple bond between the two carbon atoms. Triple bonded carbon has an sp1 hybridization and two examples of acetylides are sodium carbide ($Na_2C_2$) and calcium carbide ($CaC_2$). Sesquicarbides contain the polyatomic anion $C_3^{-4}$ and contains carbon atoms with an sp1 hybridization. Two examples of sesquicarbides are magnesium carbide ($Mg_2C_3$) and lithium carbide ($Li_4C_3$).

Sesquicarbides are of particular use for the preparation of sp1 carbon. One can produce $Mg_2C_3$ in the laboratory by bubbling methane through molten magnesium metal under an inert argon atmosphere at over 750° C. Other hydrocarbons such as pentane may also be viable candidates. Also, molten magnesium (Mg) reaction is another area of chemistry where little has been conducted. Research in molten Mg reactions have been limited because of the dangers associated with molten Mg, especially with the process generating hydrogen gas as well. But a process very similar to the synthesis of the magnesium sesquicarbide can be used to convert methane directly into carbon in the form of graphite and hydrogen gas. Methane can be bubbled through a molten solution of Mg and magnesium chloride salt. When heated to a temperature of over 750° C. under an argon atmosphere the elemental Mg metal and $MgCl_2$ both melt to form a liquid solution. Similar to the Mg sesquacarbide synthesis, methane is bubbled through the solution to produce either $MgC_2$ (magnesium carbide) or $Mg_2C_3$ and hydrogen gas that can be collected as a value added product. The carbide then reacts with the metallic salt based on the original chemistry of the carbon producing carbide reaction. The $Mg_2C_3$ and $MgCl_2$ are converted to elemental carbon in the form of graphite, elemental Mg metal and $MgCl_2$, which would remain as part of the liquid solution. Therefore, the Mg metal and $MgCl_2$ salt would remain unchanged throughout the overall process while the methane would be converted to pure carbon and hydrogen gas.

In particular embodiments, the carbide chemical compound is calcium carbide, aluminum carbide, sodium carbide, magnesium carbide, lithium carbide, beryllium carbide, iron carbide, copper carbide, and chromium carbide. Sodium carbide has the advantage of being lighter.

In other more particular embodiments, the carbide chemical compound is calcium carbide or aluminum carbide.

In another embodiment, the carbide chemical compound has sufficient electronic conductivity to function as or in an anode. The conductivity for different carbides can vary depending on factors such as purity and temperature. However, one skilled in the art for a particular application can determine whether there is sufficient electronic conductivity and how to adapt the conductivity for the need. For example, the carbide chemical compound can have an electronic conductivity of at least $10^{-8}$ S/cm, or at least $10^{-7}$ S/cm, or at least $10^{-6}$ S/cm, or at least $10^{-5}$ S/cm, or at least $10^{-4}$ S/cm, or at least $10^{-3}$ S/cm, or at least $10^{-2}$ S/cm, or at least $10^{-1}$ S/cm, or at least $10^{0}$ S/cm. The electronic conductivity of calcium carbide provides a useful benchmark for sufficient conductivity. No particular upper limit is present except for the limits provided by nature for a particular carbide.

The form of the carbide chemical compound can also be varied. For example, it can be used in particle form or it can be used in the form of a monolithic material. In one embodiment, the carbide chemical compound is in the form of individual pieces or particles. In another embodiment, the carbide chemical compound is in the form of individual pieces or particles having a size of less than one cm. The mesh size of particles can be controlled.

The carbide chemical compound can be used in compositions and mixed with other ingredients such as binders or conductivity agents to the extent the desired reaction can be achieved. In some embodiment, more than one carbide chemical compound can be used.

One can use an electronically conductive binder to hold the pieces or particles of carbide together. This can, for example, increase the surface area of the carbide which is in direct contact with a conductive surface. Electronically conductive binders also can be selected as a way to produce composite materials where the conductive properties and other characteristics of the binder can be used to change the characteristics of elemental carbon material produced. Examples of electronically conductive binders include conjugated polymers in doped or undoped form such a polythiophene or a polyaniline.

In one embodiment, the carbide is not silicon carbide.

Carbides are described further herein with respect to the apparatus and the carbide electrode structure.

Temperature and Pressure

Relatively low temperatures, including room temperature, can be used for the reaction to form carbon. For example, the temperature can be, for example, about −50° C. to about 100° C., or about 10° C. to about 90° C., or about 0° C. to about 50° C., or about 15° C. to about 50° C. The temperature can be, for example, about 20° C. to about 30° C., or about 23° C., 24° C., or 25° C. In some embodiments, one will want if possible to avoid the expense of cooling, heating, and temperature control elements. In some embodiments, one will want to run the reaction as close to ambient as possible. As known in the art, in a larger manufacturing operation, excess heat from one point in the operation can be transferred to another point in the operation which needs heat.

In some embodiments, the methods described herein are undertaken at room temperature.

The pressure can be about 1 atmosphere (760 torr) or normal pressure. The pressure can be, for example, about 720 torr to about 800 torr. Alternatively, the pressure can be for example about 0.5 atmosphere to about 5 atmosphere, or about 0.9 atmosphere to about 1.1 atmosphere. In some embodiments, one will want if possible to avoid the expense of using pressures below or above normal atmospheric ambient pressure. One can use a higher pressure to control the boiling point of the solvent. However, the equipment must be adapted to sustain high or low pressures.

A preferred embodiment is that temperature and pressure both are about ambient so than expensive methods to control temperature and pressure are not needed. Hence, for example, the temperature can be about 20° C. to about 30° C., or about 25° C., and the pressure can be about 720 torr to about 800 torr, or about 760 torr.

Other Method Parameters

In one embodiment, one or more materials used in the process can be recycled. The material can be purified as part of the recycling. For example, solvent can be distilled and recaptured for further use. Salts can be recaptured and reused.

In another embodiment, the current flow from a process reactor to make carbon which is run as a galvanic cell can be used to help power another process reactor, including one used to make elemental carbon material, in which current is needed to help control the voltage.

The percent yield of the reaction for elemental carbon material product can be controlled by the amount of current flow and the methods of isolation as known in the art. Percent yield can be measured with respect to the amount of carbon in the carbide chemical compound put in the reactor. In some cases, the yield is at least one percent, or at least 5%, or at least 10%, or at least 20%.

Organic Solvent Reaction to Produce Carbon from Carbide

A third aspect is provided for the production of elemental carbon material at normal temperature and pressure but without an electrochemical apparatus. Here, a method is provided comprising: producing elemental carbon material from the oxidation of carbide in at least one carbide chemical compound (e.g., calcium carbide) which is in contact with a solution comprising at least one organic solvent (e.g., methanol) and at least one dissolved salt (e.g., calcium chloride) comprising at least one metal cation which is reduced. The cation is selected so that a spontaneous reaction can occur wherein the carbide is oxidized and the metal cation is reduced. However, in this embodiment, the molten salt approach of U.S. application Ser. No. 14/213,533 and PCT Application PCT/US2014/028755 and the electrochemical approach described herein are not used. Rather, in this embodiment, the reaction can be carried out in a single reaction container and need not be split into two cells as is done with the electrochemical reaction.

In this embodiment, the temperature and pressure can be as described above. Normal temperature and pressure can be used.

The carbide chemical compound can be as described herein using, for example, aluminum carbide or calcium carbide. The selection of salts, cations, and anions also can be made as described herein.

Examples of the organic solvent include solvents listed herein for the electrochemical reaction such as an alcohol such as methanol or ethanol as described herein. Polar solvents are needed which can dissolve a salt. A protic solvents can be used. Ideally, the solvent would not react with carbide. Alternatively, it reacts with carbide but only very slowly.

The elemental carbon material produced is described herein also.

The reaction time can be adapted to the need.

Anhydrous reaction conditions can be used. For example, a dry box can be used to avoid side reactions with water or oxygen.

III. Apparatus

Another aspect provides for an apparatus which can be used to carry out the methods described herein, including an apparatus comprising at least one electrochemical cell comprising: at least one anode comprising at least one carbide chemical compound, and at least one cathode. This apparatus can be used to carry out the methods described and/or claimed herein including those described in Part II of this application. Again, carbide electrode structures which can be used in the apparatus are described further in, for example, Part IV of this application. Again, elemental carbon material reaction products are described further in Part V of this application. Other embodiments include methods of making these apparatuses. A plurality of apparatuses can be used in a larger system if desired.

The electrochemical apparatus can be a galvanic cell apparatus or an electrolytic cell apparatus. The galvanic cell is preferred.

In one embodiment, the carbide chemical compound is a salt-like carbide or an intermediate transition metal carbide. In one embodiment, the carbide chemical compound is a salt-like carbide. In one embodiment, the carbide chemical compound is a methanide, an acetylide, or a sesquicarbide. In one embodiment, the carbide chemical compound is calcium carbide, aluminum carbide, sodium carbide, magnesium carbide, lithium carbide, beryllium carbide, iron carbide, copper carbide, and chromium carbide. In one embodiment, the carbide chemical compound is calcium carbide or aluminum carbide. In one embodiment, the carbide chemical compound has sufficient electronic conductivity to function as an anode. In one embodiment, the carbide chemical compound has an electronic conductivity of at least $10^{-8}$ S/cm, or at least $10^{-7}$ S/cm, or at least $10^{-6}$ S/cm, or at least $10^{-5}$ S/cm, or at least $10^{-4}$ S/cm, or at least $10^{-3}$ S/cm, or at least $10^{-2}$ S/cm, or at least $10^{-1}$ S/cm, or at least $10^{0}$ S/cm. The electronic conductivity of calcium carbide provides a useful benchmark for sufficient conductivity. No particular upper limit is present except for the limits provided by nature for a particular carbide.

In one embodiment, the carbide chemical compound is in the form of individual pieces or particles. In one embodiment, the carbide chemical compound is in the form of individual pieces or particles having a size of less than one cm.

In another embodiment, the carbide chemical compound is in the form of an integral material or an ingot of material.

In one embodiment, the carbide chemical compound is held in a container.

In one embodiment, the galvanic cell apparatus anode is contacted with a solution comprising at least one solvent and at least one salt.

In one embodiment, the electrochemical cell apparatus anode is contacted with a solution comprising at least one organic solvent and at least one dissolved salt, as described above. In one embodiment, the electrochemical cell apparatus cathode is contacted with a solution comprising at least one organic solvent and at least one dissolved salt as described above. In one embodiment, the electrochemical cell apparatus cathode is a metal cathode as described above. In one embodiment, the electrochemical cell apparatus cathode is a metal cathode, wherein the metal is zinc, tin, iron, copper, or silver. In one embodiment, the electrochemical cell apparatus cathode is a metal cathode, wherein the metal is zinc or tin.

In one embodiment, the electrochemical cell apparatus comprises an external voltage source to regulate an oxidation reaction of carbide in the carbide chemical compound. For example, a potentiostat can be used to provide such an external voltage which can be varied.

Figure 17:
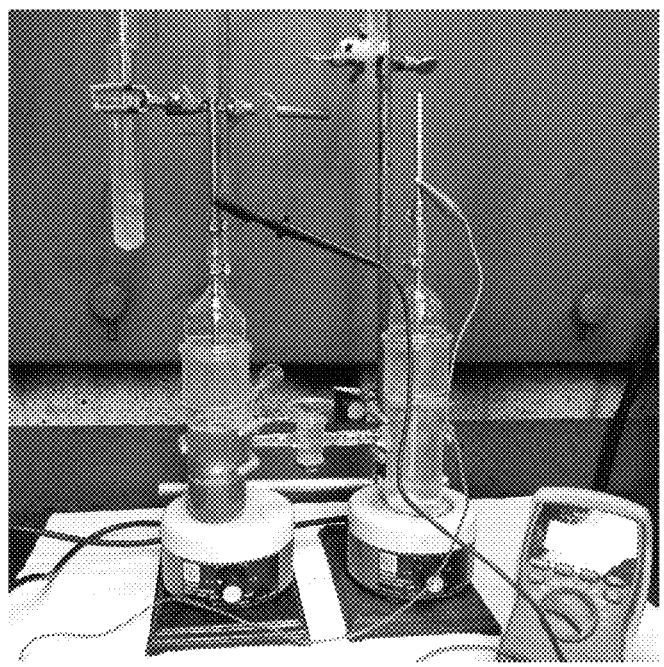
FIG. 17 is photograph depiction of a representative, relatively smaller bench-scale sized electrochemical system (Examples 1 and 2).
Figure 18:
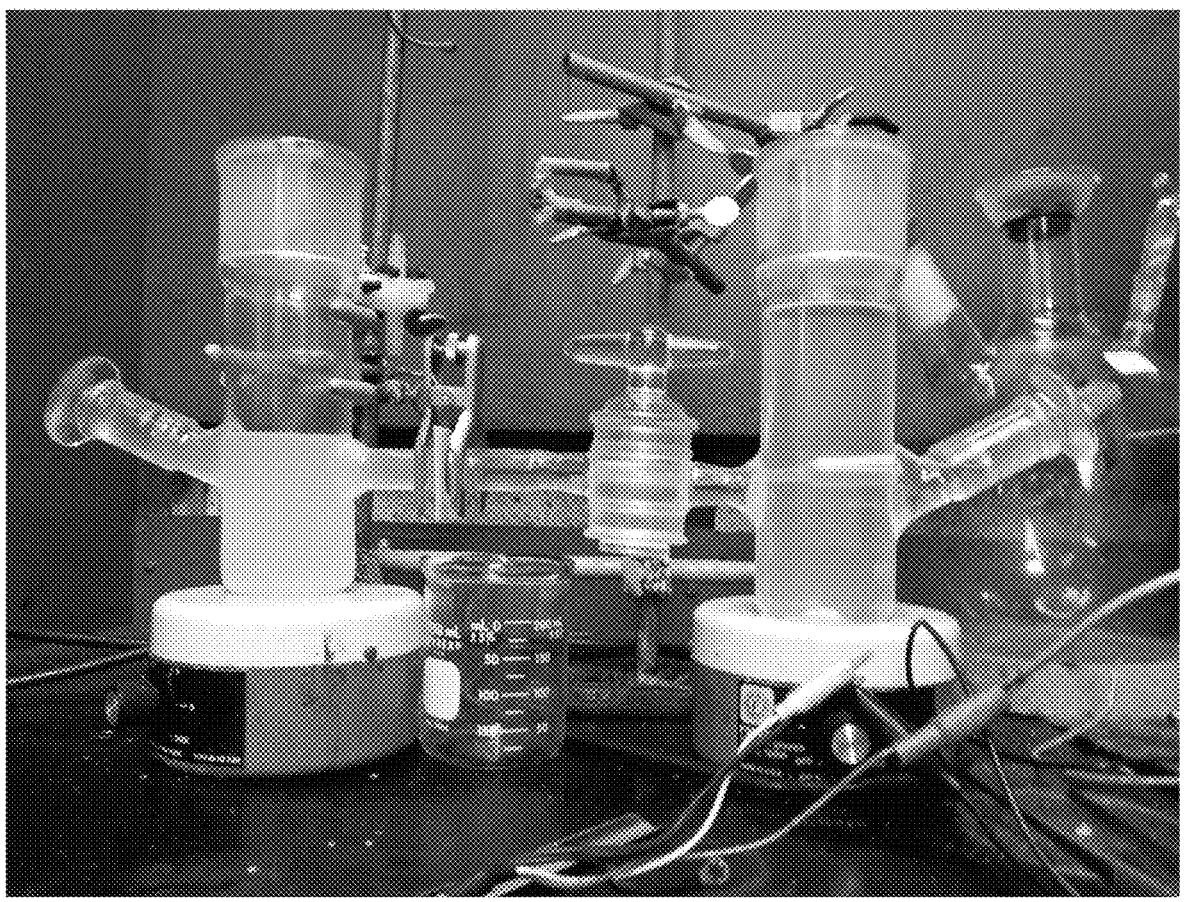
FIG. 18 shows a photograph of a modified laboratory-scale apparatus similar to the apparatus of FIG. 17 but adapted with an ion exchange membrane.
Figure 19:
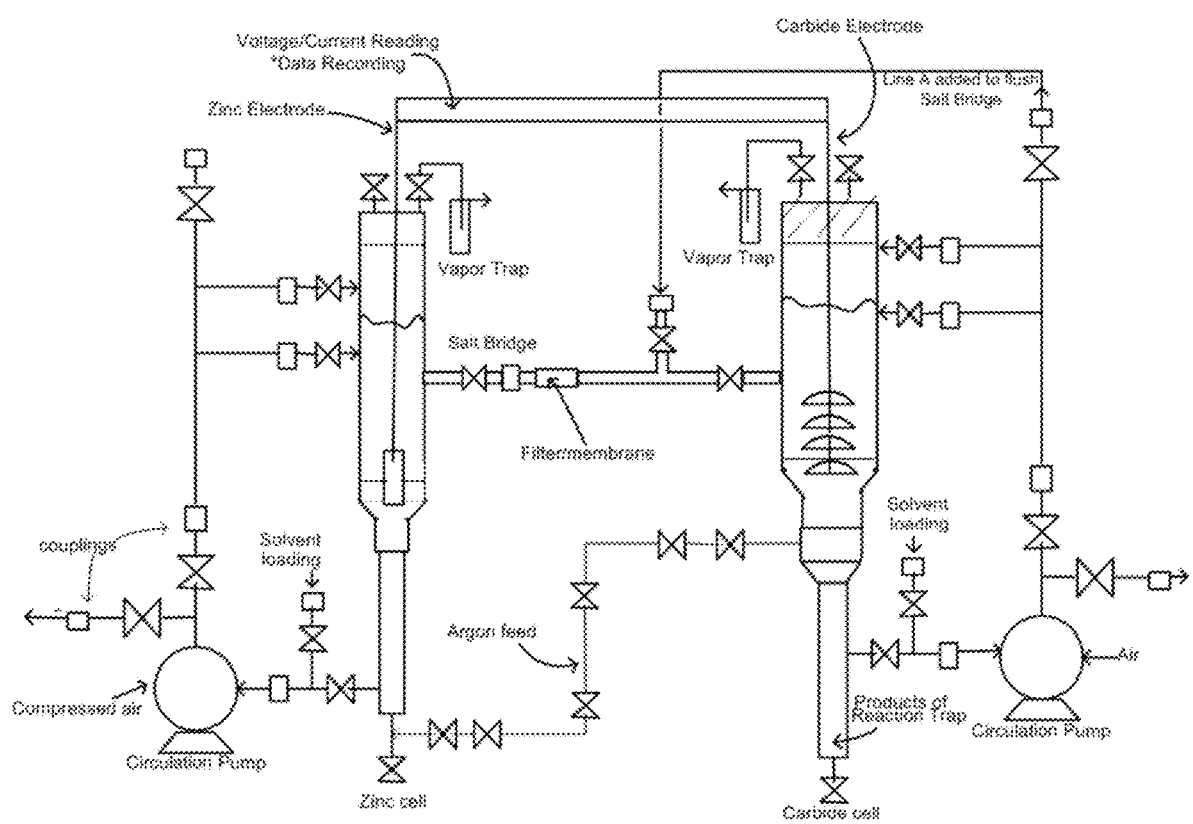
FIG. 19 is a diagram of a representative, relatively larger bench-scale sized electrochemical system compared to that of FIGS. 17 and 18 (Examples 3 and 4).
Figure 20:
FIG. 20 is a photograph depiction of a representative larger bench-scale sized electrochemical system showing the two cells (Examples 3 and 4).
Figure 21:
FIG. 21 is a photograph depiction of a representative carbide cell according to an embodiment of the invention (Examples 3 and 4).
Figure 22:
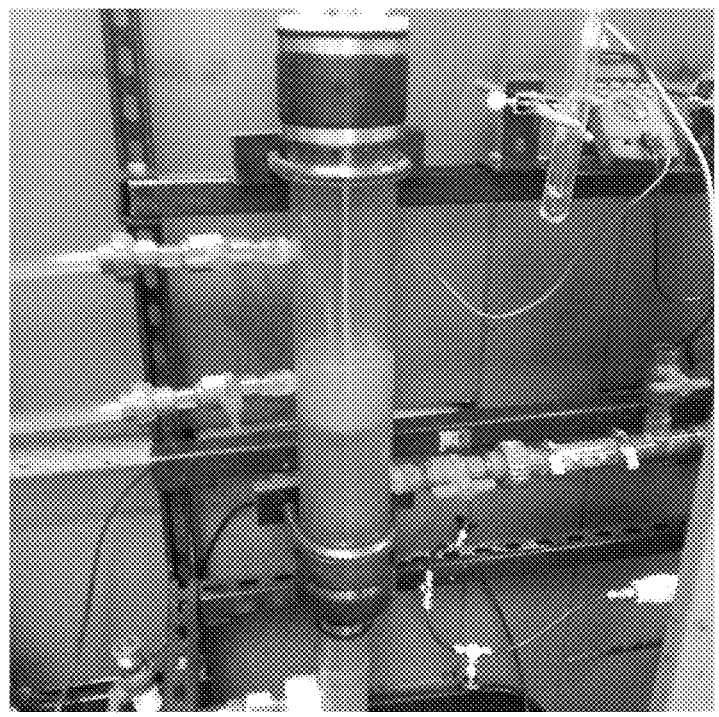
FIG. 22 is a photograph depiction of a representative zinc cell according to an embodiment of the invention (Examples 3 and 4).
Figure 23:
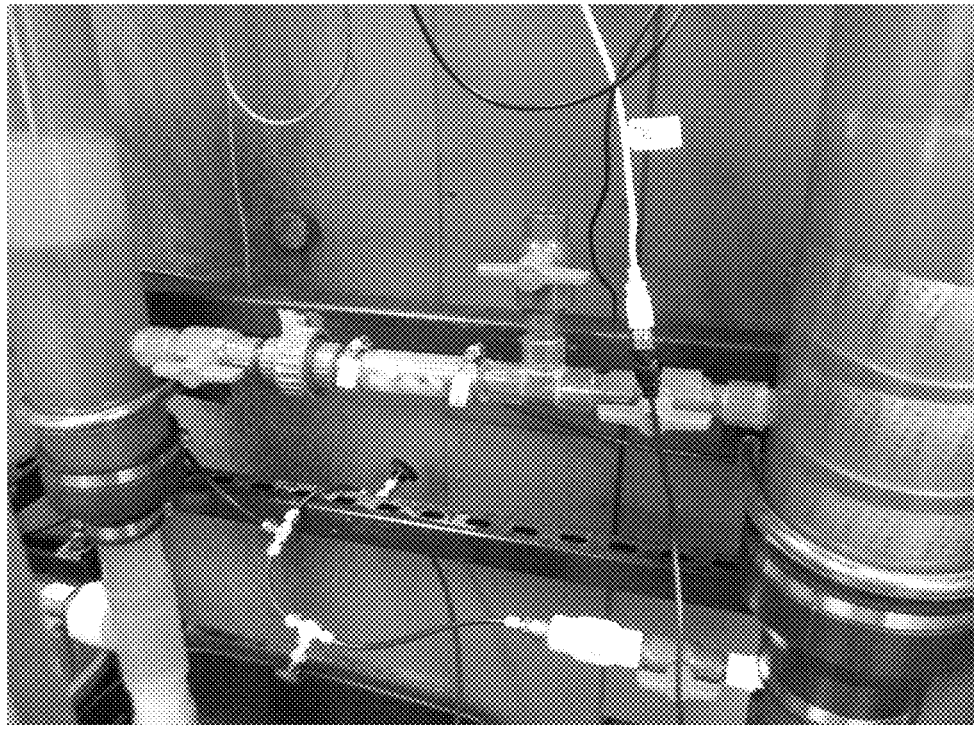
FIG. 23 is a photograph depiction of a representative salt bridge connecting the carbide and zinc cells according to an embodiment of the invention (Examples 3 and 4).
Figure 24:
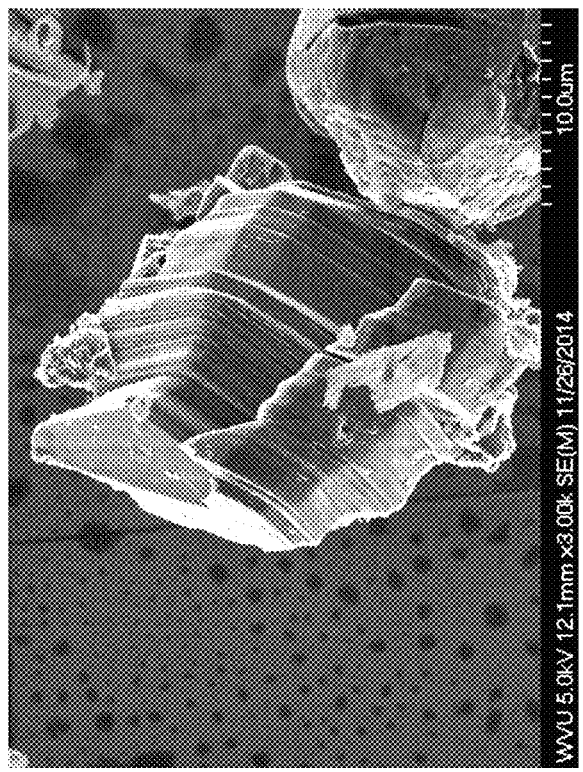
FIG. 24 shows SEM data for the elemental carbon material prepared in Example 3 (scale bar 10 microns).
Figure 25:
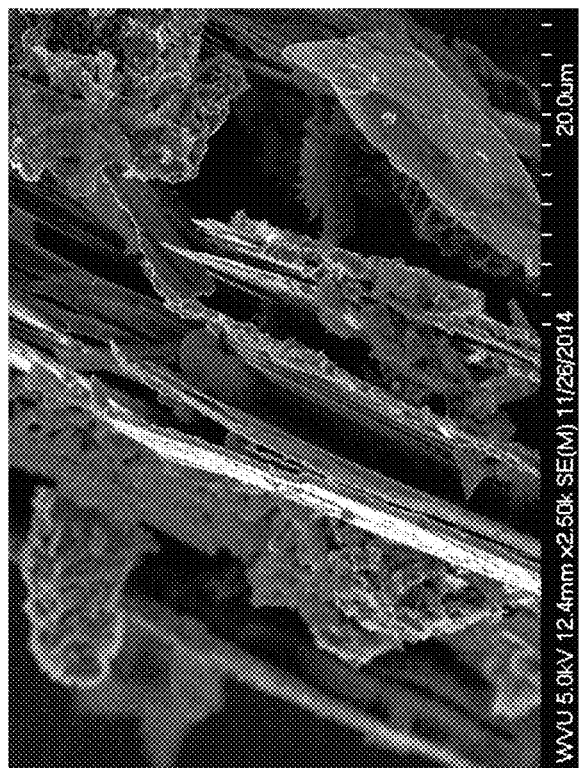
FIG. 25 shows SEM data for the elemental carbon material prepared in Example 3 (scale bar 20 microns).
Figure 26:
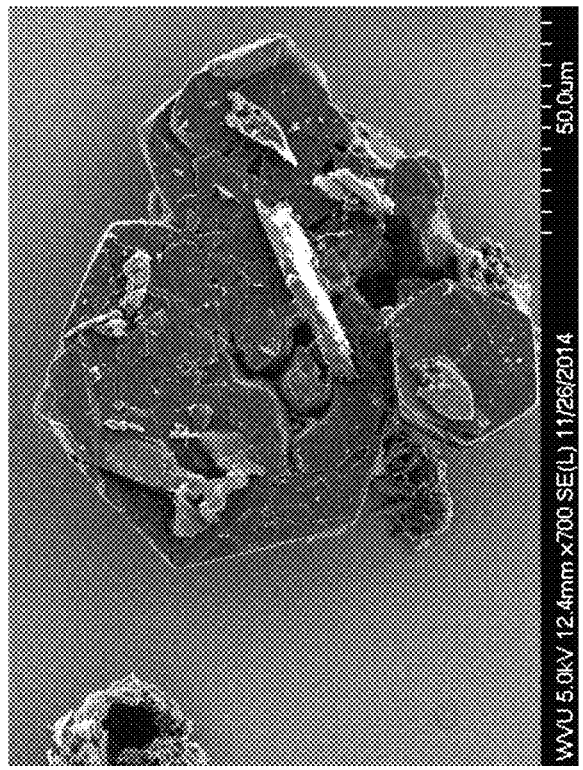
FIG. 26 shows SEM data for the elemental carbon material prepared in Example 3 (scale bar 50 microns).
Figure 27:
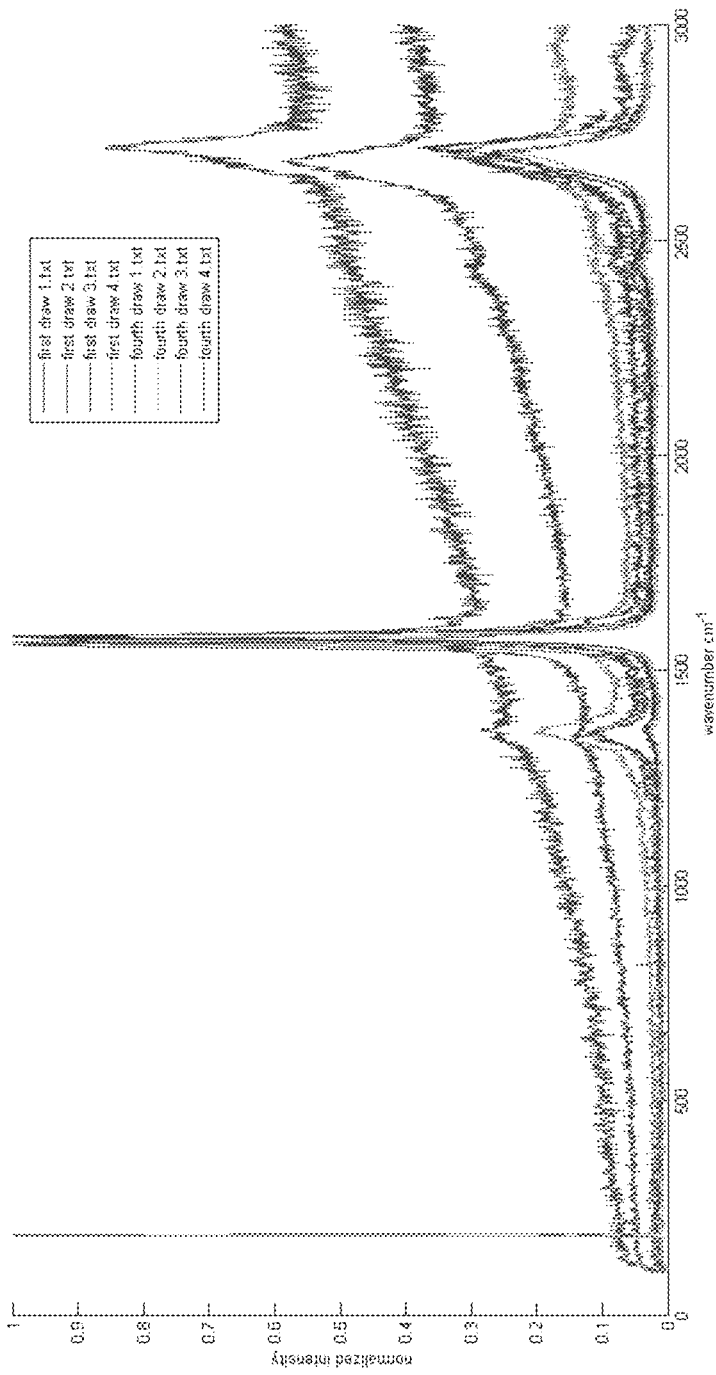
FIG. 27 shows Raman spectral data (eight traces) for the elemental carbon material prepared in Example 3.
Figure 28:
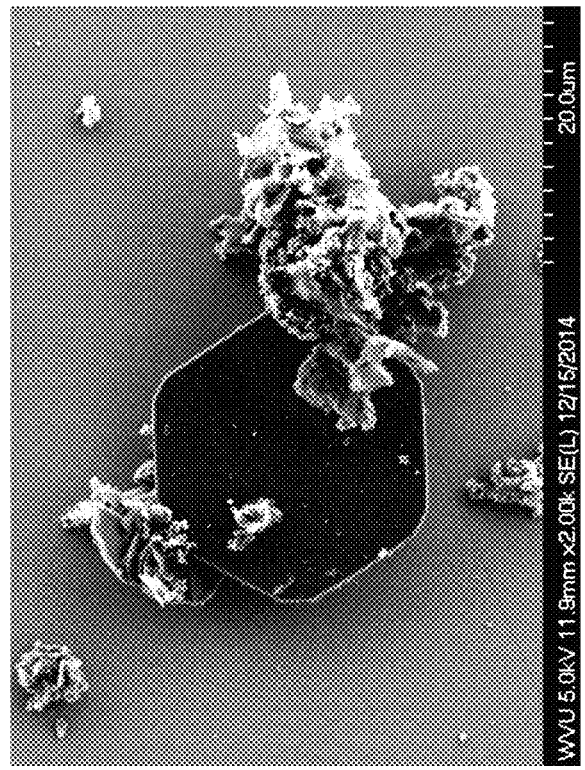
FIG. 28 shows SEM data for the elemental carbon material prepared in Example 4 (scale bar 20 microns).
Figure 29:
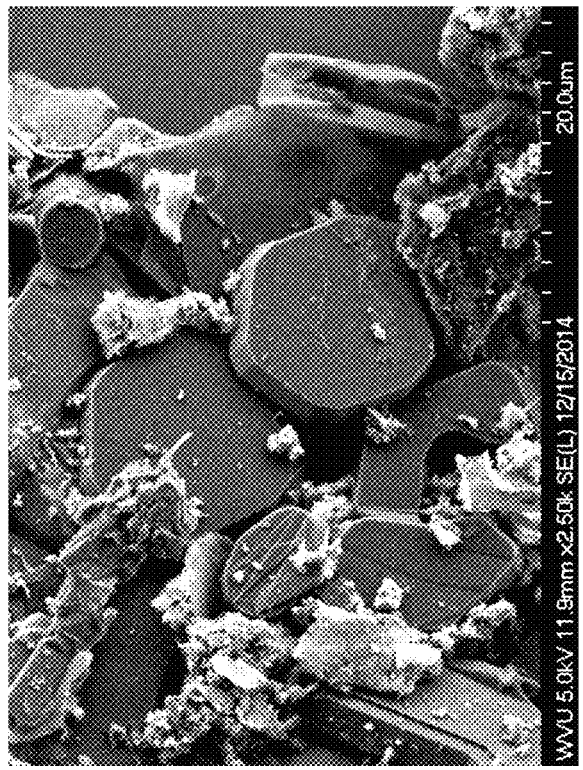
FIG. 29 shows additional SEM data for the elemental carbon material prepared in Example 4 (scale bar 20 microns).
Figure 30:
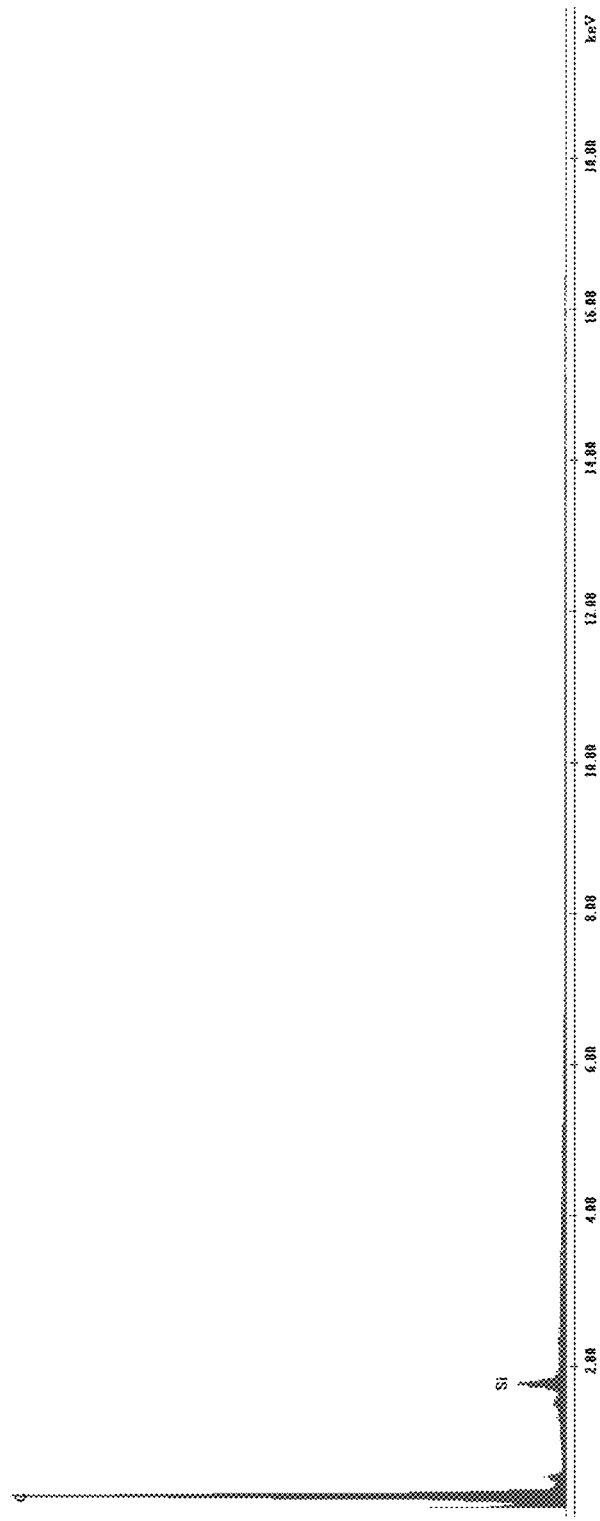
FIG. 30 shows EDAX data for the elemental carbon material prepared in Example 4.
Figure 31:
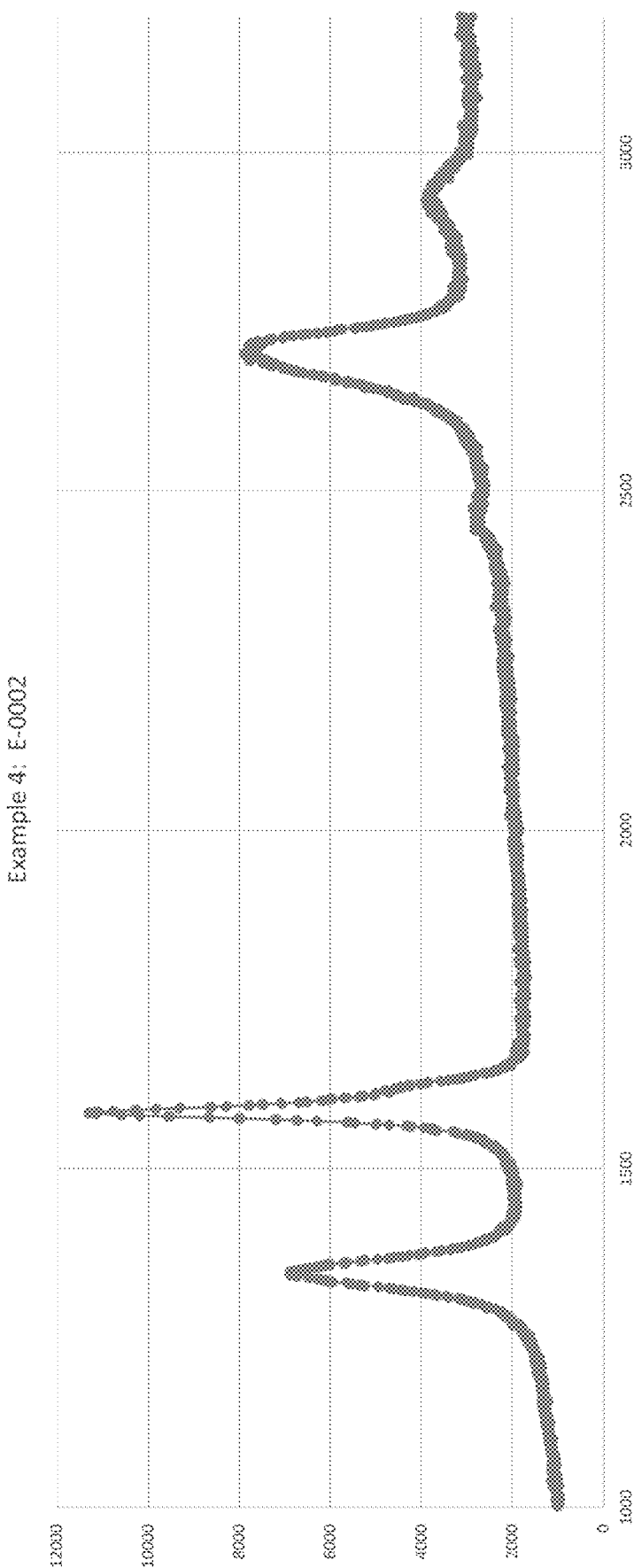
FIG. 31 shows Raman spectral data for the elemental carbon material prepared in Example 4.

Apparatus schematics are provided in FIGS. 2-5 and 19. FIGS. 17 and 18 show actual smaller scale apparatuses for carrying out the reactions. FIGS. 20-23 show a larger apparatus and elements of the apparatus.

There are several improvements to the reactor in FIG. 18 from the reactor of FIG. 17. The first is cells are slightly larger allowing for greater volume of solvent and to accommodate to volume occupied by the reference electrodes that can be added to the various experiments. The addition of the ports on the sides of the cell is also to accommodate the addition of various electrodes and monitoring devices. The other improvements include the increased diameter of the salt which to facilitate the greater transfer of ions. Finally, the reactor was designed and fabricated in two separate pieces held together by a glassware clamp. This allows an ion exchange membrane to be installed in the salt bridge.

In one embodiment, the apparatus is adapted for carrying out the methods described and/or claimed herein.

IV. The Carbide Electrode Structure and Methods of Use

The carbide chemical compound can be used in and adapted for use in an electrode structure. Hence, yet another aspect provides for an electrode structure comprising at least one carbide chemical compound, wherein optionally the carbide chemical compound is a salt-like carbide; and at least one electronically conductive element different from the carbide chemical compound. This electrode structure can be used to carry out the methods and to prepare the apparatuses described and/or claimed herein. Embodiments described herein also include methods of making and methods of using the carbide electrode structure. Multiple electrode structures can be used as part of a larger electrode system. The shape of the electrode can be varied for the need. The conductivity of the electrode can be adapted to the need. The solid properties and macro-, micro-, and nano-scale morphology, such as the size and shapes of openings, porosity, and pore size, can be adapted to the need.

The solid electrode structure and the carbide chemical compound can be contacted with at least one liquid for a redox reaction. The electrode structure provides a reaction of the carbide chemical compound which is not just a surface reaction but can extend to the internal structure of the carbide chemical compound. While the present inventions are not limited by theory, it is believed that the carbon carbide layer of the carbon compound at the surface is reacted to form elemental carbon material as the cation (e.g, calcium) is transported away from the carbon into solution. Multiple layers of carbon can be built up. The surface of the carbide can have some porosity.

The carbide electrode can be an electrode (an anode) where the chemical reaction can occur within the electrode instead of just at the surface. The electrode material itself (e.g., calcium carbide) is being consumed in the reaction where the calcium ion dissolves into the solution and the elemental carbon material is remaining.

In one embodiment, the carbide chemical compound is a salt-like carbide or an intermediate transition metal carbide. In one embodiment, the carbide chemical compound is a salt-like carbide. In one embodiment, the carbide chemical compound is a methanide, an acetylide, or a sesquicarbide.

In one embodiment, the carbide chemical compound is calcium carbide, aluminum carbide, sodium carbide, magnesium carbide, lithium carbide, beryllium carbide, iron carbide, copper carbide, chromium carbide, and chromium carbide. In one embodiment, the carbide chemical compound is calcium carbide, aluminum carbide, sodium carbide, magnesium carbide, lithium carbide, or beryllium carbide. In one embodiment, the carbide chemical compound is calcium carbide or aluminum carbide. In one embodiment, the carbide chemical compound has sufficient electronic conductivity to function as an anode. In one embodiment, the carbide chemical compound has an electronic conductivity of at least $10^{-8}$ S/cm or other ranges described herein such as at least $10^{-7}$ S/cm, or at least $10^{-6}$ S/cm, or at least $10^{-5}$ S/cm, or at least $10^{-4}$ S/cm, or at least $10^{-3}$ S/cm, or at least $10^{-2}$ S/cm, or at least $10^{-1}$ S/cm, or at least $10^{0}$ S/cm. No particular upper limit is present except for the limits provided by nature for a particular carbide. In one embodiment, the carbide chemical compound is an ionically bonded solid.

In one embodiment, the carbide chemical compound is in the form of individual pieces or particles. In one embodiment, the carbide chemical compound is in the form of individual pieces or particles having a size of less than one cm. In one embodiment, the carbide chemical compound is produced in a form to provide maximum or large amounts of surface area. This can facilitate reaction of the carbide at its surface. The particle size and surface area can be adapted to the multiple needs.

In one embodiment, the carbide chemical compound is a single monolithic piece or a series of monolithic pieces. For example, calcium carbide is typically formed in large ingots. The ingots are then crushed and classified to the proper piece or particle size before going out as final product. One can maintain the large ingots to preserve the large crystals of calcium carbide produced. This would in turn allow for large single sheets of graphene to be produced using the electrochemical methods described herein.

In one embodiment, one can take the large ingot of calcium carbide produced as one solid piece. One hole (or even several holes) can be drilled or bored out where it can then be connected to a current collector. The current collector can be, for example, any metal with a melting point lower than the melting point of the calcium carbide. Alternatively, metals with melting points higher than that of calcium carbide can be used. However, these would probably be specialized alloys to withstand those temperatures.

This metal would also be electrically conductive and preferably inert in the solvent/salt combination used for the reaction. A rod of the metal can be inserted into the whole board out in the calcium carbide ingot. The rod would then be "welded" to the single piece of calcium carbide by pouring a molten form of the metal into the gap between the rod in the hole bored out in the calcium carbide. The molten metal would act effectively as a weld connecting the two. This is similar to how electrodes are made for the aluminum industry.

A second method can be done by fabricating a structure like a cage or something similar to tresses used in buildings. Any type of shape or structure that includes empty space and provides a high surface area can be used. The structure would be made out of a conductive material that is stable at the temperatures of carbide production or around 2000° C. Another desired characteristic would be that the material would be inert to the solvent/salt solution used in the electrolysis reaction. Graphite can be an ideal material for this application. Another possibility could be some type of metal alloy that is stable to high temperatures. The structure could then be placed into the ingot where the solid piece of calcium carbide is formed. The calcium carbide would form around the current collector. Then the calcium carbide formed and the current collector can be removed as one single piece and used as the carbide electrode.

In some embodiments, the carbide chemical compound can be used with one or more additional, different materials such as an additive. Materials and additives which are useful for making electrodes can be used. For example, a binder can be used.

In one embodiment, the carbide chemical compound is held in a container. In one embodiment, the container has openings which allow fluid, such as an electrolyte, to enter the container and contact the carbide chemical compound In one embodiment, the carbide chemical compound is divided into portions. In one embodiment, the carbide chemical compound is divided into approximately equal portions.

In one embodiment, the carbide chemical compound is at least about 80 wt. % pure, or at least 90 wt. % pure, or at least 95 wt. % pure, or at least 97 wt. % pure.

The electronically conductive element should have good electronic conductivity such as, for example, at least $10^{-3}$ S/cm, or at least $10^{-2}$ S/cm, or at least $10^{-1}$ S/cm, or at least $10^0$ S/cm.

In one embodiment, the electronically conductive element is a binder for the carbide chemical compound.

In one embodiment, the electronically conductive element is adapted to be non-reactive with the reaction media. For example, it should be inert to the contacting solution, or at least inert enough to effectively conduct the reaction for the need.

In one embodiment, the electronically conductive element is a container and the carbide chemical compound is held in the container.

In one embodiment, the electronically conductive element is a metallic container and the carbide chemical compound is held in the metallic container. In one embodiment, the electronically conductive element is a non-metallic container such as graphite and the carbide chemical compound is held in the non-metallic container such as graphite. For example, graphite baskets can be used.

In one embodiment, the electronically conductive element comprises at least one conductive rod.

In one embodiment, the electrode structure is adapted to be removably attached to an apparatus.

In one embodiment, the electronically conductive element of the electrode structure comprises at least one current collector.

In one embodiment, the electrode structure is adapted for use as an anode in, for example, an electrochemical cell apparatus.

For example, provided is a method comprising operating at least one anode in an electrochemical cell, wherein the anode comprises at least carbide chemical compound which includes a method comprising operating at least one anode in a galvanic cell, wherein the anode comprises at least carbide chemical compound. The electrochemical cell apparatus can be a galvanic cell apparatus or an electrolytic cell apparatus. The apparatus can be used for production of elemental carbon material. However, other embodiments are possible for uses other than the production of elemental carbon material. Other uses of the apparatus with the carbide electrode include oxidation reactions such as, for example, conversion of aldehyde to carboxylic acid, and oxidation of a metal such as ferrous ion to ferric ion. Such reactions could be useful in, for example, environmental processes such as, for example, acid mine drainage or sewage treatment.

In most cases, the one or more carbide chemical compounds is the only electrochemically reactive moiety participating in the oxidation part of the redox reaction. In one embodiment, the anode electrochemically active material consists essentially of at least one carbide chemical compound. In another embodiment, the anode electrochemically active materials consist of at least one carbide chemical compound. Here, a conductor such as a metal which is not oxidized or reduced in the anode is not considered an electrochemically active material.

V. the Elemental Carbon Material as Reaction Product

Still further, another aspect provides for an elemental carbon material composition prepared by the methods, or with use of the apparatuses or carbide electrode structures, described and/or claimed herein. The elemental carbon material can be described and/or claimed by the characteristics of the elemental carbon material and/or by how it was made. Elemental carbon materials are materials known in the art to focus on the carbon content and do not include organic compounds such as methane, methanol, or acetic acid. Examples such as graphite and diamond are well-known as elemental carbon materials. These compositions can range from the compositions as initially prepared from the carbide chemical compound to the compositions as they exist after one or more treatment, purification, and/or separation steps (post-processing steps including exfoliation and doping steps, for example). The compositions can be mixtures of different forms of the elemental carbon material. The composition can comprise crystalline portions and/or amorphous portions. The carbon can be in the form of one or more graphene layers, and it can be in an exfoliated form. Preferred embodiments for graphene include atomically thin single sheet graphene or few layer graphene. Graphene can have 1-10 layers for example. Thicker forms of graphene also can be of interest. Also, the elemental graphene material, including graphene forms, can be disposed on substrate films.

Characterization methods for elemental carbon materials are well known and include analysis of microstructure, morphology, and physical properties. For example, carbon black materials are well known and characterized as described in, for example, (1) *Carbon Black: Production, Properties, and Uses* (Sanders et al., Eds.), and (2) *Carbon Black: Science and Technology*, $2^{nd}$ Ed., (Donnet et al., Eds.) 1993. Morphological properties of elemental carbon materials include, for example, particle size, surface area, porosity, aggregate size, and aggregate shape. Physical properties include density, electronic, thermal, bulk, and impurities. Microstructure analysis includes XRD, Dark Field Electron Microscopy, Oxidation Studies, Diffracted Beam Electron Microscopy, Phase Contrast TEM imaging, and High Resolution SEM, STEM, STM, SFM, and AFM imaging.

Other characterization methods for carbon are known and described further herein. See, for example, review article by Chu et al., *Materials Chemistry and Physics*, 96 (2006), 253-277, which describes characterization of amorphous and nanocrystalline carbon films. Methods described include optical (Raman, both visible and UV, and IR), electron spectroscopy and microscopy (e.g, XPS, AES, TEM of various kinds, and EELS), surface morphology (AFM, SEM), NMR, and X-ray relectivity. Methods described include how to measure sp2:sp3 ratios.

The elemental carbon material can provide many novel, interesting, and useful structures when viewed under an SEM, including at a 200 micron scale bar view or less as shown in the Figures. Features shown in the SEM figures can be used to describe and claim the elemental carbon materials. Spots on the elemental carbon material also can be selected for Raman spectroscopy, and Raman data can also be used to describe and claim the elemental carbon materials. Other data such as EDAX and XRD can also be used to describe and claim the elemental carbon materials.

Generally, high purity elemental carbon materials are desired. In one embodiment, the elemental carbon material is more than 70%, or more than 80%, or more than 90%, or more than 95%, or more than 98%, or more than 99% (atomic percentage) carbon. This percentage can be measured by, for example, elemental analysis methods including SEM-EDAX. Of course, in some embodiments, less high purity may be acceptable. Also, in some embodiments, non-carbon elements can be deliberately incorporated such as in a doping process.

In one embodiment, the elemental carbon material is more than 50%, or more than 60%, or more than 70%, or more than 80%, or more than 90% sp2 carbon. A combination of analytical techniques can be used to determine an accurate estimate. For example, there is also the possibility of analysis using bromine. Sp2 carbon absorbs a certain amount of bromine relative to amorphous carbon or even possibly sp1 carbon if we can produce it. Sp3 carbon does not absorb bromine at all. Therefore, we may be able to quantitatively determine these percentages using a type of bromine absorption test.

In one embodiment, the elemental carbon material is more than 50%, or more than 60%, or more than 70%, or more than 80%, or more than 90% sp3 carbon.

In one embodiment, the elemental carbon material comprises two-dimensional plate-like structures. These structures can be stacked on top of one another. In another embodiment, the elemental carbon material comprises three-dimensional structures.

In some embodiments, the elemental carbon material has amorphous carbon content. In other cases, crystalline carbon can be present.

In some cases, particles can be isolated, and average particle size ($d_{50}$) can be, for example, 500 nm to 500 microns, or one micron to 100 microns, or two microns to 50 microns, or 10 microns to 30 microns. If desired, nanoscopic particles can be isolated with average particle size of less than 500 nm such as, for example, 10 nm to 500 nm, or 20 nm to 100 nm. Commercial particle size analyzers can be used to measure particle size.

The elemental carbon material, at various stages of purification and isolation, can be tested by methods known in the art including, for example, optical microscopy, electron microscopy including scanning electron microscopy (SEM) and transmission electron microscopy (TEM), energy dispersive x-ray analysis (EDX), Raman and FTIR spectroscopy, x-ray diffraction, X-ray photoelectron spectroscopy (XPS), Auger electron spectroscopy (AES), low energy and high energy electron energy loss spectroscopy (EELS), neutron scattering, ellipsometry, electrical resistance, and atomic force microscopy (AFM). Particle analysis can also be carried out including measurement of particle size and surface area. Electrochemical testing can also be carried out. Tribology, wear, friction, indentation, modulus, hardness testing can also be carried out.

For Raman spectroscopy, a G band (around 1590 $cm^{-1}$) can be present in crystalline graphite and a D band (around 1345 $cm^{-1}$) can be present associated with disordered graphite. The ratio of the two bands can be used to characterize the degree of graphitization and the graphite crystallite size.

The elemental carbon material produced can be analyzed by surface analytical methods such as AFM or XPS. For example, XPS analysis can show higher levels of oxygen at the surface than in the bulk material. This can mean that the surface of the material had formed graphene oxide. Graphene oxide, in principle, could be formed as part of the reaction or due to the separation and purification operations. Other surface elements can include O, H, N, S, and halogens.

In another embodiment, the elemental carbon material comprises sp1 carbon material.

In some embodiments, the methods described herein can be used to produce an allotrope of carbon that is $C_{70}$. In some embodiments, the methods can be used to produce an allotrope of carbon that is $C_{60}$. Other kinds of fullerenes can be made. In some embodiments, the methods described herein can be used to produce an allotrope of carbon that is Herringbone Multi Wall Carbon Nano Tubes ("MWCNT"). Single-walled carbon nanotubes also can be made. In some embodiments, the methods described herein can be used to produce an allotrope of carbon that is Cylindrical MWCNT. In some embodiments, the methods described herein can be used to produce an allotrope of carbon that comprises carbon fibers.

The methods described herein can produce carbon with $sp^1$, $sp^2$, and/or $sp^3$ hybridization, as well as mixtures thereof. The $sp^1$ hybridized carbon can be in the form of carbyne. The $sp^2$ hybridized carbon can be in the form of carbene, graphite, and/or graphene. The $sp^3$ hybridized carbon can be in the form of diamond.

Particular carbon materials may thus be produced through the application of external voltage to an electrolysis cell wherein at least one of the electrodes is a carbide.

In some embodiments, the methods described herein can be used to produce an allotrope of carbon that is $sp^2$ hybridized, and contains no $sp^3$ hybridization. In some embodiments, the methods described herein produce an allotrope of carbon that is $sp^3$ hybridized, and contains no $sp^2$ hybridization. In some embodiments, the methods described herein produce an allotrope of carbon that is $sp^1$ hybridized and contains neither $sp^2$ or $sp^3$ hybridization.

In some cases, the elemental carbon material can have more sp2 than sp3 hybridized carbons, and in other cases, the elemental carbon material can have more sp3 than sp2 hybridized carbons. The ratio of sp2:sp3 can be, for example, 1:10 to 10:1, or 1:8 to 8:1, or 1:6 to 6:1, or 1:4 to 4:1, or 1:2 to 2:1.

The methods described herein can be used to produce a product that is more than 50%, more than 55%, more than 60%, more than 65%, more than 70%, more than 75%, more than 80%, more than 85%, more than 90%, more than 95% $sp^1$ hybridized.

In an embodiment, the methods described herein produce a product that is more than 50%, more than 55%, more than 60%, more than 65%, more than 70%, more than 75%, more than 80%, more than 85%, more than 90%, more than 95% $sp^2$ hybridized.

In some embodiments, the methods described herein produce a product that is more than 50%, more than 55%, more than 60%, more than 65%, more than 70%, more than 75%, more than 80%, more than 85%, more than 90%, more than 95% $sp^3$ hybridized.

In some embodiments, the methods described herein produce a product that is more than 50%, more than 55%, more than 60%, more than 65%, more than 70%, more than 75%, more than 80%, more than 85%, more than 90%, more than 95% $sp^2$ hybridized in the form of graphite.

In some embodiments, the methods described herein produce a product that is more than 50%, more than 55%, more than 60%, more than 65%, more than 70%, more than 75%, more than 80%, more than 85%, more than 90%, more than 95% $sp^3$ hybridized in the form of diamond.

Large area pieces of carbon, having high levels of elemental carbon purity, are of particular interest. They can be, for example, a source for large area graphene. The piece may have a lateral dimension of, for example, at least one mm, or at least two mm, or at least one cm, or at least two cm. The lateral dimension can be a length or a width of a piece or particle. In some cases, both the length and the width can be at least 1 mm, or at least 2 mm, or at least 1 cm, or at least two cm. The volume of the piece can be, for example, at least one cubic mm, or at least one cubic cm (cc), or at least 8 cubic cm (cc). Also important are forms of carbon having flat surfaces whether of lower or higher flat surface area.

Carbon structures are shown in the SEM and optical photographs provided herein which can be of commercial use. In many cases, it is desired to have crystalline forms of the elemental carbon material rather than amorphous forms.

In some embodiments, the elemental carbon material comprises at least some two-dimensional plate-like structures. In some embodiments, the elemental carbon material comprises at least some two-dimensional plate-like structures stacked on top of one another. Graphene structures may be evident. Thicker graphene structures can be converted to thinner graphene structures. In some embodiments, the elemental carbon material comprises at least some three-dimensional structures.

In some embodiments, the elemental carbon material shows porous structures or voids.

In some embodiments, bent structures can be seen. The bent structure can be characterized by an acute angle, and the angle can be controlled by the synthesis method. In other embodiments, rods can be formed. In some embodiments, curved elemental particles can be observed. In some embodiments, perpendicular features can be observed.

Further structures can be observed with higher resolution analytical methods.

VI. Post Reaction Processing of Elemental Carbon Material

After forming in the apparatus, the elemental carbon material can be further treated beginning with, for example, purification and/or mechanically changing the form into powder or particle forms. Treatments can be mechanical or chemical. The piece of product can be subjected to various mechanical steps such as grinding, exfoliation, or polishing steps. Additional treatment steps can include, for example, doping and intercalation steps. Some of the elemental carbon material may be attached to the electrode and will need to be removed from the electrode. Other elemental carbon material may leave the electrode during the reaction and may, for example, sink to the bottom of the reaction cell for collection.

PCT Application PCT/US2014/028755, filed Mar. 14, 2014 and published as WO 2014/144374, also describes a method of making carbon from carbide and metal salts in a thermal process, and also describes various post reaction processing steps which can be used.

In another embodiment, the elemental carbon material is removed and treated with acid and washed or flushed with water. Strong acids such as HCl can be used.

In one embodiment, the elemental carbon material can be converted to particle form, and the particles separated based on particle size.

Graphene exfoliation steps are known in the art and described in, for example, Bonaccorso et al., *Materials Today*, December 2012, 15, 12, 564. In particular, large area graphene sheet production is of interest. The large pieces of elemental carbon material produced by methods described herein can enable production of large area graphene. A solvent such as NMP can be used for exfoliation. Sonication can also be used for exfoliation. Larger pieces of carbon in many cases require higher power to exfoliate. The exfoliation process can be controlled so as to control the thickness of the exfoliated product, such as graphene.

Also described herein are derivative compositions associated with the elemental carbon material compositions described herein. For example, the elemental carbon material compositions described herein can be mixed with or doped with other elements, compounds, ingredients, additives, and/or materials.

VII. Applications

Selected representative examples of applications are described below. Devices, apparatuses, systems, kits, methods of making, and methods of using that are associated with these applications are also described herein including devices, apparatuses, systems, and kits which comprise the elemental carbon materials and their derivatives described herein (e.g., battery, fuel cell, or filtration devices). The elemental carbon reaction products, whether in bulk form, microscale form, or nanoscale form, can be used in a wide-variety of applications including, for example, applications generally known for carbon materials including applications known, more specifically, for graphite materials, applications known for diamond materials, applications known for amorphous carbon, and applications known for nanoscale forms of carbon, for example. In some cases, the elemental carbon material can be mixed with one or more other ingredients for application use.

Carbon black, for example, is used as filler, pigment, toners, and reinforcement agent.

Many applications relate to the electrically conductive properties of carbon and the electronics and semiconductor industries. For example, carbon inks are known including conductive inks. Carbon-based fillers or conductive agents are known.

Activated carbon has many applications.

Graphite is a material found in nature and also is synthetically produced. Examples of natural graphite are flake, crystalline, and amorphous graphite. Graphite flakes can have flat, plate-like particles with hexagonal or angular edges. The percent carbon can impact the application. Graphite can be used as electrodes, pastes, brushes, crucibles, lubricants, foundry facings, moderator bricks in atomic reactors, paints, pencils, brake linings, foundry operations, refractory applications, steel making, lithium-ion batteries, fuel cells, and the like.

In particular, batteries including lithium and lithium-ion batteries can be an application, as well as air batteries such as zinc air batteries. Lithium-ion batteries are described in, for example, Yoshio et al. (Eds.), *Lithium-Ion Batteries: Science and Technologies*, including chapter 3 (pages 49-73) and chapter 18 (pages 329-341) which focus on carbon anode materials, as well as chapter 5 (pages 117-154) which focuses on carbon-conductive additives and chapter 22 (pages 427-433) which focuses on novel hard-carbon materials.

Graphene can be used in advanced semiconductor devices. Large area graphene is important. Other applications include filters (including water filtration and desalinization of sea water), batteries, touch screens, capacitors, fuel cells, sensors, high frequency circuits, flexible electronics, computing, data storage, solar, and photovoltaics.

Diamonds can be low quality or high quality and are applied in applications which use hardness including abrasion resistant materials, as well as drilling, polishing, and cutting materials. Diamonds also can be used for sensors, electronics, medical imaging, semiconductors, super computers, and sonar. Diamonds also can be gems.

Carbon related materials such as $CaC_6$ have been shown to be superconducting. Other applications for sp1 materials relate to use of superconductor materials and even high temperature or room temperature superconductor materials.

Carbon nanotube products can be in the form of "forests" of microscopic tubular structures. They can be used in, for example, baseball bats, aerospace wiring, combat body armor, computer logic components, and microsensors in biomedical applications. Carbon nanotubes also can be used in lithium ion batteries and various sporting equipment.

PREFERRED EMBODIMENTS AND WORKING EXAMPLES

In an illustrative embodiment, an electrode in an electrochemical cell comprises or is comprised of calcium carbide and is immersed in a solution of methanol and calcium chloride salt. As the carbide electrode is an ionic solid which is electrically conductive, the carbide electrode allows for the oxidation of the acetylide anion to occur in the solid state. As a counter cell, a polished piece of zinc is immersed in a solution of zinc chloride in methanol. Alternatively, because the reduction potential of tin is higher than the reduction potential of zinc, in an aspect, elemental tin in a stannous chloride solution can be utilized instead of zinc in zinc chloride. When an electrical connection is established between the cells through a salt bridge, the oxidation of carbide anion reaction and the reduction of zinc cation reaction can occur at room temperature. Thus, the voltage of the reaction can be directly read.

The galvanic reaction apparatus of preferred embodiments differs from a conventional galvanic apparatus in several respects. First, the zinc electrode is the cathode in the process while the carbide electrode is the anode. At the cathode, the $Zn^{2+}$ ions from the $ZnCl_2$ in solution are reduced (gain electrons) to elemental zinc which plates out on the surface of the zinc electrode. The $Cl^-$ ions from the $ZnCl_2$ in solution are the counter ions that migrate across the salt bridge to balance the charge from the flow of electrons. At the anode in the carbide cell, the $C_2^{2-}$ from the solid calcium carbide is oxidized (loses electrons) to form elemental carbon and the $Ca^{2+}$ ions enter the solution inside the carbide cell.

In exemplary embodiment of the electrolysis apparatus of the invention, calcium carbide loaded into stainless steel baskets forms the anode in the carbide cell. The stainless steel rod and baskets which hold the calcium carbide are essentially an extension of the wire connecting the cathode and the anode.

The resulting apparatus is unique in that the calcium carbide is an ionic solid which is electrically conductive. Therefore, the oxidation reaction is believed to occur in the solid phase where the carbide anion ($C_2^{2-}$) is oxidized to elemental carbon. This is substantially different from a reaction in which the anions are oxidized in the liquid phase from the solution. In addition, the $Ca^{2+}$ ions entering the solution are unchanged (not oxidized) from their state in the solid phase.

For verification, in a preferred embodiment, the voltage of a standard silver/silver chloride cell to the zinc/zinc chloride cell is compared using a salt bridge. In an embodiment, the salt bridge is a saturated calcium chloride solution in methanol. This permits migration of the chloride to the silver/silver chloride cell and calcium ions to the zinc/zinc chloride cell needed to maintain electro neutrality. The voltage of the silver/silver chloride cell is subtracted from the cell voltage to yield the zinc/zinc chloride potential. Once the potential is known, the potential of the calcium carbide cell can be determined. Since the products of the carbide cell are not mixed with any non-water-soluble material, they can be cleaned and the products analyzed.

This can help to provide a method to determine the voltage necessary to produce a specific product.

In an embodiment, an electrochemical cell enables the production of the entire range of carbon materials in their various states.

In an embodiment, an electrochemical cell as described herein includes (1) an electrode, for example a solid electrode, (2) a conductor, for example a conductor in a lower or elemental valence state; and (3) an electrode, for example an electrode immersed in a solution that contains ions of the electrode material. The solution is conductive. That is, the ions can be mobile and can migrate under the influence of an electrical potential.

The Latimer series is a compilation of the electrochemical potentials between the metal and a standard solution of its ions in the conducting solution. Two such cells with different electrochemical potentials can be used to make either an electrolytic or a galvanic apparatus; one cell is oxidizing, losing electrons and the other cell is reducing, gaining electrons. If the cell is reducing, then electrons from the opposite cell, the oxidizing cell, accumulate on the electrode surface. Positive ions from the solution migrate to the electrode and electrons are picked up by the ions that are subsequently reduced sometime to the elemental state where they plate out on the electrode surface. If the cell is oxidizing, electrons leave the electrode and go to the reducing electrode. The material on the oxidizing electrode dissolves into the solution as positive ions.

In the carbide cell, the carbon anion in the calcium carbide can give up electrons and become elemental carbon. The calcium cation can dissolve in the solvent and requires anions to be dissolved in the solvent. The electrons from the carbide anion will pass through the circuit to the metal electrode in the reduction cell. This will attract cations of the metal from the solution and as they receive the electrons from the anion oxidation they will be reduced and plated out on the metallic electrode. This provides an abundance of anions that fulfill the deficit needed by the calcium ion in the other cell. A salt bridge is used to balance the cations and anions in the apparatus. The salt bridge is a connection of a salt solution to both cells. The anions from the salt bridge travel to the oxidizing electrode while the cations from the salt bridge travel to the reducing electrode. The difference in electrode potentials drives the cell.

Figure 2:
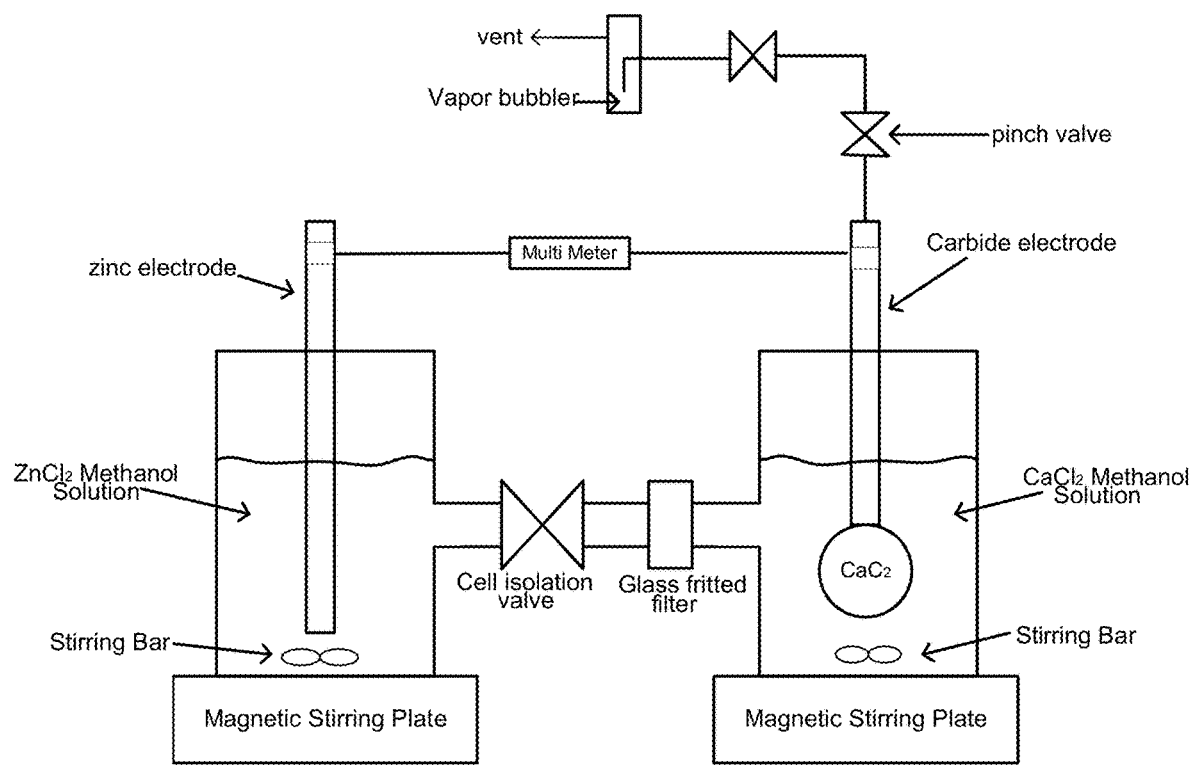
FIG. 2 is a schematic diagram of a representative electrochemical (here, galvanic) system according to an embodiment of the invention.
Figure 3:
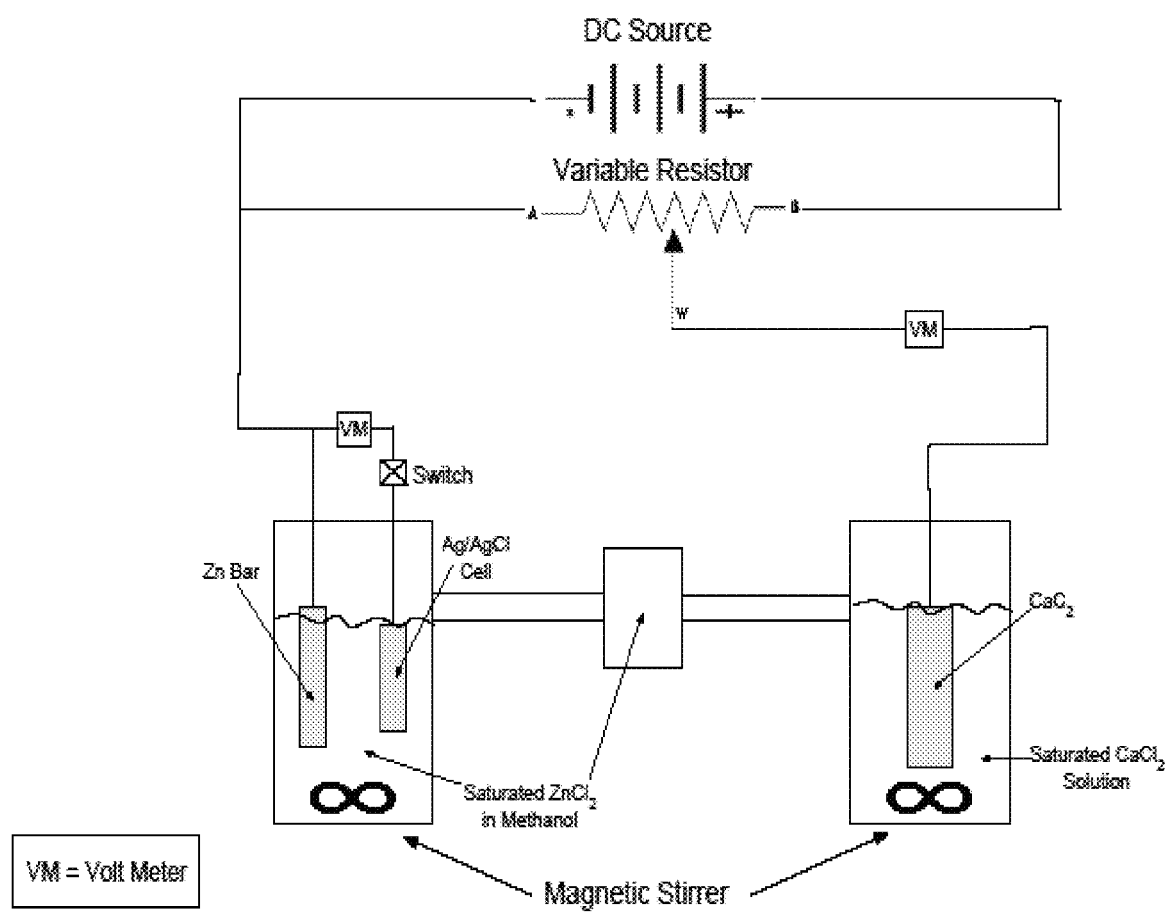
FIG. 3 is a diagram of a representative electrochemical (here, galvanic) system according to an embodiment of the invention showing a direct current (DC) source and a variable resistor (i.e., example of external voltage source).
Figure 4:
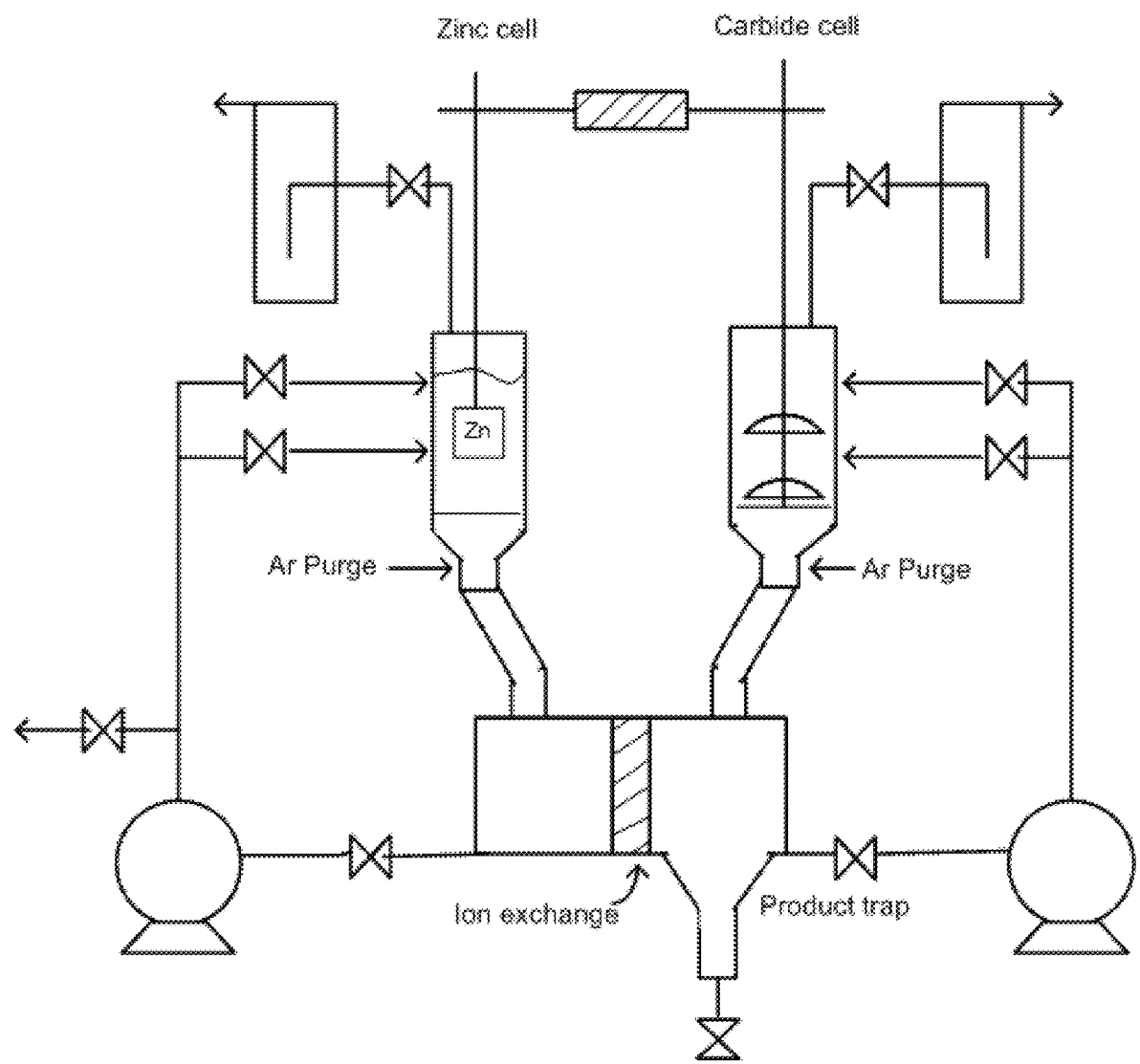
FIG. 4 shows a schematic drawing of the apparatus wherein an ion exchange membrane is below the two cells.
Figure 5:
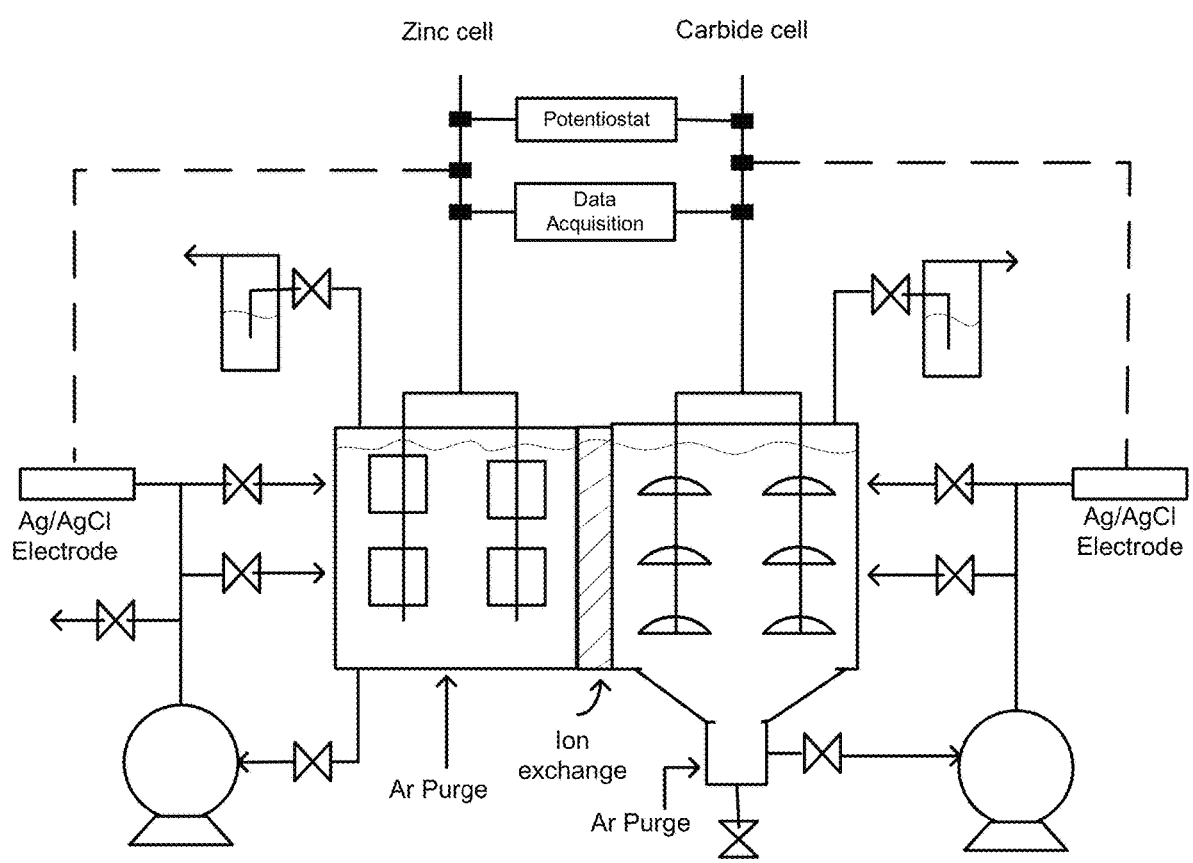
FIG. 5 shows a schematic drawing of the apparatus in which an ion exchange membrane is used and also a reference electrode (Ag/AgCl) is used.

A galvanic cell, such as that represented in FIG. 2, depends on the voltage potential from the chemical reaction to cause electron flow. A cell, like that shown in FIG. 3, may use an external power source, such as a battery or potentiostat, to drive or regulate the chemical reactions. The exact potential can be controlled by an external variable resister but is limited by the range of reactions than can occur in the cells. The application of the different potentials can determine the products produced by controlling the chemistry that can occur in the cells as chemical reactions are a limited by the potential.

Under such a system, the voltage can be adjusted through the variable resister to any desired voltage within the available potential. The current can be permitted to flow until an appropriate quantity of product is produced in the carbide cell for isolation and analysis. The voltage can be altered until another current flows and the procedure can be repeated until all the various materials have been isolated and tested. In an embodiment, the zinc cell voltage is measured against the standard silver/silver chloride cell, and also monitored.

The calcium chloride or other associated salt is soluble in the solvent and the solution is conductive to produce the oxidative cell. The oxidative cell may then be attached to a second cell, the reducing cell, though a salt bridge. The salt bridge may be made from the same solvent and saturated with the same calcium salt or another suitable salt. In another embodiment, the reducing cell contains an elemental metal as an electrode immersed in a salt solution of that metal as a cation in the same solvent.

As demonstrated by the Examples described below, the specific allotropes produced using the apparatus of the invention vary depending on the voltage potential between the cells of the apparatus. In the electrolytic cells according to some embodiments of the invention, one electrode is connected to a voltmeter and one end of a power supply and the other electrode is attached to a variable resister. The second arm of the power supply is attached to the variable resister so the resister can control the voltage between the two-electrode cell circuits. Thus, the circuit can permit any voltage, and therefore any potential. This allows the production of particular desired allotropes and the maintenance of a particular voltage level to enhanec the purity of a particular allotrope.

In some embodiments, the methods described herein can be undertaken using a galvanic cell reactor. The reactor can be comprised of multiple parts, including a carbide cell and a zinc cell. In some embodiments, the reactor comprises a carbide electrode. In some embodiments, the carbide cell and the zinc cell are connected by a salt bridge. The carbide cell can comprise electrode baskets, which can contain the salt-like carbide. The electrode baskets can comprise fine mesh (20-60 mesh) stainless steel screens. The salt-like carbide in the electrode baskets can then be immersed in a solution comprising a chloride salt. The carbide cell can be connected to a circulation pump, which can draw the solution from below the level of the electrode and salt bridge and pumps it back into the top of the carbide cell, creating a flow of the solution vertically in the cell. An inert gas (e.g. argon) can be input near the bottom of the carbide cell, bubbled through the solution, and removed from the carbide cell through the vapor trap. The inert gas flow can maintain an inert environment inside of the cell and generates additional agitation between the carbide and the solution.

In some embodiments, the zinc cell comprises a zinc electrode immersed in a solution of zinc chloride dissolved in the solvent (dried methanol). The zinc electrode can include a rod of elemental zinc. Attached to the zinc rod may be a basket filled with mossy zinc (i.e., irregular pieces of elemental zinc) wherein the rod can pass through the middle of the basket and allow the mossy zinc to be in contact with the zinc rod. The zinc cell can be connected to a circulation pump that draws the solution from below the level of the zinc electrode and salt bridge and pumps it back into the top of the cell above the basket containing the mossy zinc. In addition, the argon enters at the very bottom of the cell and bubbles through any precipitated zinc chloride to maintain the saturation point in the solution.

The carbide cell and zinc cell can be connected by a salt bridge, which can facilitate the flow of chloride ions from the zinc cell to the carbide cell. The salt bridge can be comprised of two isolation valves at either end, as well as a coupling which can hold an ion exchange membrane, and a vent valve.

In some embodiments, the galvanic cell comprises an external power supply.

The examples that follow demonstrate the use of reactions having different voltage potentials to produce different carbon allotropes and forms of the elemental carbon material.

WORKING EXAMPLES

Additional embodiments are provided by the following non-limiting working examples.

Example 1

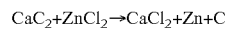

$CaC_2 + ZnCl_2 \rightarrow CaCl_2 + Zn + C$

An apparatus was constructed that included two glass cells connected by a glass tube. Along the glass connecting tube was a valve to isolate the two cells from one another and a glass fritted filter to prevent any solid material from migrating between the cells. Each cell was roughly two inches in diameter and six inches high. The glass tube connecting the cells was about 3 inches from the bottom or about in the middle of the vertical height of the cells. The cells also had a flat a bottom so that they could rest on magnetic stirring plates to provide agitation during the experiment.

Each cell was sealed with a glass cap using a glass ground joint and each cap allowed for a ¼ inch tube to pass through the cap and extend into the cell. One of the cell caps was equipped with an elemental metal electrode (e.g., zinc or tin), while the second cell was equipped with an electrode which contains the carbide.

The caps for each cell were fabricated with a glass nipple roughly 5/16 in diameter. This permitted the elemental metal electrode from passing through the Into the cell. A 12 inch long, ¼ inch diameter elemental zinc rod was passed through the nipple on the cap of the metal cell. A piece of Tygon tubing was slid over the top of the elemental zinc rod down to where it also covered a portion of the glass nipple in the cap. One hose clamp was placed around the Tygon tubing covering the nipple while another hose clamp was tightened on the Tygon tubing covering the elemental zinc rod. This was done in order to seal the cell and maintain an inert environment in the cell.

The carbide electrode was a hollow stainless steel mesh sphere with a diameter of 1 and ⅝ inches connected to a stainless steel tube. A small hole was drilled in the side of the stainless steel tube within the cell to vent any vapors produced in the experiment. The other end of the tube that was outside of the cell was connected to a valve using flexible Tygon tubing which was further connected to bubbler filled with methanol to prevent any oxygen or moisture from entering the cell.

The cells were prepared in the controlled environment of a glove box, free of oxygen and moisture. Several hundred milliliters of dried methanol was prepared by removing the moisture dissolved in the methanol using a molecular sieve. A magnetic stir bar was placed in each cell of the apparatus and the valve on the tube connecting the two cell was closed to isolate one cell from the other.

The first cell was filled with the dried methanol to a height of four inches or one inch above the connecting tube. Zinc chloride anhydrous salt ($ZnCl_2$) was stirred into the dried methanol until the solution was saturated. The cell cap, which was fitted with a ¼" diameter elemental zinc rod was set in place using vacuum grease on the ground glass joint to seal the zinc cell. The bottom of the elemental zinc electrode was immersed in the $ZnCl_2$/methanol solution.

The second cell was also filled with the dried methanol to height of four inches or one inch above the connecting tube. Calcium chloride anhydrous salt ($CaCl_2$) was stirred into the dried methanol until the solution was saturated.

The calcium carbide ($CaC_2$) was then prepared by reducing the particle size of the of the individual pieces to a size of less than one centimeter. For this example, the calcium carbide was ground and crushed to a particle size between 3.5 and 14 mesh. Calcium carbide was purchased from Acros Organics and the product name was Calcium Carbide, 97+% (CAS: 75-20-7 and Code: 389790025). The calcium carbide was not treated or purified before start of the experiment.

The $CaC_2$ was then sealed in the hollow stainless steel mesh sphere of the carbide electrode which had been fitted into the second cell cap. The carbide cell cap was set in place using vacuum grease on the ground glass joint to seal the carbide cell. The mesh sphere containing the calcium carbide was completely immersed in the $CaCl_2$/methanol solution. Tygon tubing was connected to the opened end of the stainless steel tubing on the carbide electrode. A pinch valve was used to completely seal the carbide cell from the environment.

The connected cells, which had been sealed and isolated from the environment, were removed from the controlled atmosphere glove box. The connected cells were set in place with the bottom of each cell resting on a separate magnetic stirring plate. The Tygon tubing connected to the top of the stainless steel tube of the carbide electrode was connected to the valve which was further connected to the vapor bubbler filled with methanol. The pinch valve on the Tygon tubing was then opened to the carbide cell. One side of a multimeter was connected to the zinc electrode and the other side was connected to the carbide electrode allowing for the flow of electrons across the cells. The multimeter also permitted the voltage and current between the two cell to be measured.

The reaction took place at room temperature, which was estimated to be about 23° C.-24° C.

The vent valve was opened between the carbide electrode and the vapor bubbler to allow any vapor produced to exit the carbide cell. Next, both magnetic stir plates were turned on to agitate the solution in each of the cells. Finally, the valve on the glass tube connecting the cells was opened to allow for ions to flow between the two cells. The voltage and current were measured using the multimeter to ensure that the reaction was indeed proceeding.

After a period of time, the reaction was stopped by closing the valve on the tube connecting the two cells.

The reaction time for Example One was about 28 hours.

The multimeter was disconnected along with the Tygon tubing attached to the carbide electrode.

The carbide cell cap was removed along with the mesh stainless steel sphere containing the products of the experiment.

For describing the reaction products, two groups of products are noted. The first group is the product that remained inside the mesh electrode ("primary product"), and the second is the product that escaped the mesh electrode and was resting at the bottom of the glass cell ("secondary product"). The primary and secondary products can be evaluated separately or they can be mixed and evaluated together in a mixture.

The products of the experiment were then removed from the mesh stainless steel sphere and treated with 6.0 molar hydrochloric acid (HCl) and then flushed several times with distilled water.

The product at the bottom of the glass cells was the only product visible prior to removal from the cell. In the cell immersed in the solution, the product at the bottom of the cell appeared to be an off-white colored gel. Small solid particles which were darker in color could be seen in the gel-like material. The first step in removing the product from the apparatus was to remove the glass cap with the mesh stainless steel ball or carbide of holder from the cell. The holder was opened up and its contents transferred to a 600 mL beaker filled with a one molar HCl solution. The contents of the holder had an appearance of a light gray wet sand. The materials were transferred using a scapula. The remaining residual material was removed from the stainless steel holder using a spray bottle filled with the one molar HCl solution. The contents are also collected in the same 600 mL beaker. The cell was emptied by first decanting off the supernatant solution. The remaining solution along with the products at the bottom of the cell were poured into the 600 mm beaker containing the products from the stainless steel holder. The remaining residual material in the bottom of the cell was sprayed out into the 600 mm beaker using the spray bottle containing the one molar HCl solution.

After treatment with water and HCl the products had the appearance of a fine gray powder, or more particularly, a darker gray powder.

The products of the experiment were confirmed to be only elemental carbon using standard analytical methods including SEM and EDAX. The atomic percent carbon was at least 98%.

A reaction product called "Sample A" is characterized in FIGS. 8-11. The elemental carbon produced from the reaction described herein using zinc included mainly two-dimensional carbon sheet or plates stacked on top of one another which showed that the carbon was $sp^2$ hybridized.

Figure 8:
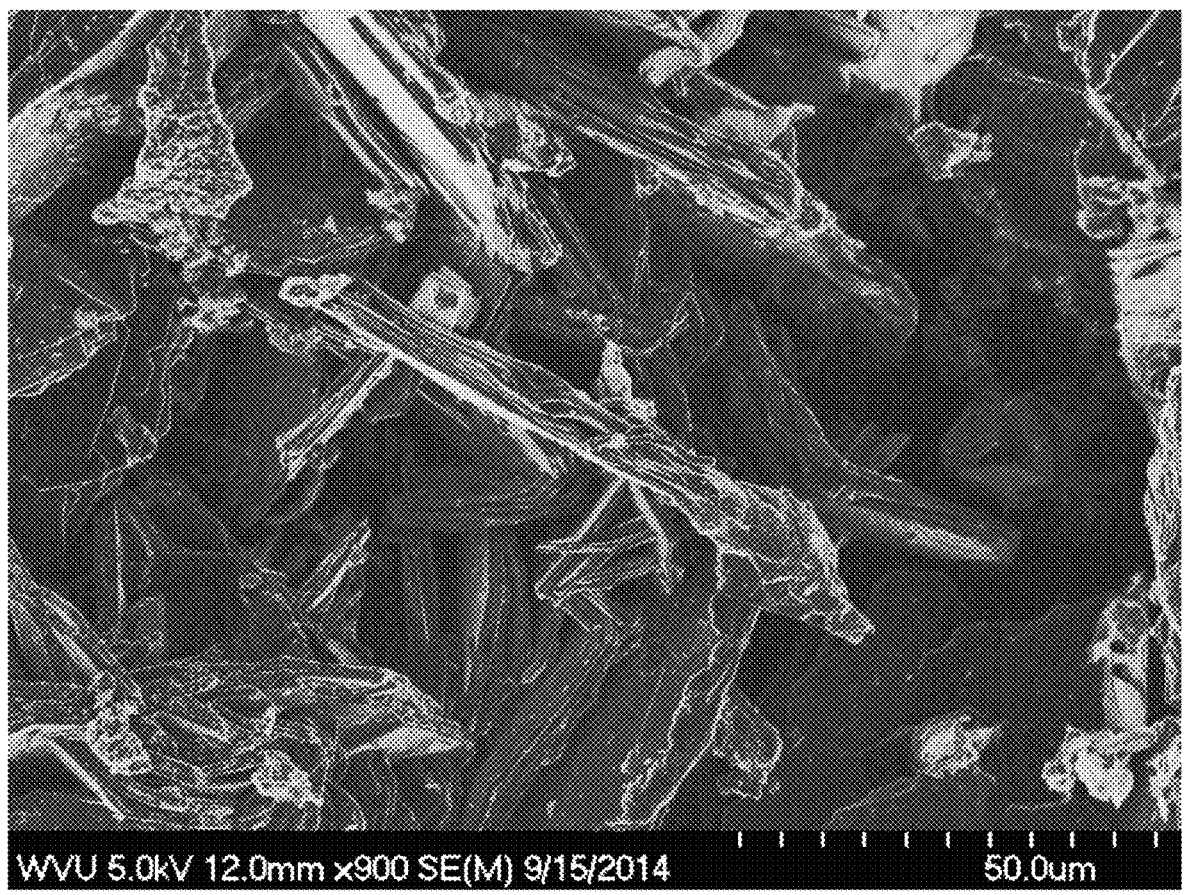
FIG. 8 is a Scanning Electron Microscope (SEM) image showing elemental carbon material reaction product on a bulk material scale (Example 1; zinc). The scale bar is 50 microns.
Figure 9:
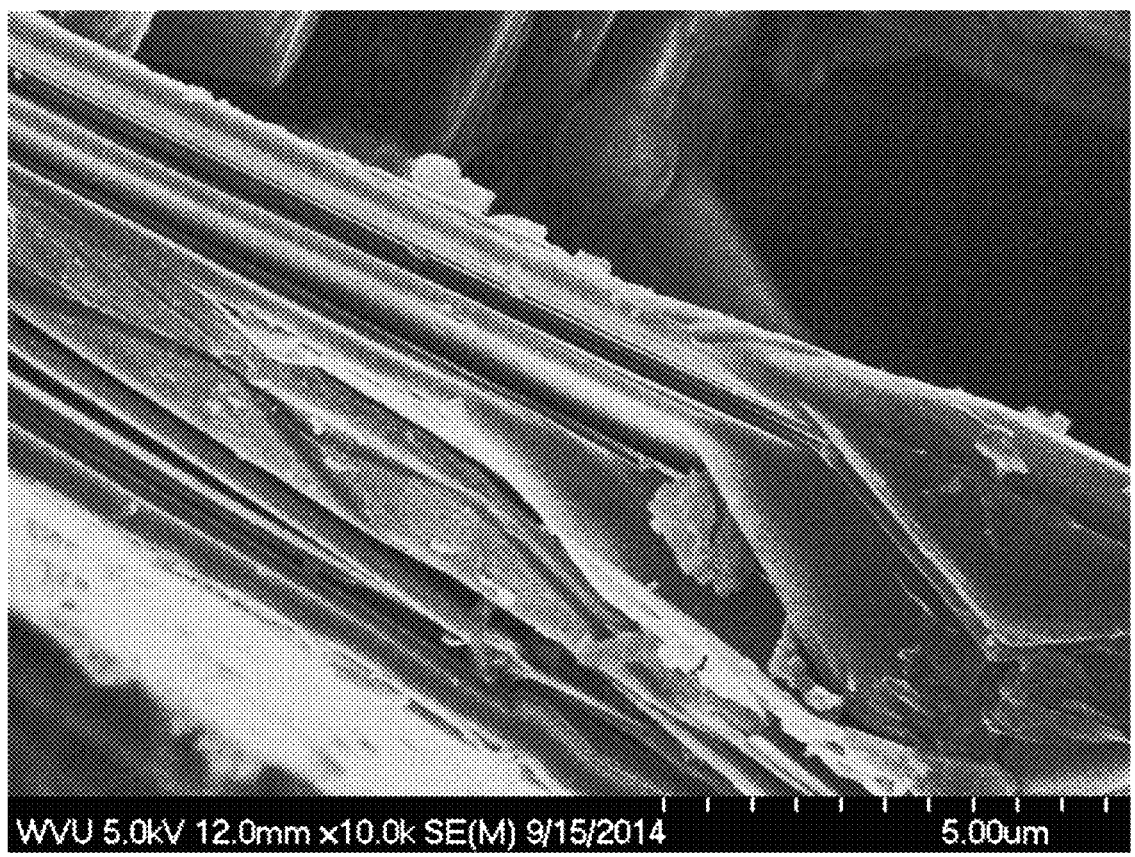
FIG. 9 is an SEM image showing the plate-like structures found in the elemental carbon material reaction product (Example 1; zinc). The scale bar is five microns.
Figure 10:
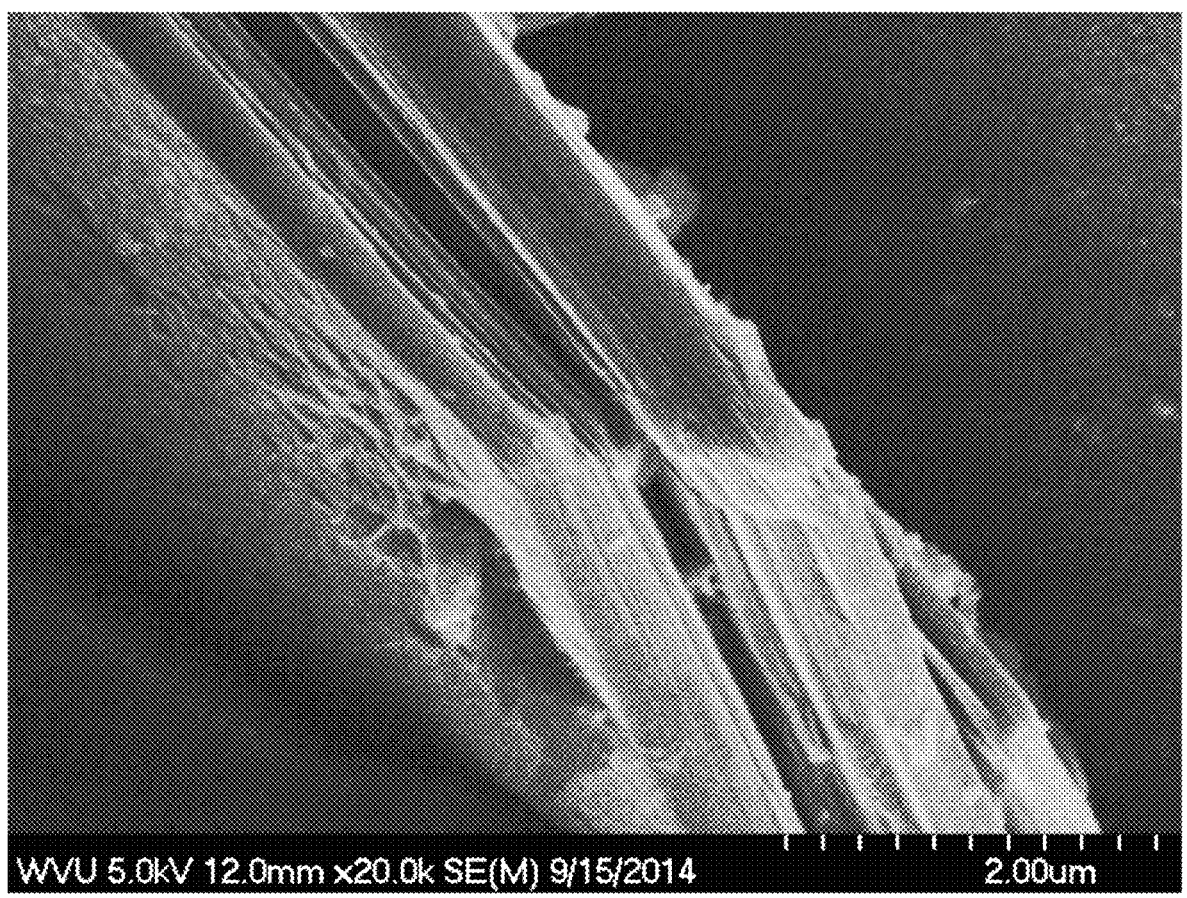
FIG. 10 is an SEM image showing the plate-like structures found in the elemental carbon material reaction product (Example 1; zinc). The scale bar is two microns.
Figure 11:
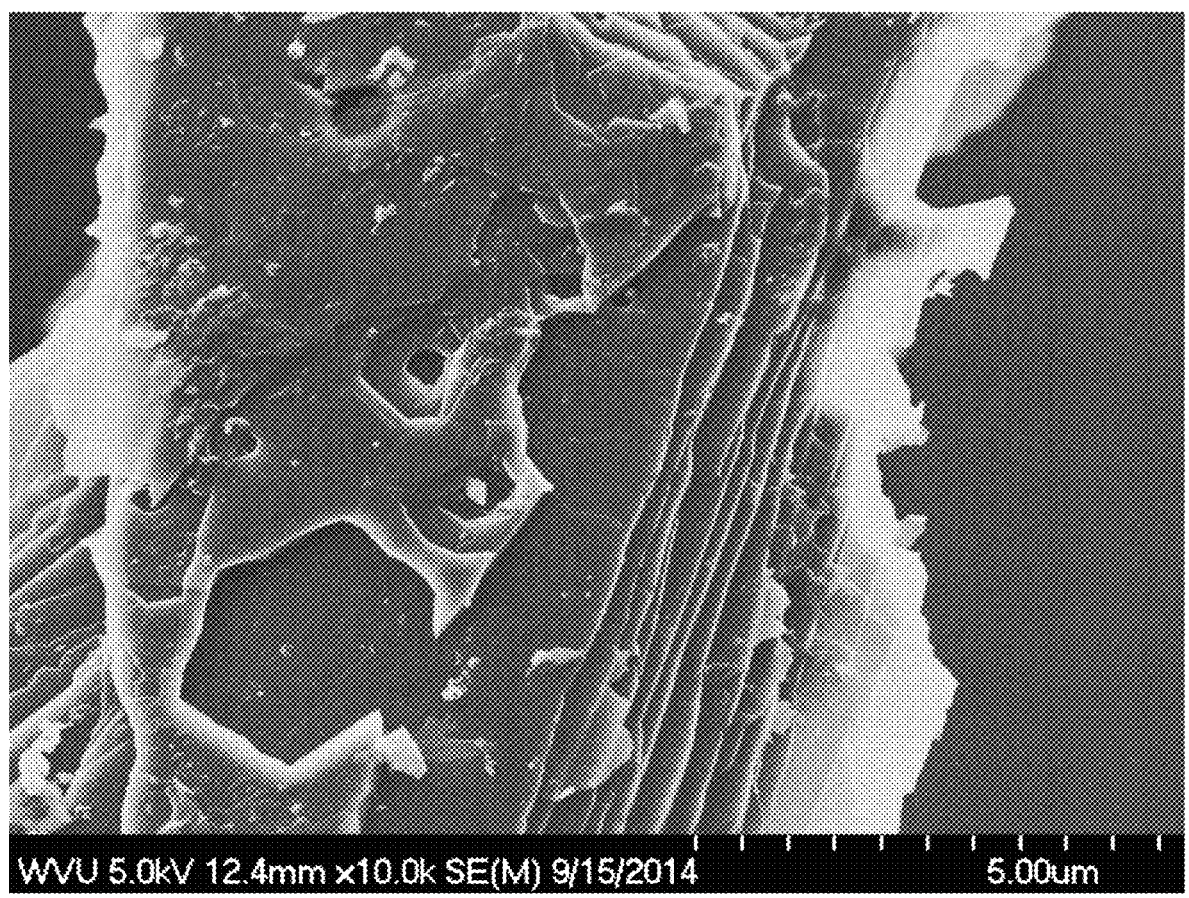
FIG. 11 is an SEM image showing the plate-like structures found in the elemental carbon material reaction product (Example 1; zinc). The scale bar is five microns.

FIG. 8 (50 micron scale bar) shows what the bulk material produced looks like, while FIGS. 9-11 are "zoomed in" portions of FIG. 8 (scale bars of five or two microns), to provide more definitive images of the plate-like structure of the products.

The most striking difference between the SEM images from this Example 1 reaction product compared to the reaction product of the elemental carbon materials prepared by the thermal methods of PCT/US2014/028755 was in the concentration of the amorphous carbon produced. In this thermal method, much of the elemental carbon material product was of an amorphous nature, and it was difficult to see many interesting particles of interest. See, for example, FIGS. 6 and 7. In the present Example 1, in contrast, it was immediately striking the amount of non-amorphous carbon in the sample with many interesting particles of interest.

Another important difference is that in PCT/US2014/028755, the reaction of calcium carbide and zinc chloride was carried out at 425° C., a much higher temperature.

FIG. 17 shows the apparatus used in Example 1.

For product yield, 27.0 g of calcium carbide was added to the holder to begin the experiment. Roughly 0.9 g of elemental carbon materials was recovered as a product. This amount of recovery was expected as the reaction was not allowed to proceed to completion. However, the objective was met to show that elemental carbon material was produced using the galvanic method at room temperature and pressure.

In Example 1, the average voltage was about 20 mV and the average current varied between about 0.5 and about 2.0 µA. Other than fluctuating continuously, there was no real change in voltage and current over the course of the reaction.

Example 2

$CaC_2 + SnCl_2 \rightarrow CaCl_2 + Sn + C$

For Example 2, which was based on tin chloride and tin rather than zinc chloride and zinc, the apparatus was assembled in the manner described in Example 1.

The cells were prepared in the controlled environment of a glove box, free of oxygen and moisture. Several hundred milliliters of dried methanol were prepared by removing the moisture dissolved in the methanol using a molecular sieve. A magnetic stir bar was placed in each cell of the apparatus and the valve on the tube connecting the two cell was closed to isolate one cell from the other.

The first cell was filled with the dried methanol to a height of four inches or one inch above the connecting tube. Stannous chloride anhydrous salt ($SnCl_2$) was stirred into the dried methanol until the solution was saturated. The cell cap, which had been fitted with a ¼" diameter elemental tin rod, was set in place using vacuum grease on the ground glass joint to seal the zinc cell. The bottom of the elemental tin electrode was immersed in the $SnCl_2$/methanol solution.

The second cell was also filled with the dried methanol to height of four inches or one inch above the connecting tube. Calcium chloride anhydrous salt ($CaCl_2$) was stirred into the dried methanol until the solution was saturated. The calcium carbide ($CaC_2$) was then prepared by reducing the particle size of the of the individual pieces to a size of less than one centimeter. The $CaC_2$ was then sealed in the hollow stainless steel mesh sphere of the carbide electrode which had been fitted into the second cell cap. The carbide cell cap was set in place using vacuum grease on the ground glass joint to seal the carbide cell. The mesh sphere containing the calcium carbide was completely immersed in the $CaCl_2$/methanol solution. Tygon tubing was connected to the opened end of the stainless steel tubing on the carbide electrode. A pinch valve was used to completely seal the carbide cell from the environment.

The connected cells, which were successfully sealed and isolated from the environment, were removed from the controlled atmosphere glove box. The connected cells were set in place with the bottom of each cell resting on a separate magnetic stirring plate. The Tygon tubing connected to the top of the stainless steel tube of the carbide electrode was connected to the valve which was further connected to the vapor bubbler filled with methanol. The pinch valve on the Tygon tubing was then opened to the carbide cell. One side of a multimeter was connected to the zinc electrode and the other side was connected to the carbide electrode allowing for the flow of electrons across the cells. The multimeter also permitted the voltage and current between the two cell to be measured.

The reaction took place at room temperature. The vent valve was opened between the carbide electrode and the vapor bubbler to allow any vapor produced to exit the carbide cell. Next, both magnetic stir plates were turned on to agitate the solution in each of the cells. Finally, the valve on the glass tube connecting the cells was opened to allow for ions to flow between the two cells. The voltage and current were measured using the multimeter to ensure that the reaction is indeed proceeding.

After a period of time, which was about 28 hours, the reaction was stopped by closing the valve on the tube connecting the two cells. The multimeter was disconnected along with the Tygon tubing attached to the carbide electrode. The carbide cell cap was removed along with the mesh stainless steel sphere containing the products of the experiment. The products of the experiment were then removed from the mesh stainless steel sphere and treated with 6.0 molar hydrochloric acid (HCl) and then flushed several times with distilled water. The products of the experiment were confirmed to be only elemental carbon using standard analytical methods.

The reaction products were determined to be clearly different from the reaction products of Example 1 and were mainly $sp^3$ hybridized allotropes.

Figure 12:
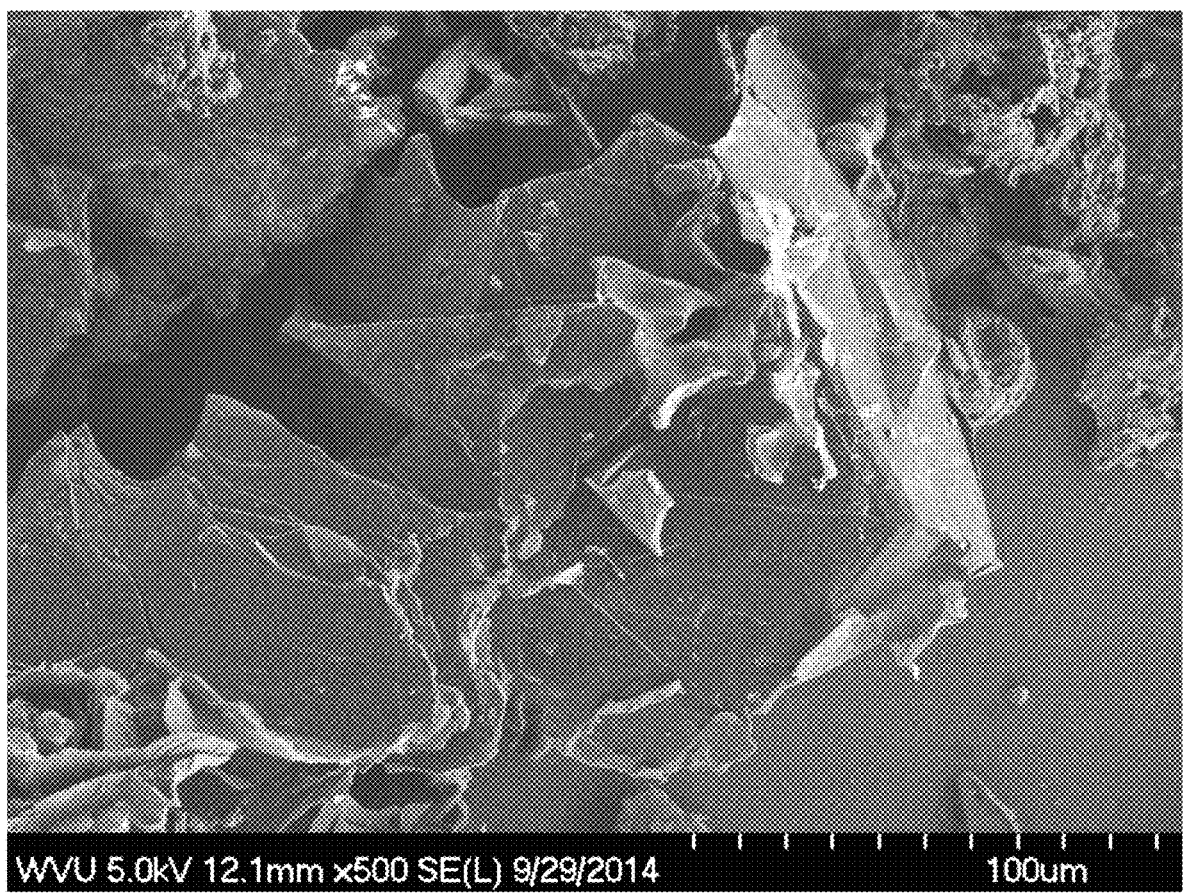
FIG. 12 is an SEM image showing carbon reaction product on a bulk material scale (Example 2; tin). The scale bar is 100 microns.
Figure 13:
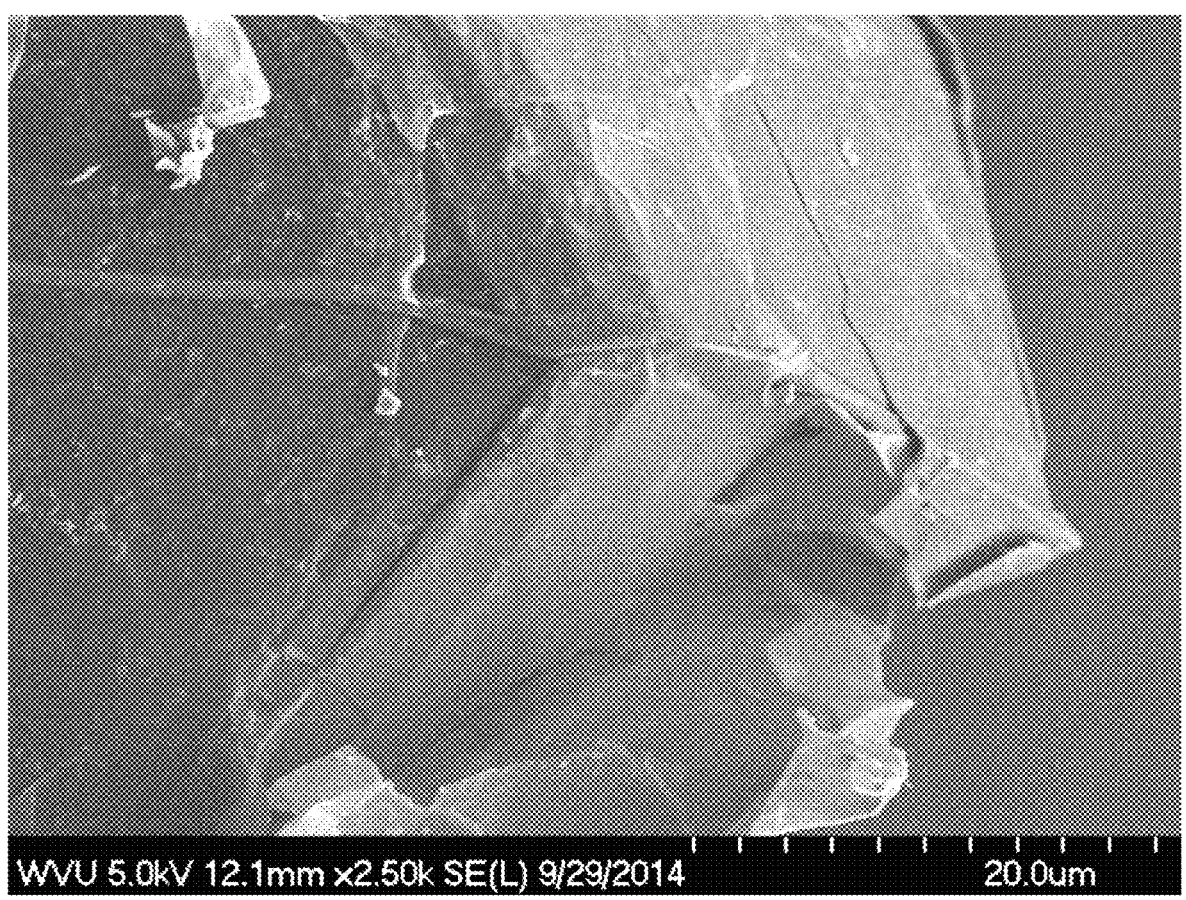
FIG. 13 is an SEM image showing the elemental carbon material reaction product (Example 2; tin). The scale bar is 20 microns.
Figure 14:
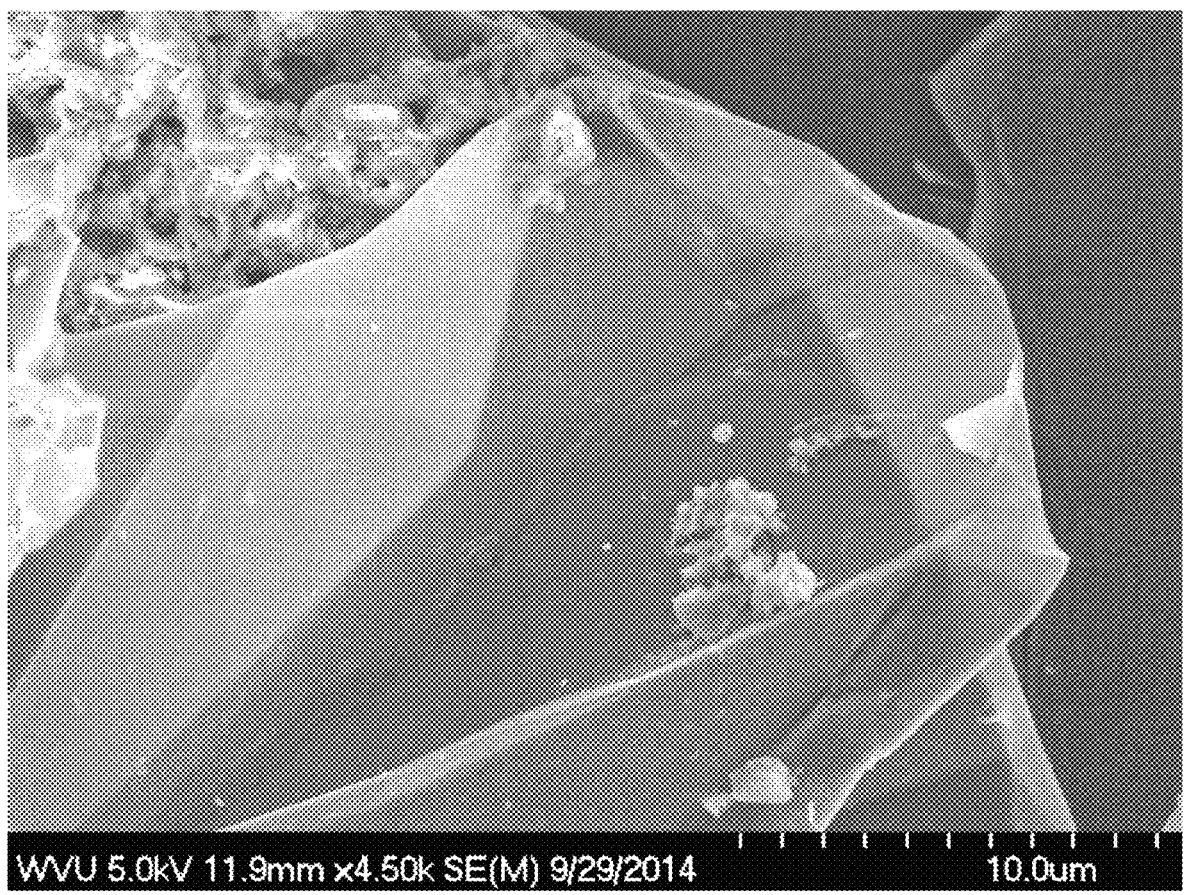
FIG. 14 is an SEM image showing the three-dimensional crystals of elemental carbon material (Example 2; tin). The scale bar is ten microns.
Figure 15:
FIG. 15 is an SEM image showing a three-dimensional elemental carbon material particle (Example 2; tin). The scale bar is 10 microns.
Figure 16:
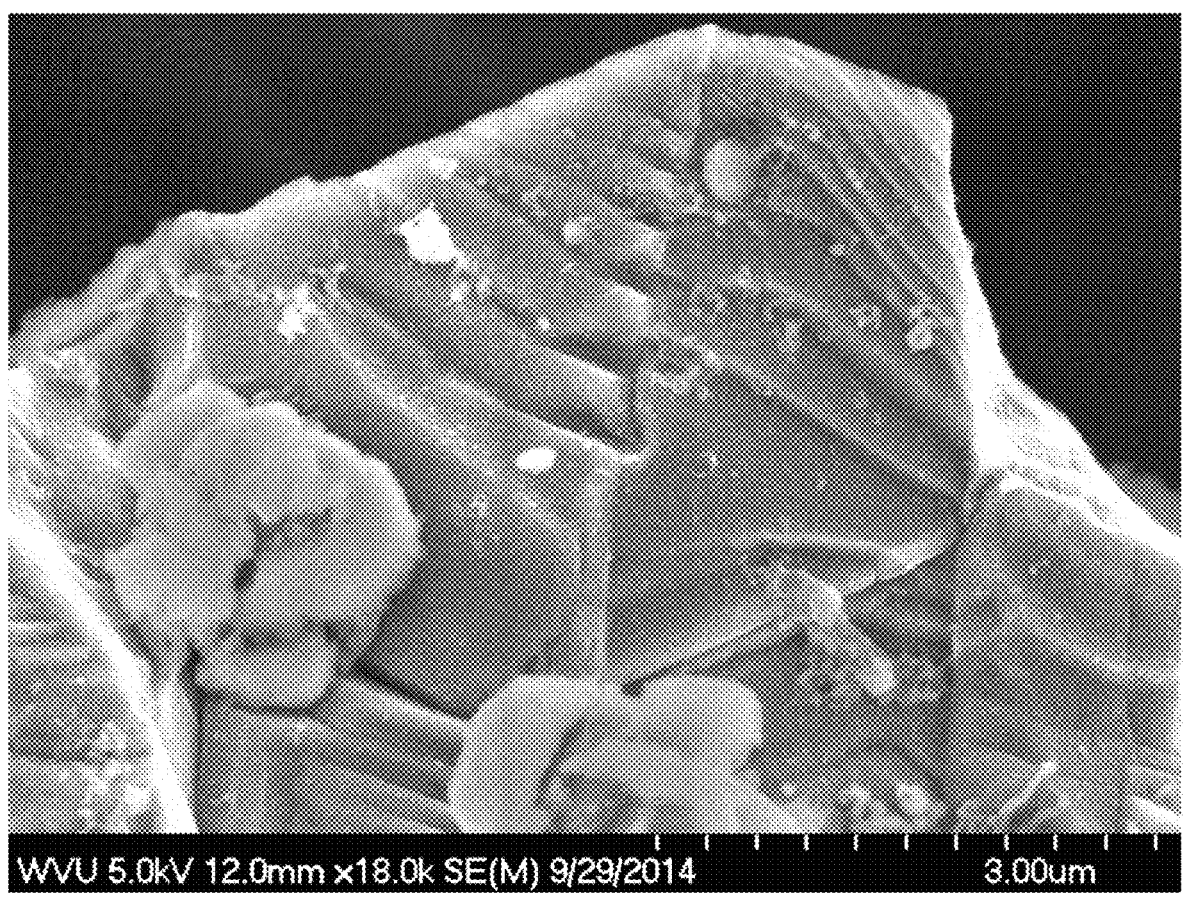
FIG. 16 is an SEM image showing the top region of the three-dimensional elemental carbon material particle (Example 2; tin). The scale bar is 3 microns.

The elemental carbon material reaction products are depicted in FIGS. 12-16. The elemental carbon produced from the tin electrolysis experiments included mainly of three-dimensional solid carbon particles which suggested that the carbon produced was $sp^3$ hybridized. FIG. 12 is a larger scale image of the bulk carbon material produced by this experiment (scale bar, 100 microns). FIG. 13 is a magnified image of the material shown in FIG. 10 that allows the three-dimensional nature of the carbon to be identified (20 micron scale bar). FIG. 14 is an image that shows the 3D crystalline nature of the carbon produced (10 micron scale bar). FIGS. 15 and 16 are of the same particle at two different scales (10 microns and 3 microns).

FIGS. 12-16 demonstrate that the products achieved were 3D structures, as opposed to the 2D stacked plates obtained in Example 1. The sample from which these figures were taken is called Sample B. Again, many interesting particles of interest were present in the SEM images.

In Example 2, a voltage of about 10 mV was generated along with an amperage of about 0.6 µA on average. Again, other than fluctuations there was no real change in the voltage or current.

Examples 1 and 2 employed galvanic cells that used the potential range of the reactions to determine which products could be produced in that potential range. The galvanic cells did not have a voltage source, but merely measured the voltage that exists in galvanic cell during the reaction. The results demonstrate a voltage range that produces specific products, with each specific product being made at a specific voltage that occurred during the reaction. Understanding the specific voltage associated with each specific product can allow for the use of a electrolytic cell, with the voltage controlled to the specific voltage, to produce a pure specific product.

To prove this, Examples 1 and 2 differed only with respect to the elemental metal electrode and cationic solution used, as well as the reaction products produced. As elemental zinc in a $ZnCl_2$ solution has a different chemical potential than elemental tin in a $SnCl_2$ solution, the galvanic cells used in Examples 1 and 2 have very different cell potentials. As such, the total voltage in the cell is different in Examples 1 and 2, creating different products. Products produced in Example 1 were more $sp^2$ hybridized, due to the specific range of cell potentials produced by that reaction scheme. Products produced in Example 2 were more $sp^3$ hybridized, due to the specific range of cell potentials produced by that reaction scheme. Accordingly, Examples 1 and 2 demonstrate that changing voltage, and, therefore, potential in the electrolysis cell can specify the carbon allotrope products produced.

In each of the above Examples, the apparatus used did not include an external voltage source. Accordingly, the voltage between the cells decreased over time. This voltage change likely resulted in variation in the produced material that, in theory, would not be experienced if the voltage was maintained at a constant level.

Example 3

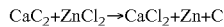

$CaC_2 + ZnCl_2 \rightarrow CaCl_2 + Zn + C$

In this experiment, a significantly larger apparatus was used compared to that of Examples 1 and 2. The apparatus and items used to conduct the processes for Examples 3 and 4 are shown in FIGS. 19-23.

One day prior to the beginning of the experiment, methanol was dried and prepared for the reaction using molecular sieves to dehydrate the solvent. The zinc electrode was then prepared by attaching the basket to the zinc rod and filling it with "mossy zinc" (small nuggets of zinc with higher surface area made by rapidly cooling molten zinc in water). The zinc electrode and basket were then installed in the zinc cell by attaching it to the underside of the zinc cell lid. The containers of zinc chloride were weighed and numbered to determine the weight of zinc chloride used in the experiment.

The calcium carbide was prepared by weighing out four equal portions of 250 grams each (1,000 g total) and placing them in sealed plastic tubs until the calcium carbide was loaded into the carbide electrode. The vapor trap bubblers were filled with dried methanol to prevent any of the oxygen or moisture in the air from entering the cells of the reactor.

A basic cotton filter was inserted into the tube of the salt bridge to prevent solids from transferring across the salt bridge. The cotton filter was used rather than the frit for convenience in scale up.

The carbide and zinc cells were isolated by closing the valves to the salt bridge. All of the other valves were adjusted to load the solvent into the cells. The multimeter was connect to the carbide electrode and the zinc electrode. The multimeter was then connected to a computer where the current and voltage can be recorded.

The container containing the dried methanol solvent was connected to the solvent loading port for the carbide cell using a flexible PVC line designed to easily attach to the system and the carboy. The air to the carbide circulation pump was turned on and the methanol was poured into the system and pumped to the input at the top of the carbide cell. Once the desired level was reached, the pump was stopped and the container disconnected. The valves were adjusted and the pump was turned back on to begin circulating the solvent. The argon sparge was turned on to maintain the inert atmosphere in the carbide cell.

Another container of the dried methanol solvent was then connected to the solvent loading port for the zinc cell. The compressed air was turned on to the zinc circulation cell and the methanol pumped into the cell through the top circulation port. Once the desired level of methanol was reached, the pump was stopped and the solvent loading container disconnected from the solvent loading port. The valves were adjusted and the circulation pump was turned back on to circulate the methanol through the zinc cell. The argon sparge was turned on to maintain the inert atmosphere in the zinc cell. The pressure of the argon feed was adjusted to the proper level at the regulator on the argon gas cylinder.

The solid calcium chloride was then added into the methanol of the carbide reactor. 150 grams of calcium chloride was added to the solvent of the carbide cell. The concentrated solution of $CaCl_2$ in methanol was then added to the carbide cell.

The carbide circulation pump and argon sparge flow rates were both increased to create additional agitation in the carbide cell and aid in dissolving the calcium chloride into the methanol.

The zinc chloride was then added to the methanol in the zinc cell. Roughly 3.5 kilograms total of $ZnCl_2$ was loaded in the zinc cell for the reaction. The $ZnCl_2$ was poured directly into the top of the zinc cell. The zinc cell circulation pump and argon sparge flowrates were both increased to increase the amount of agitation in the zinc cell and aid in dissolving the zinc chloride into the methanol.

Next the salt bridge was filled with solution from each side and the solids filter saturated which permitted ion flow. The carbide cell isolation valve was then opened and the solution was allowed to fill the salt bridge to the solids filter. The vent valve was periodically opened to bleed off any of the air or argon trapped in the line. After several minutes when the solid filter appeared saturated, the carbide cell isolation valve was closed. The zinc cell isolation valve was opened to fill salt bridge with solution on the zinc side of the solids filter. Once again, the valve was left open for several minutes and the vent valve was periodically opened to bleed off any gases.

The calcium carbide was loaded into the carbide electrode. The flexible coupling that attaches the carbide cell lid to the rest of the cell was loosened. The cell lid, flexible coupling, and carbide electrode were lifted from the cell up to a point where the bottom tray attached to the electrode could be loaded. Four trays of 250 g of calcium carbide (1,000 g total) were loaded into the respective locations.

The cell lid, flexible coupling, and carbide electrode were lowered back into place and the coupling resealed to the top of the carbide cell. The argon gas and circulation pump flowrates were adjusted to the desired rates to begin the electrolysis reaction as described more below. The desired rates produced a nice, consistent agitation of the solution.

The multimeter was turned on and the voltage and current verified to be at zero. The chemical reaction was begun by opening the isolation valves for the carbide and zinc cells to permit the flow of ions across the salt bridge. As the pure carbon production reaction and the undesired secondary reaction between the calcium carbide and methanol progressed, a portion of the reaction products exited the trays of the carbide electrode in solid form. These solids eventually settled into the products of reaction trap at the bottom of the carbide cell. As the products of the reaction trap filled with solids, they were drained and the carbide cell was refilled to the same level with the volume of dried methanol that was removed.

The vent valve on the lid of the carbide was cracked open. The solids, along with a small portion of the methanol solution, were drained by opening the valve at the bottom on the carbide cell. The mixture was drained directly from the carbide cell into individual polypropylene tubs designed to be used in a large bucket centrifuge. Once the solids were removed and the drain valve closed, the vent valve on the lid of the carbide cell was closed. Then the container of dried methanol was connected to the solvent loading port. An equal amount of dried methanol as was removed was added using the carbide circulation pump. The container of dried methanol was removed and all valves were properly adjusted to once again circulate the solution.

The reaction was complete when the current reading from the multimeter dropped to zero. This indicated that the electron flow had ceased because all of carbide had been consumed or there was not enough contact between the remaining pieces of carbide and the electrode to sustain a current flow. Once the reaction stopped, the solution and any accumulated solids were drained out of the carbide cell into the individual centrifuge tubs at 750 ml per tub. Each tub was centrifuged with the liquid solution decanted and collected for further solvent recovery operations and the solids containing the pure carbon product remained in the centrifuge tub to begin the cleaning and separation process. The decanted liquid was stored in one gallon containers which will be further processed in the distillation column. During this time, the carbide cell circulation pump continued to run and wash any solids from the cell walls, electrode, and the surface of the unreacted carbide to be removed with the liquid solution.

After the carbide cell was drained, the flexible coupling at the top of the cell was loosened. The lid was raised from the cell and the bottom portion of the electrode containing the carbide was removed. Any unreacted carbide was collected and weighed for mass balance calculations. An acid solution was then applied to clean out the inside of the reactor. Then a small amount of the solvent for the next experiment was circulated through the cell to rinse any of the acid solution away and absorb any water molecules present from the mild acid solution.

The drained material was placed into a centrifuge tub. The centrifuge tub was then centrifuged in the large bucket centrifuge at a speed of 3500 RPM for ten minutes. The solids formed a cake at the bottom of the centrifuge tub and the liquids were decanted off to be further processed in the distillation column. The remaining solids were treated with a 3.0 molar HCl solution. The HCl was allowed to react with the reaction products on a stir plate providing agitation overnight. The solution was then centrifuged.

The solids were then further treated with a stronger HCl solution of 6.0 M. The acid treatment was allowed to proceed for 24 hours. The acid treatment was repeated three times. The remaining solids were transferred from the centrifuge tub into a fine particle size glass fritted using distilled water and mild acid solutions. The glass fritted filter was placed on top of a vacuum flask with a gasket and attached to the house vacuum system to pull the water and methanol flushes through the material and filter. The residual salts were rinsed away by continual flushing of the product with distilled water and methanol. The final flush was performed with methanol so that the product was completely dried before it was removed from the filter and weighed for mass balance.

The reaction solvent was recovered by distilling the solution drained from each of the cells. After centrifugation, the methanol/calcium carbide solution was collected. A portion was loaded into the boiling pot of a distillation column. The solution was heated to a point that the solvent was evaporated from the solution and further condensed and recovered in the collection flask. The remaining concentrated calcium chloride solution was dried to solid calcium chloride and discarded. Calcium chloride was generated by the process.

Once all of the methanol/calcium chloride solution was distilled, the methanol/zinc chloride solution was then distilled. The solvent was evaporated from the solution and recovered in the collection flask.

14.6 grams of pure carbon product was recovered (3.9% yield of carbon). Some the carbon was unreacted and removed as acetylene in the cleaning process. Other carbon was reacted with the methanol in the undesired secondary reaction.

The time of the reaction was about 15 days.

The elemental carbon product from Example 3 was examined by SEM and EDAX and Raman spectroscopy. Stacked plate-like structures were observed. In some cases, the diameter or lateral dimension of the stacks were decreasing continuously so that an exfoliation process should provide graphene plates of different diameters or lateral dimensions. See FIGS. 24-27.

Example 4

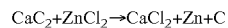

In Example 4, the procedures of Example 3 were generally repeated. However, several changes from the procedures of Example 3 were made prior to the start of the experiment.

The first was that the methanol in the vapor trap bubblers was replaced with vacuum pump oil to prevent evaporation and maintain the barrier between the inert atmosphere of the reactor and the atmospheric conditions inside the laboratory. The second change to the apparatus was to remove the solids filter in the salt bridge and replace it with more substantial solids filters. Instead of the loose cotton filter, two discs were cut from a sponge to fit snugly inside of the connection tube. The loose cotton was then compressed between the two discs which completely prevented the migration of the solids from the carbide cell to the zinc cell. Once the reaction began, there was no observable decrease in the current from the initial experiment.

The methanol was replaced with vacuum pump oil in the vapor trap bubblers because the methanol can evaporate overnight and the barrier between the inside of the reactor and the atmosphere can be broken. As described below, the more substantial solid particle filter was added to the salt bridge to better prevent solid material from migrating from one cell to the other.

Additionally, the solid calcium chloride was dissolved in dried methanol before introducing it into the carbide cell.

After the reaction was stopped and the carbide cell drained, the carbide remaining in the electrode was removed and processed to determine if there was any pure carbon product retained in the carbide. The remaining carbon products on the carbide were removed.

The carbide cell circulation piping was also connected to the vapor vent valve on the salt bridge. When the solids were flushed from the salt bridge there was no change to the current or voltage of the system further indicating that the temporary change of flow did not affect the reaction. The electrolysis reaction was stopped after 17 days.

19.1 grams of pure carbon were recovered (5.1% yield for carbon).

The elemental carbon product from Example 4 was examined by SEM and EDAX and Raman spectroscopy. Stacked plate-like structures were observed. Hexagonal structures and flat surface structures were observed. See FIGS. 28-31.

Figure 32:
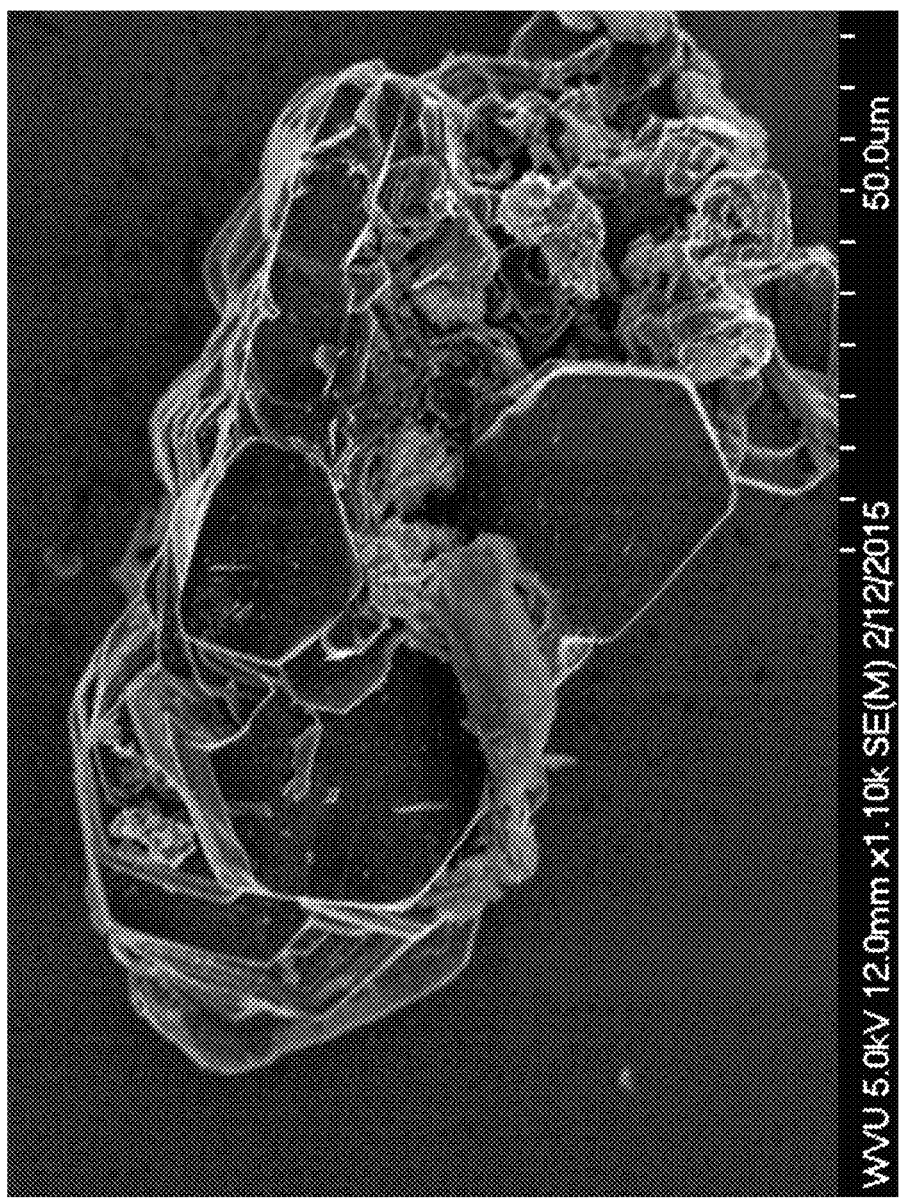
FIG. 32 is an SEM image showing more of the elemental carbon material of Example 4 (scale bar, 50 microns).

FIG. 32 is also an SEM image (scale bar, 50 microns) produced from Example 4. It is a composite particle of elemental carbon or graphene-like plates. It appears to be a fused together particle of smaller individual hexagon shaped stacks of graphene-like plates.

Example 5

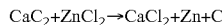

$$CaC_2 + ZnCl_2 \rightarrow CaCl_2 + Zn + C$$

This example was carried out using the same apparatus as used in Examples 3 and 4 with the exception being the solvent used in the reaction. The methanol used as the solvent was replaced with ethanol. Ethanol reacts with the $CaC_2$ at a much reduced rate relative to reaction of methanol with $CaC_2$. However, the solution of the salts in ethanol is less conductive than in methanol and, therefore, the rate of the desired elemental carbon producing reaction was also reduced. Because of the decreased reaction rate, the reaction time of Example 5 was allowed to proceed for 27 days which produced some large particle size pieces of elemental carbon material.

After the reaction portion of Example 5 was complete, it was discovered that an undesired zinc hydrate material was dissolved in the solvent of the carbide cell. When water was added, the undesired material precipitated out of solution and produced a gel-like material. This undesired material complicated the cleaning process. In addition, a more rigorous cleaning produced was used to ensure that most, if not all, of the contaminants were removed. Furthermore, the material produced was classified into a fine, middle, and large cut based on a need to produce smaller particle size product for a characterization analysis.

Summary of the Cleaning Process for Example 5:

After the reaction was complete, the valve on the salt bridge was closed isolating the two cells. Roughly 3 liters of the solution from the carbide cell were drained into six separate centrifuge tubs for the large bucket centrifuge. The solution was centrifuged no solid material was forced out of solution. Water was then added to the first time and a material precipitated immediately. This was later identified as a zinc hydrate compound. This undesired zinc hydrate precipitated immediately upon contact with water and was very difficult remove and separate from the other products of reaction. The goal would be to isolate the product from the solution before it has a chance to precipitate. This was done by first decanting off the solution from the products of reaction. Dried ethanol was immediately used to immerse the products so any residual solution would not react with the moisture in the air and form the undesired zinc hydrate material. This action was repeated several times with dried ethanol in order to dilute and flushed away any of the residual solution and eliminate the formation of the undesired zinc hydrate.

The zinc hydrate did form to a small extent due to short exposure times to the air. The only thing it had responded to is concentrated or 13.0 M hydrochloric acid. The effort was made to use only the standard cleaning and separation chemicals to deal with this undesired material. The next step was to dissolve away any of the unreacted calcium carbide. Based on the material remaining, there was a large amount of the calcium carbide left unreacted. Acid solutions were mixed with the unreacted products of reaction to react away the calcium carbide. This treatment also remove any residual salts. The remaining product is a high percentage of elemental carbon greater than 90%.

Additional operations were performed in order to further remove any residual materials or contaminants an increase the percentage of elemental carbon and the product. Operations were also performed to separate the product into three distinct particle size cuts. The remaining products are separated into several different beakers. Several more rinses were performed with HCl. The supernatant liquid was decanted through a 4.5-5.0 μm glass fitted filter. After several additional acid treatments, the products of reaction were then split into only a few beakers and the products immersed in dried ethanol. These beakers were placed in the ultrasonic bath and left for several hours. The beakers were removed from the ultrasonic bath and placed on stir plates for roughly 10 minutes. The beakers were removed from the stir plate and allowed to sit for a length of time and allow the product to settle out of solution based on and particle size. The supernatant liquid was then decanted through the glass fritted filters. The solids retained by the filters were then separated and collected representing the fine particle size cut of the product. This action continued numerous until the product was sufficiently cleaned and separated into three distinct particle sizes.

The procedures below describe in more detail various cleaning and classifying procedures for this experiment.
Rigorous Cleaning and Classifying Procedure:

The process of cleaning the carbon produced in Example 5 was complicated by the formation of a zinc hydrate material as an undesired product. This phase of the experiment in Example 5 started with all of product distributed between five one liter beakers and one larger three gallon bucket with lid.

The three gallon bucket contained all of the solvent drained from the electrolysis reactor where the solvent also contained the small particle size (fine) carbon material. The bucket was left undisturbed for several days allowing the fine carbon to settle out of solution. Normally, the fine carbon would be separated out of the solvent using a large centrifuge. But for this experiment, the enhanced gravity of the centrifuge was unable to force the solids from the solution. From past experiments, it was learned that that fine material that could not be recovered via centrifugation would eventually settle out of solution if left undisturbed.

The five one liter beakers contained all of the solid product that remained in the solid contained in the baskets of the carbide electrode. They also contained all of the other non-carbon material from the electrolysis reaction after the unreacted carbide was treated with one concentrated HCl treatment. The solutions in the beakers also contain any of the undesired zinc hydrate material remaining from the reaction. The first objective was to separate and recover the maximum amount of product in most time efficient method possible so the product could be treated with HCl for a second time with all (or the vast majority) of the undesired zinc hydrate material finally removed.

The apparatus used for separating the solid product from the solution was a fine particle size (4.0-5.5 micron) glass fritted filter placed on top of a two liter vacuum flask. A gasket was place under the filter using vacuum grease to seal it to the vacuum flask. The flask was connected to the house vacuum system to pull a vacuum inside of the flask which, in turn, pulls the liquid and ions in solution through the filter leaving a solid that had a much greater concentration of pure carbon product.

1. Set-up of the Equipment to Perform the Cleaning/Separation:

Prior to setting the filter/vacuum flask apparatus, the glass fritted filters were all thoroughly cleaned to provide an opened filter for the greatest flow rate of the solution through the filter. This was accomplished by cleaning the filter with the laboratory glass cleaner and then placing the filters in the furnace overnight at 500° C. in an oxidizing environment which reacts any material entrained in the filter to produce ash. The underside of the filter was then subject to vacuum and flushed with methanol to rinse any of the now smaller particle size ash out of the glass fritting.

Cleaning the glass fritted filters using this cleaning/oxidation/rinsing method were performed on a regular basis at the end of each day while previously cleaned filters were rotated in. This increased the efficiency of the filtering process by maintaining as high of flow rate through the filters as possible given the situation.

Four of the filter/vacuum flask system were set up and filtering process to begin the filtering process from the first HCl treatment. The undesired zinc hydrate material forms a gel like substance. The gel settles on the surface on the glass fritted filter which partially or completely blinds the filter. A blinded filter means that something (the zinc hydrate gel) is preventing or greatly restricting the solution from being pulled through the filter. This is why it was so important to finally remove all of the zinc hydrate and allow the product to be properly cleaned. The solid product is also pulled to the surface of the filter which also acts to blind the filter.

Two of the four filter systems were started, and as expected the flow rate through the filters was very low, only a drop or two every few seconds. One way to increase the rate of transfer through the filter was to continually move the blinding material from the glass fritted surface using glass stirring rod or rubber laboratory spatula. An additional option is to add concentrated HCl (the other chemical use on a regular basis in the process which dissolved the zinc hydrate gel) directly to the filter. But this method is only effective for the filter blinding due to the gel and does not help with blinding from the fine product material in the filter.

One goal was to isolate smaller particle graphene materials (under 20 microns) for further testing in products. Therefore, another object of the cleaning and separation procedure is to separate the product by particle size and supply the finer cut of the carbon for product testing of Example 5 product. So in addition to cleaning and purifying the product, the next few steps will begin the process of separation by particle size.

In addition to separating out the finer carbon for further product testing, the particle size separation is important for Example 5 because it appears that there are several pieces of very large product. Another object was to separate out the very large pieces (on the scale of one to two centimeters) for further evaluation and analysis to control better the growth mechanism of the pure carbon product using the electrolysis reaction.

Two additional one liter beakers were used to decant off the supernatant liquid containing a smaller amount of the fine carbon product. Smaller amount means the percentage of solids per volume of supernatant liquid.

Any of the solids leaving the beaker with the decant solution will include the smaller particle size carbon material. Since the product is mostly pure carbon at this point the specific gravity for the solids should be fairly consistent. This means that the settling rate of the material is controlled by the particle size. The smaller the particle, the smaller percentage of the forces acting on it will be gravity. Therefore, as settling time increases, smaller and smaller particle size solids will remain suspended in the solution.

2. Processing the Gel-Like Clumps of Material:

Several of the beakers contained a large 'clump' of the gel suspended in the supernatant liquid which also had product entrained. These clumps were decanted one at time into the first of the one liter decant beakers. Once the clump was isolated in the beaker it was treated with additional concentrated HCl and agitated for as long as need to dissolve the undesired zinc hydrate clump.

Once dissolved, the contents of the first decant beaker were added to the filter and the solution allowed to be separated away. The filters only hold a maximum of 150 ml so the contents of the beaker were continually added during filtration until the entire contents of the beaker were filtered.

Any of the residual material remaining in the beaker was transferred to the filter using methanol. Furthermore, the solids were flushed several times (between 2-4 times) with methanol to remove impurities from the surface of the material prior to the second acid wash. It was important to use methanol instead of distilled water because water can react to form additional small amounts of the gel substance.

After the material was dried from the vacuum, it was transferred into the fine carbon collection beaker using the spatula and methanol. This fine carbon beaker also contained concentrated HCl for the second acid wash. The filter was put aside to be cleaned and oxidized while a fresh, cleaned filter was sealed to the vacuum flask to process the next dissolved 'clump' of gel-like material containing solids.

The steps in this section were repeated until all of the 'clumps' of the gel like material have been processed and the product recovered for the second acid treatment.

3. Processing the Supernatant Decant Solution and the Products it Contains:

In addition to processing the gel-like material, the rest of the supernatant liquid containing the finer particle size carbon product was being processed simultaneously. This section of the cleaning/separation process requires the largest volume of the supernatant liquid to be processed which is the most time intensive part of the filtration due to the partial blinding of the glass fritted filters. So the main object for this step was to recover the maximum amount of solid product while removing most if not all of the undesired zinc hydrate in the most time efficient method.

The second decant one liter beaker was used and a third decant beaker was added. This step began by decanting the supernatant while fine solids from the five original beakers. All of the beakers that did not contain any of the gel like clumps were decanted into the second decant beaker and allowed to sit overnight for the solids to settle.

After the 'clumps' where removed from the other beakers, they were then decanted into the third decant beaker the following day and allowed to settle overnight. The large clumps were not in this step, but the undesired zinc hydrate was still present in the solution so the filter blinding from the gel was still a problem. But main factor in the flow rate through the filter was now the blinding due to the fine particle size solids. This is why the decant beakers were allowed to settle overnight. Much of the supernatant solution could be processed through the filters with only minimal amount of the solid product available to blind the filter.

After the solids had settled, the solution was continually added to the filters. This step processed at a reasonable rate as long as the majority of the solids were retained in the decant beakers but still took several days to complete. The blinding was managed in the same manner as the previous step where the filter surface was exposed using a glass stirring rod and rubber spatula. Concentrated HCl was also added directly to filter to dissolve any the gel like material forming on the surface of the filter.

Due to the volume of solution, there were several instances where the filter became totally blinded, meaning that the flow rate through the filter dropped to zero. In this case, the contents of the filters were transferred back into the decant beaker using methanol and allowed to settle. A clean filter replaced the blinded filter and the process continued. The blinded filter was cleaned and oxidized to be used later.

This step proceeded by processing one of the decant beakers while the other was used to collect material as to allow the solids to settle. The next day, the settled beaker was processed.

Once the volume of the filter was filled with anywhere between 10%-40% with solids (depending of the flow rate of solution through the filter), the solids were flushed several times with methanol to remove any residual material from the surface of the material. The solids where then transferred in the fine carbon beaker along with the material from the 'clumping' process step to wait the second acid treatment.

The steps in this section were repeated until all of the decanted material was processed.

4. The Second HCl Acid Treatment and Alcohol Rinses of the Fine Carbon Product:

Once all of the decanted products where processed into the fine carbon beaker, it was filled with concentrated HCl, agitated on a magnetic stirring plate, and allowed to react for 40 hours.

After the HCl treatment, the solids were allowed to settle overnight to minimize the time required to filter the large volume of liquid.

The entire contents of the fine carbon beaker were filtered using the same methods as the previous steps using multiple filter/vacuum flask systems.

Once the solid material was mostly dried from the solution in the beaker, it was flushed and agitated in the filter with roughly 100 ml of methanol anywhere between 8-12 times. This removed most if not all of the impurities from the surface of the pure carbon products.

After the fine carbon product solids had dried in the filter under vacuum, it was transferred into a 600 ml Berzelius tall form beaker for additional cleaning and refining steps. At this point, the fine cut should only contain the pure carbon product with trace amounts of impurities, most of which may be trapped in between the stacked sheets of graphene.

5. Processing the First HCl Acid Treatment of the Coarse Carbon Product:

The coarse, or larger particle size cut, of the pure carbon product is still contained in the five original one liter beakers immersed in a volume of the solution just great enough to cover the solid material. At this point, most of the mass of product is contained in this coarse cut in the five separate beakers. Although much of the material needs to still be filtered from the first HCl treatment, the time required should be about the same since there is much less supernatant liquids that must pass through the glass fritted filter. In addition, the particle size of the solids is greater, so the blinding due to the solid material should be less of problem than with the finer cut of the solid product.

The solids, along with the supernatant liquid, were transferred into a filter. Methanol was used if needed to transfer any of the material from the beaker into the filter. The volume of the filter is filled between 30%-40% with solids and the supernatant allowed to separate through the filter.

After the material in the filter had partially dried, it was flushed and agitated with roughly 100 ml of methanol and allowed to filter. The methanol flush was repeat between 3-4 times. At this point the solid should contain a high concentration of pure carbon material.

The solids where transferred from the filter into a clean one liter beaker to await the second HCl treatment.

All of the remaining solids in the five original beakers were processed using this method. The volume of material was large enough that two one liter beakers were needed for the second HCl treatment of the coarse cut of the carbon product.

6. The Second HCl Acid Treatment and Alcohol Rinses of the Coarse Carbon Product:

The two beakers containing the coarse cut of solids from Example 5 were filled with concentrated HCl, agitated on a magnetic stirring plate, and allowed to react for roughly 40 hours.

After the HCl treatment, the solids were allowed to settle overnight to minimize the time required to filter the large volume of liquid.

The entire contents of the coarse solids beakers were filtered using the same methods as the previous steps using multiple filter/vacuum flask systems.

Once the solid material was mostly dried from the solution in the beaker, it was flushed and agitated in the filter with roughly 100 ml of methanol anywhere between 8-12 times. This removed most if not all of the impurities from the surface of the pure carbon products.

After the fine carbon product solids had dried in the filter under vacuum, it was transferred into a single one liter Berzelius tall form beaker for addition cleaning and refining steps. At this point, the coarse cut should only contain the pure carbon product with trace amounts of impurities, most of which is probably trapped in between the stacked sheets of graphene.

7. Sonication Treatment and Settling Rate Separation of the Pure Carbon Product from Example 5:

Sonication is the method of applying sound energy to a system, in this case applying sound energy to a beaker filled with a solution containing solid particles including stacks of two dimensional sheets. Sonication is a widely used method of agitating and dispersing solutions containing solid particles. It is also a technique used to disperse commercially purchased graphene, which arrives as large pieces of agglomerated graphene sheets. This agglomeration is normal as the graphene sheets dry.

For the Examle 5 cleaning and separation process, the solids in the fine particle and coarse particle beakers were immersed in methanol and the beakers suspended in a Cole-Parmer 8854 Ultrasonic bath. In addition to dispersing the solids, it is believed that the ultrasonic energy with solids immersed in the low surface tension methanol will allow the liquid to penetrate the areas between the graphene sheets to a greater extent. The penetration of the methanol between the graphene sheets will dissolved and remove more of the calcium ions and other impurities remaining in the final carbon product.

Another possible advantage of the sonication treatment of the product is the exfoliation of the graphene sheets. There has also been research into graphene exfoliation using various solvents. So it was expected that exfoliation during the sonication treatment will occur but it was unclear to what extent exfoliation will occur. If the graphene sheets are exfoliated, then removing any impurities from between the sheets while they are stacked will become much more effective and efficient. Furthermore, exfoliated graphene can be laid down as a film, and the quality of the material produced can be more accurately assessed.

In addition to the sonication treatment, the solid material was also separated by particle size during this section of the process. When the beakers were removed from the ultrasonic bath, they would be agitated using a magnetic stirring bar. The agitation would be stopped and the supernatant liquid with suspended solids would be decanted into a beaker or directly into the glass fritted filter. There was usually a brief amount of time (no more than a few minutes) to allow for the larger particles to settle out of the supernatant solution. During the few moments of settling, any larger particles that were suspended in the solution during agitation settled to the bottom of beaker before the smaller particles which stayed suspended for a long period of time. Therefore, the solid particles suspended in the supernatant solution would be the smallest particle size material on average. This is how the particle size separation for the carbon material produced was accomplished.

The following is the procedure used for sonication treatment and particle size separation of the solid material from Example 5:

Both the fine particle size and coarse particle size beakers were suspended in the ultrasonic bath. By suspended in the bath, they were held in place using an adjust laboratory clamp. The beakers were filled roughly half way with methanol.

During the first day, the ultrasonic bath was allowed to run for one hour. The beakers were periodically agitated during this hour to rearrange which solid particles were closest the glass surface of the beaker or closest to the source of the sonic energy.

The beakers were removed from the ultrasonic bath, dried off, and placed on magnetic stirring plates. The solid particles were agitated for 10-15 minutes. The beakers were then removed from stirring plates and placed back into the ultrasonic bath for another hour. This process was repeated several times for an entire day.

At the end of the day, the beakers were placed in the hood and the solid particles allowed to settle overnight.

The next morning, the supernatant liquid which contained almost no solids was decanted into two separate filters, one for the fine particle size carbon and one for the coarse particle size carbon.

The beakers were filled about half way with methanol and place in the ultrasonic bath for further sonication treatment.

At this point, the treatment of the two beakers diverges. Both beakers of material will still continue to receive sonication treatments, but the smaller particles suspended in the supernatant liquid of the coarse solid beaker will be decanted prior to allowing the particles to settle out of solution. The decanted solid particles of carbon product from the coarse beaker will then be filtered and flushed with methanol before being added to the fine particle beaker for continued processing. This process allows the smallest carbon particles (on average) from the coarse portion of the product to be removed and added to the fine portion of the product. The separation will not be perfect, but the majority of the finest carbon product will be contained in the fine particle beaker.

After one hour in the ultrasonic bath, the coarse beaker was removed and placed on the stirring for several minutes. The coarse beaker was then removed and allowed to settle for several additional minutes.

The solids and supernatant liquid were then decanted into the filter. The liquid was to transfer through the filter leaving behind the solids.

Once the solids in the filter were partially dried from the vacuum, they were flushed 3-4 times with methanol to remove any residual contaminates from the surface.

After the fine cut of solids from the coarse beaker were flushed, they were transferred into the fine particles beakers.

The decanted coarse beaker was then partially filled with methanol and placed back in the ultrasonic bath. The sonication energy continued to disperse the solids allowing the smaller particles to become suspended in the solution. These particles can continue to be separated out until the smallest particle size material is transferred from the coarse particle beaker into the fine particle beaker.

This process is continued until the agitated particles in the coarse beaker settled out of solution very quickly (almost immediately). This indicated that the smallest particle size solids have been removed from the coarse cut of the product into the fine cut of the product.

The objective behind this separation technique was to generate a reasonable amount of pure carbon product mostly of the finest particles size. This was to prepare a fine particle size product for further product testing consisting of material subject to an extensive cleaning process to remove contaminates.

Over the several days of the particle size separation, the fine particle beaker continued to receive sonication treatment.

Every 2-3 hours the fine solids beaker was removed from the ultrasonic and allowed to settle for roughly 15 minutes.

The supernatant liquid was decanted into a filter/vacuum set-up. After the liquid was removed, any solids were flushed several times with methanol and then added back to the fine particle beaker for further sonication treatment.

When the particle size separation was complete, the entire contents of the fine particle size beaker were transferred the several filters. In each of the filters, the fine particle size carbon product was flushed several time with methanol and allowed to dry from the vacuum.

Once the solids in the filters were dry, they were placed inside in the drying oven at 105° C. to drive off any remaining methanol or other moisture.

When the product was completely dried, the filters were removed from the drying oven and allowed to cool.

The product was weighed and transferred to a Fine Particle Size Carbon Product sample container.

Characterization of the large piece of product of the elemental carbon material reaction product is further shown in FIGS. 33-45.

Figure 33:
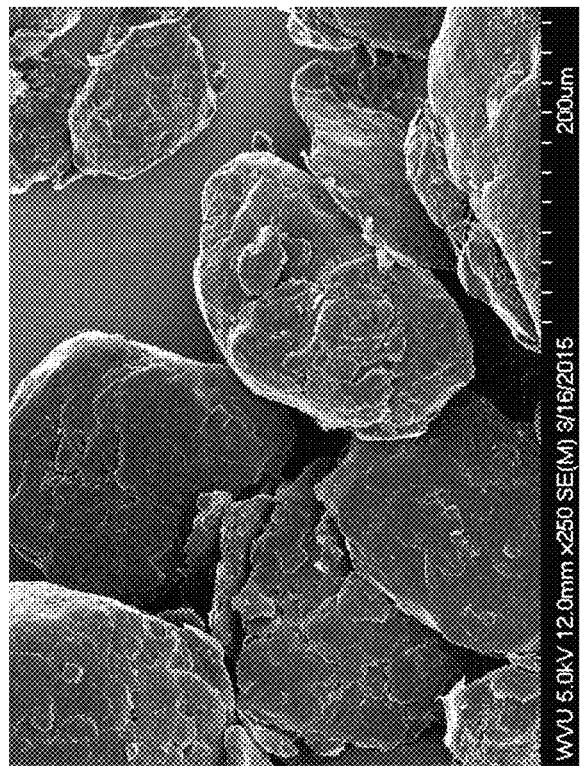
FIG. 33 shows a comparison for a large piece of elemental carbon material from Example 5 (33 left) with a commercial graphene product having relatively smaller pieces (33 right), each with a 200 micron scale bar.
Figure 33:
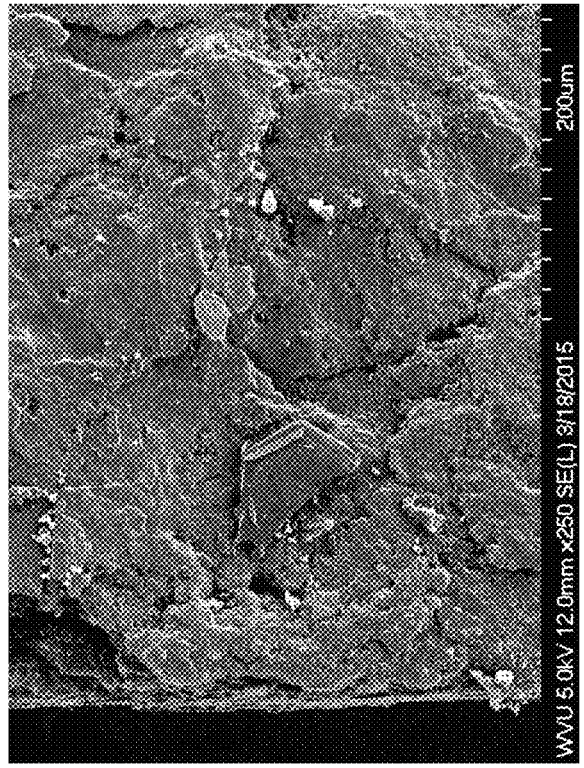

FIG. 33 shows a comparison between the very large piece of Example 5 and commercial graphene of much smaller size.

Figure 34:
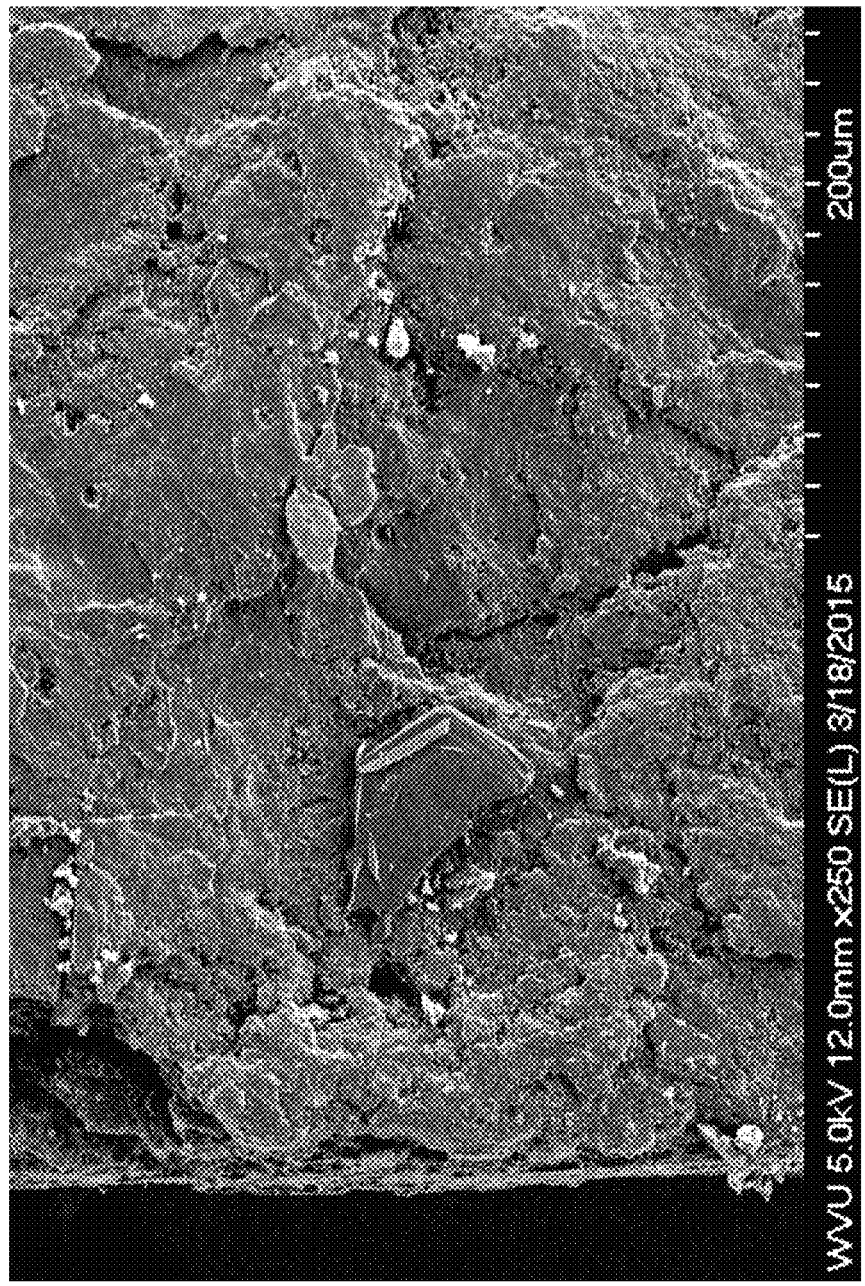
FIG. 34 is an SEM image showing a top view of a large piece of carbon product (Example 5, Sample C) (scale bar, 200 microns).

FIG. 34 is a first SEM image showing a top view of a large piece of carbon product (Sample C) (scale bar, 200 microns). FIG. 34 shows a magnified image of a piece of large graphene produced in Example 5. The image shows the edge of the solid piece that extends beyond the range of the image. It also shows a fragment of a hexagon shaped piece of elemental carbon. It is typical to find elemental carbon hexagons with a cross-sectional area of roughly 50 µm. This is roughly the cross-sectional area of the fragment seen in the picture and is used along with the edge of the piece to give a representation of the large scale of this carbon piece in an SEM image.

Figure 35:
FIG. 35 is an SEM image showing Sample C with a perspective view (Example 5, scale bar, 200 microns).

FIG. 35 is a second SEM image showing Sample C with a perspective view (scale bar, 200 microns).). FIG. 35 shows the edge of the elemental carbon piece seen in FIG. 34. With the naked eye, one could see that the large elemental carbon pieces produced in Example 5 had a two dimensional shape. FIG. 35 shows the edge or the depth of the two dimensional piece. It also shows that the solid piece appears to be made up of individual sheets of elemental carbon or graphene.

Figure 36:
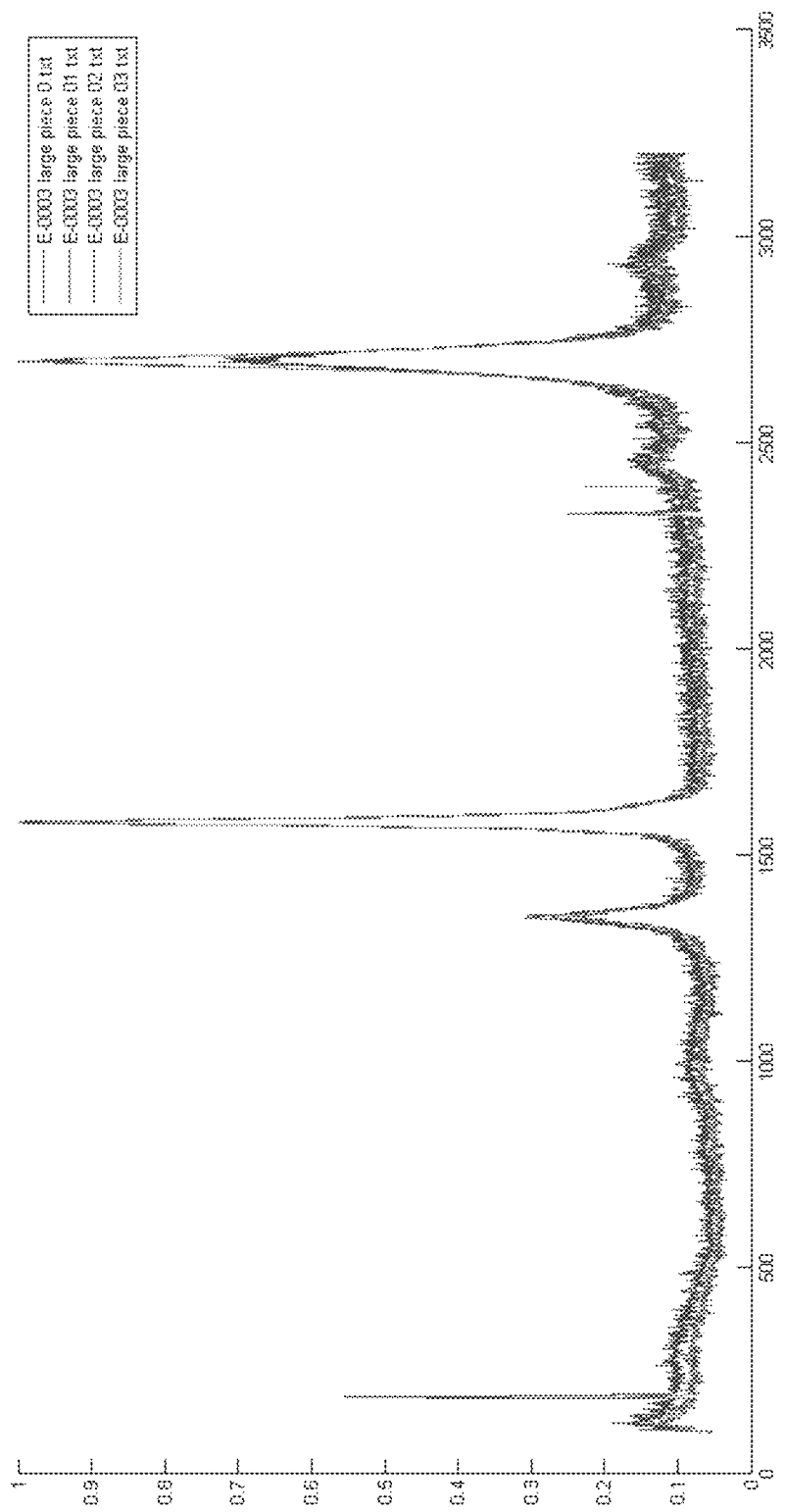
FIG. 36 is a Raman spectrum (four traces) for Sample C (Example 5).

FIG. 36 shows Raman spectra for Sample C. These are Raman spectra generated from different samples all overlaid on top of one another. The G peak and the 2-D peak are roughly the same height. This is unique because other Raman spectra observed for material produced using this process produces a Raman spectra where the G peak is a good deal higher than the 2-D peak. This indicates that for this sample in Example 5 the sample is thinner on an atomic level in the third dimension and that this material has different characteristics from the other materials produced using this galvanic cell technology.

Figure 37:
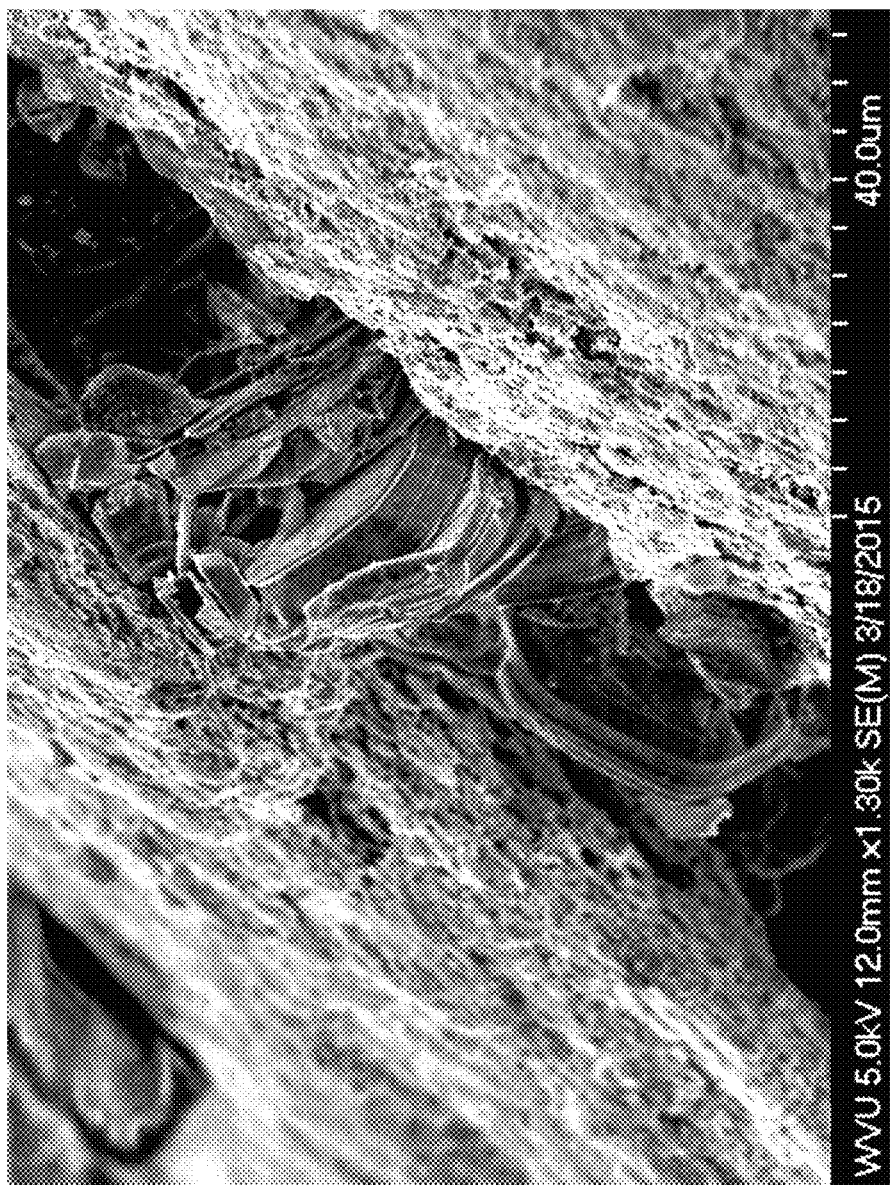
FIG. 37 is an SEM image showing Sample C (Example 5) and material morphology within crevices (scale bar, 40 microns).

FIG. 37 is an SEM image showing Sample C and material morphology within crevices (scale bar, 40 microns). FIG. 37 is a magnified image of FIG. 35. FIG. 35 appears to show several (two or three) composite layer made up of smaller layers. In between the larger layers of FIG. 37 there are graphene hexagons contained within the gap. These hexagons have the very commonly seen cross-sectional particle size of roughly 50 µm.

Figure 38:
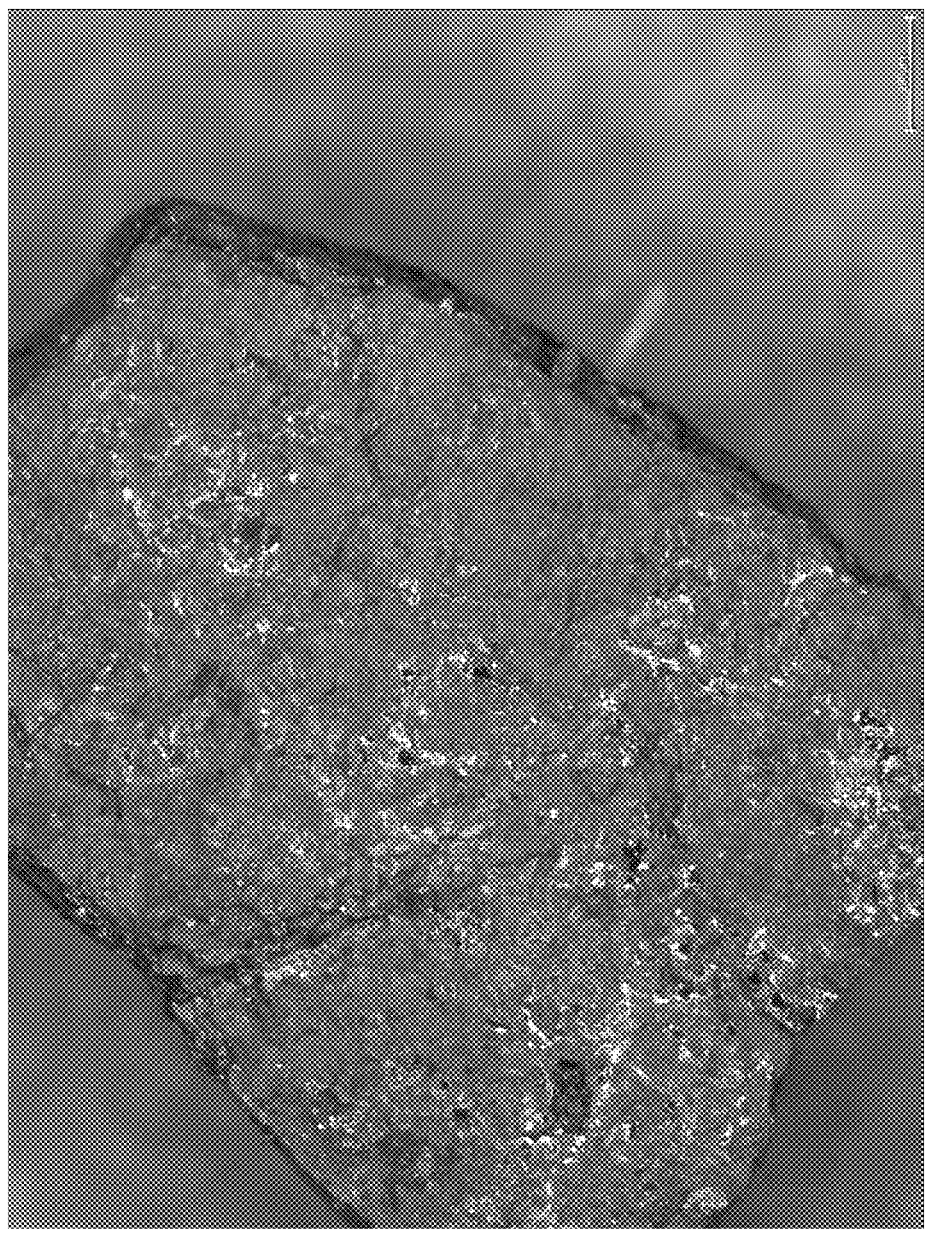
FIG. 38 shows an optical micrograph for top view of Sample C (Example 5, scale bar, 390 microns).

FIG. 38 shows an optical micrograph for top view of Sample C (scale bar, 390 microns). FIG. 38 shows an optical image of the overall large carbon piece. From this image, it can be clearly seen that this is not tiny graphene flakes (on the order of single microns or tens of microns) coagulated together because it has dried and was not in solution. It also shows the overall size of the elemental carbon particle given the scale bar on the bottom right of 390 microns.

Figure 39:
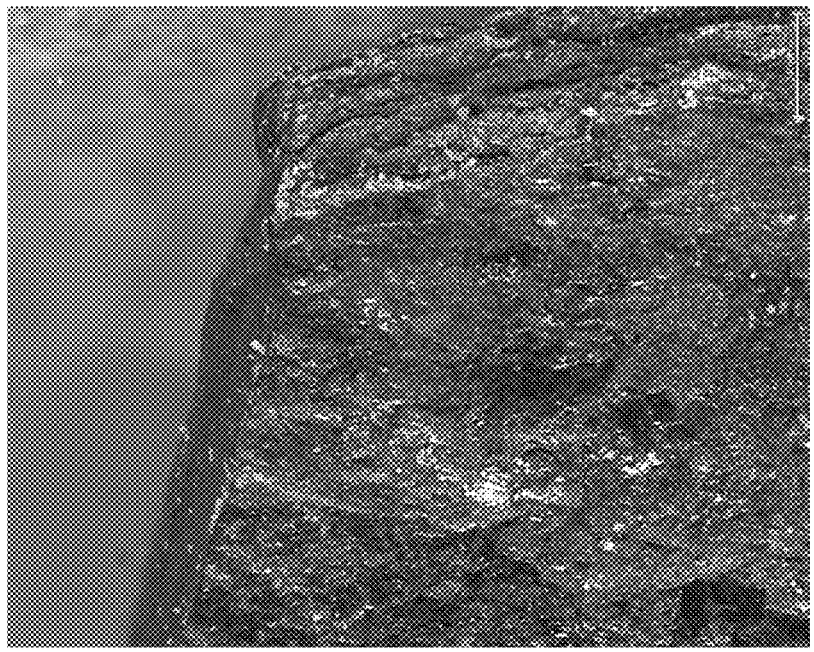
FIG. 39 shows an optical micrograph for perspective view of edge of Sample C (Example 5, scale bar, 240 microns).

FIG. 39 shows an optical micrograph for perspective view of edge of Sample C (scale bar, 240 microns). FIG. 39 shows the same graphene piece as in FIG. 38. However, in FIG. 39, the angle of the optical image is rotated from perpendicular so the third dimension can be observed. This image further shows the stacked two dimensional nature of the large graphene particle.

Figure 40:
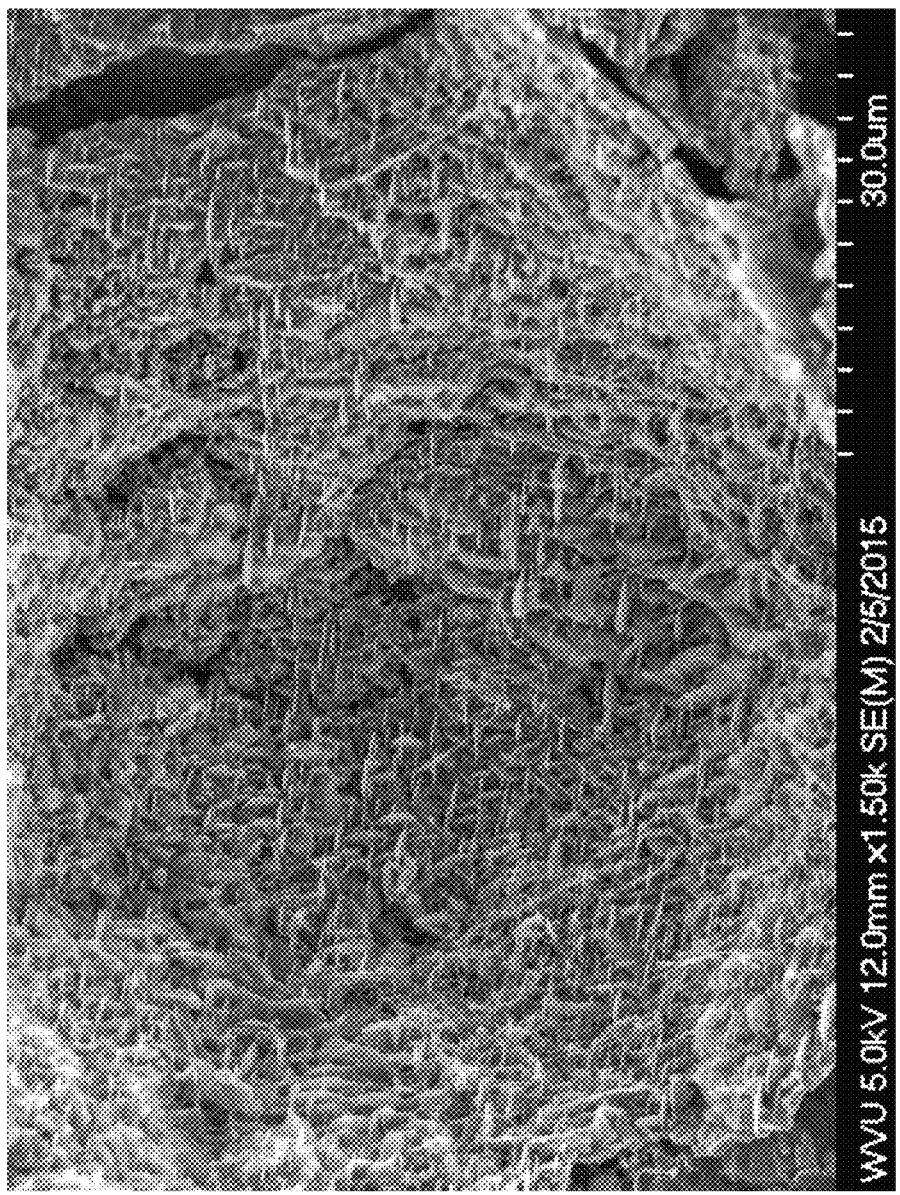
FIG. 40 is an SEM image showing Sample C (Example 5, scale bar, 30 microns).
Figure 41:
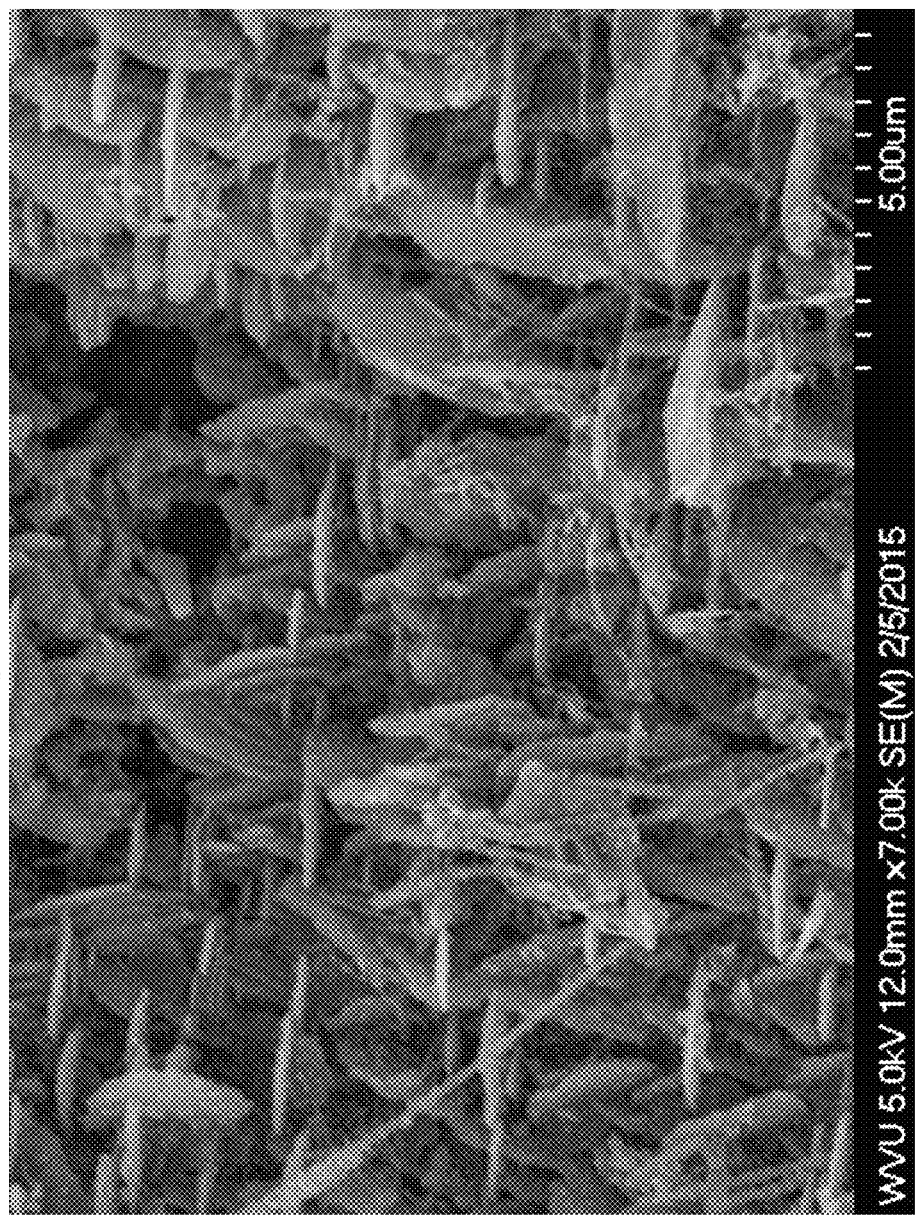
FIG. 41 is an SEM image showing Sample C, for an enlarged view of FIG. 40 (scale bar, 5 microns).
Figure 42:
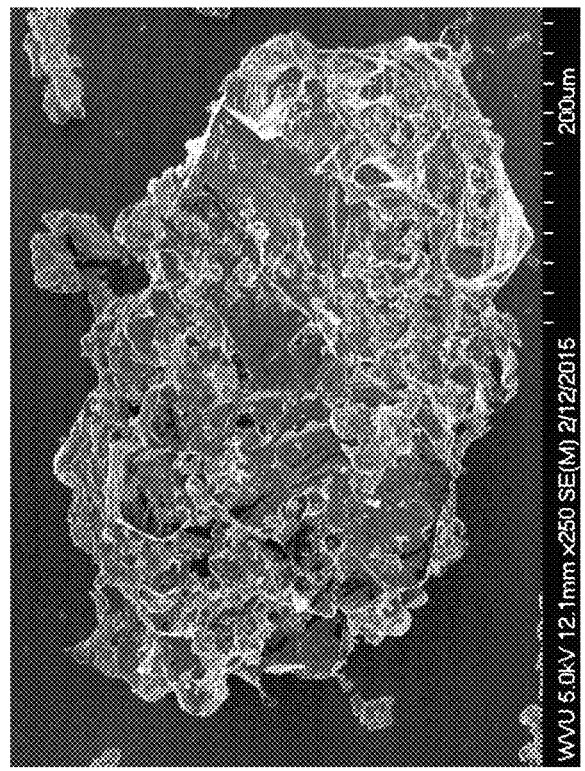
FIG. 42 shows a comparison for elemental carbon material prepared by a comparative thermal method (42 left; U.S. application Ser. No. 14/213,533 and PCT Application PCT/US2014/028755) with a large piece of elemental carbon material prepared in Example 5 (42 right), each with scale bar of 200 microns.
Figure 42:
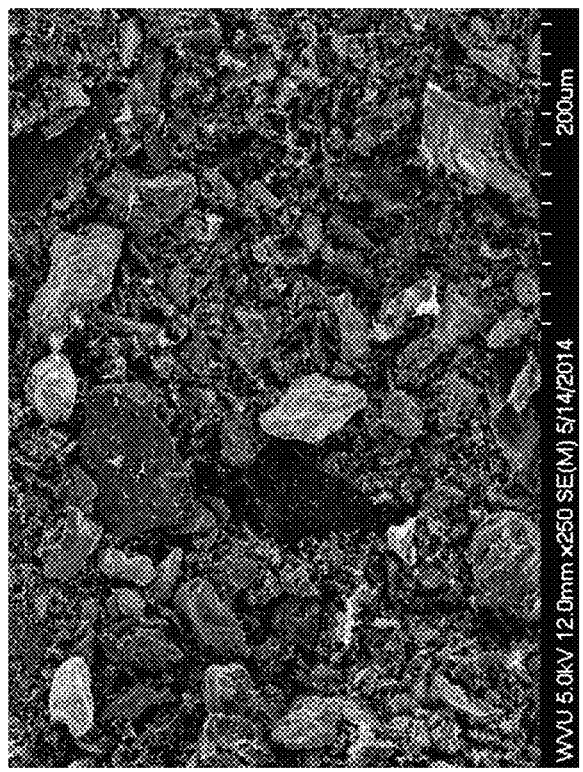
Figure 43:
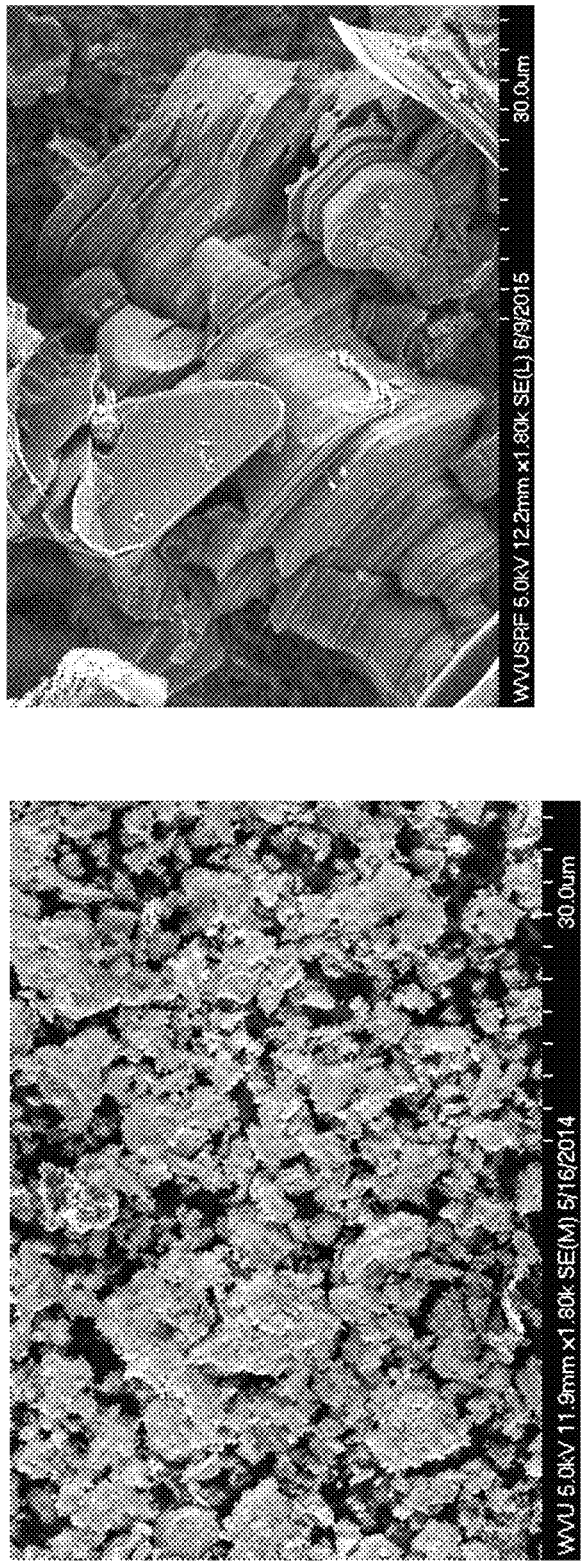
FIG. 43 shows a comparison for elemental carbon material prepared by a comparative thermal method (43 left; U.S. application Ser. No. 14/213,533 and PCT Application PCT/US2014/028755) with a large piece of elemental carbon material prepared in Example 5 (43 right), each with scale bar of 30 microns.
Figure 44:
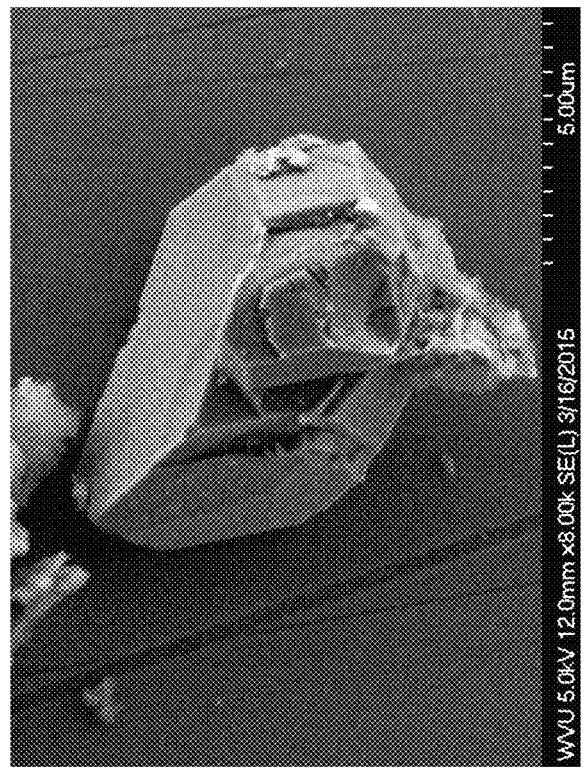
FIG. 44 shows a comparison for elemental carbon material prepared by a comparative thermal method (44 left; U.S. application Ser. No. 14/213,533 and PCT Application PCT/US2014/028755) with a large piece of elemental carbon material prepared in Example 5 (44 right), each with scale bar of 5 microns.
Figure 44:
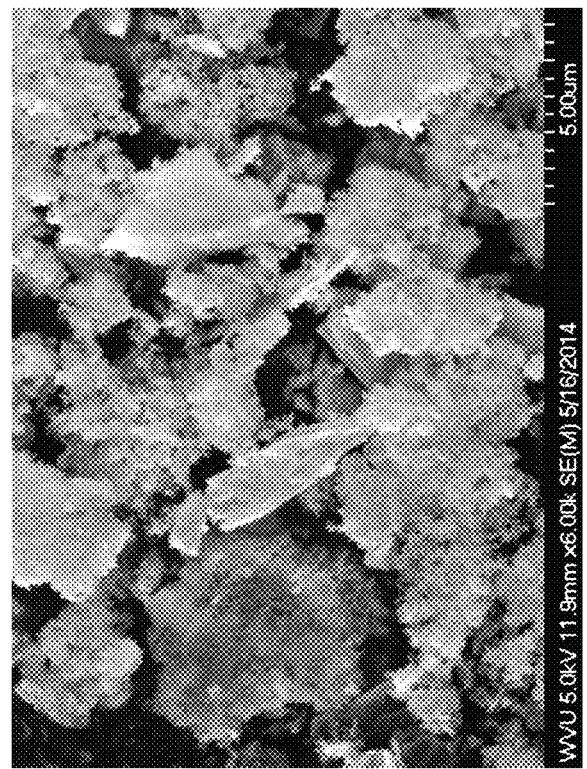
Figure 45:
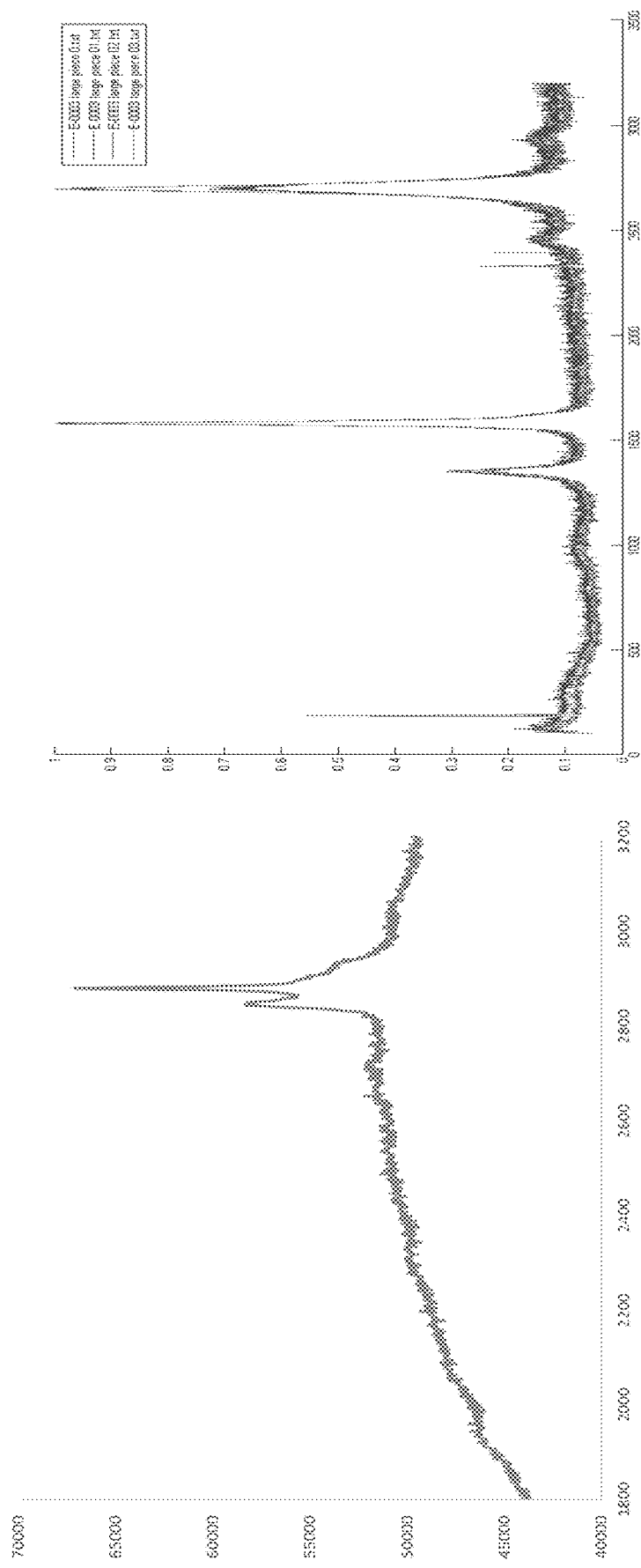
FIG. 45 shows a comparison for Raman spectra for elemental carbon material prepared by a comparative thermal method (45 left, U.S. application Ser. No. 14/213,533 and PCT Application PCT/US2014/02875545A) with Raman spectra for a large piece of elemental carbon material prepared in Example 5 (45 right).

FIG. 40 is an SEM image showing Sample C (scale bar, 30 microns). FIG. 40 shows an image of elemental carbon produced from Example 5. FIG. 41 is a magnified image of the same piece of carbon. The most interesting things about these two SEM images are the tiny fin like projections from the surface. In FIG. 41, it is also interesting to look at the orientation of the overall particle. Some of them appear to be perpendicular to one another while some of them appear to be at fairly consistent angles.

These images, and other images shown herein, show evidence of specific elemental carbon materials and graphene materials that can be produced using this technology.

In addition, in FIGS. 42-45, comparative examples are shown for different scale bars between the elemental carbon materials from the prior thermal methods (U.S. application Ser. No. 14/213,533 and PCT Application PCT/US2014/028755) compared to Example 5.

Example 6

The same basic set up as Examples 1 and 2 with the small glass reactor shown in FIG. 17 was used for this experiment. However, there are three major differences between Examples 1 and 2 and this example. The first is that the anode and cathode in the reaction were both connected to a potentiostat which applied an external voltage to the reaction system. The applied external voltage would in turn alter the chemical potential of the reaction. The second major difference was in the apparatus itself. The glass caps which held the two electrodes were replaced by large rubber stoppers. This change was made because it was more effective in sealing the reaction environment and also permitted for different setups to be quickly changed and altered between experiments. For example a glass caps in Examples 1 and 2 could not accommodate a reference electrode. A simple alteration of the rubber stoppers would allow for either cell to accommodate the reference electrode or any other item needed to perform the experiment. The third major difference was that ethanol was used as the solvent in this experiment as opposed to methanol which was used in Examples 1 and 2.

A new anode was fabricated identical to the anode used in Examples 1 and 2. They included a spherical tea ball strainer supported by a rod where one face rotates to seal the strainer. This strainer included a carbon steel with a stainless steel coating. It was selected for initial experiments because it easily met the requirements of the experiment. These requirements were to hold the carbide and provide an electrically conductive surface and had a greater resistance to corrosion than carbon steel. A quarter inch 316 stainless steel rod was connected to the tea strainer with a hole was drilled in the side to vent any pressure build up in the carbide cell. The stainless steel rod passed through the rubber stopper and supported the anode within the cell. The top of the tube was connected to bubbler which provided a separation between the reaction environment and the environment in the lab.

The first cell was filled with the dried ethanol to a height of four inches or one inch above the connecting tube. Zinc chloride anhydrous salt ($ZnCl_2$) was stirred into the dried ethanol until the solution was saturated. The cell cap, which was fitted with a ¼" diameter elemental zinc rod was set in place using vacuum grease on the ground glass joint to seal the zinc cell. The bottom of the elemental zinc electrode was immersed in the $ZnCl_2$/ethanol solution.

The second cell was also filled with the dried ethanol to height of four inches or one inch above the connecting tube. Calcium chloride anhydrous salt ($CaCl_2$) was stirred into the dried ethanol until the solution was saturated.

The calcium carbide ($CaC_2$) was then prepared by reducing the particle size of the individual pieces to a size of roughly one centimeter. Calcium carbide was purchased from Acros Organics and the product name was Calcium Carbide, 97+% (CAS: 75-20-7 and Code: 389790025). The calcium carbide was not treated or purified before the start of the experiment.

The $CaC_2$ was then sealed in the hollow stainless steel mesh sphere of the carbide electrode which had been fitted into the carbide cell cap. The carbide cell cap was set in place into the ground glass joint to seal the carbide cell. The mesh sphere containing the calcium carbide was completely immersed in the $CaCl_2$/methanol solution. Tygon tubing was connected to the opened end of the stainless steel tubing on the carbide electrode. A pinch valve was used to completely seal the carbide cell from the environment.

The cap for the cathode cell was prepared with two openings. The first opening was in the center of the cell and held the elemental zinc rod which was immersed in a solution of dried ethanol and zinc chloride. The second opening was roughly half way between the center of the cell and the wall. This opening held the Ag/AgCl$_2$ reference cell where the tip was also submerged in the solution. The anode, cathode, and reference electrodes were snugly fit in and sealed in the holes of the rubber stopper for the cell caps.

Once both cells have been sealed and the electrodes in place, the potentiostat and an amp-meter were connected in series between the zinc and CaC$_2$ electrodes. The potentiostat was a bioanalytical systems Inc. (BAS) Power Module model PWR-3.

The vent valve was opened between the carbide electrode and the vapor bubbler to allow any vapor produced to exit the carbide cell. Next, both magnetic stir plates were turned on to agitate the solution in each of the cells. Finally, the valve on the glass tube connecting the cells was opened to allow for ions to flow between the two cells. The voltage and current were measured using the multimeter to ensure that the reaction was indeed proceeding.

The reaction that is expected to occur is:

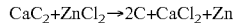

CaC$_2$+ZnCl$_2$→2C+CaCl$_2$+Zn

In this reaction, Zn$^{+2}$ is reduced to elemental zinc. The carbide anion is oxidized to elemental carbon. The standard reduction potential of either half-cell is not known in ethanol. It has been observed that this reaction occurs spontaneously at room temperature.

With an applied potential of 0V, a current of 5 uA was measured. A voltage of 14V was applied. The current increased from 5 uA to 100 uA. This is significant, as it implies an increase in reaction rate. The zinc cell became clear as the reaction progressed, implying that the zinc chloride was consumed. More zinc was added, until there was undissolved zinc chloride in the cell. The current increased to 150 uA. As the reaction continued, the current steadily increased to 200 uA. This is probably from the formation of calcium chloride in the calcium cell. The production of calcium chloride would increase the conductivity of the electrolyte. The reaction was allowed to continue for 4 days. After the fourth day, both cells were an opaque white, and the current had increased to 280 uA. The reaction was stopped. Both cells were emptied, and the products were cleaned with acid.

The reaction appeared to have occurred as predicted. It is unclear if any zinc metal was deposited onto the zinc rod. The calcium cell is likely white from calcium oxide and excess calcium chloride. Several large pieces of carbon were formed in the reaction. Some of the pieces appear to be very flat, similar to the graphene produced from earlier reactions. The stainless steel electrode appeared to be unchanged from the reaction. Previous reactions caused significant corrosion on the low-quality stainless steel.

The sample was removed from the calcium cell and filtered in a glass-fiber filter. Then, the sample was placed in 1M HCl until bubbling of acetylene ceased. The sample was filtered again. Then the sample was placed in concentrated HCl and stirred for approximately 1 minute. The sample was filtered again on a glass-fiber filter. Next, alcohol (a mixture of methyl and ethyl alcohol) was washed over the sample on the filter. Approximately 200 mL of alcohol was used. The sample was rinsed with this alcohol 10 times. Finally, the sample, on the filter, was placed in a drying oven (80° C.) for one hour. The sample was then analyzed under the SEM and using Ramen spectroscopy.

The product of the elemental carbon material reaction product is further shown in FIGS. 46-51 which are described more below.

Figure 46:
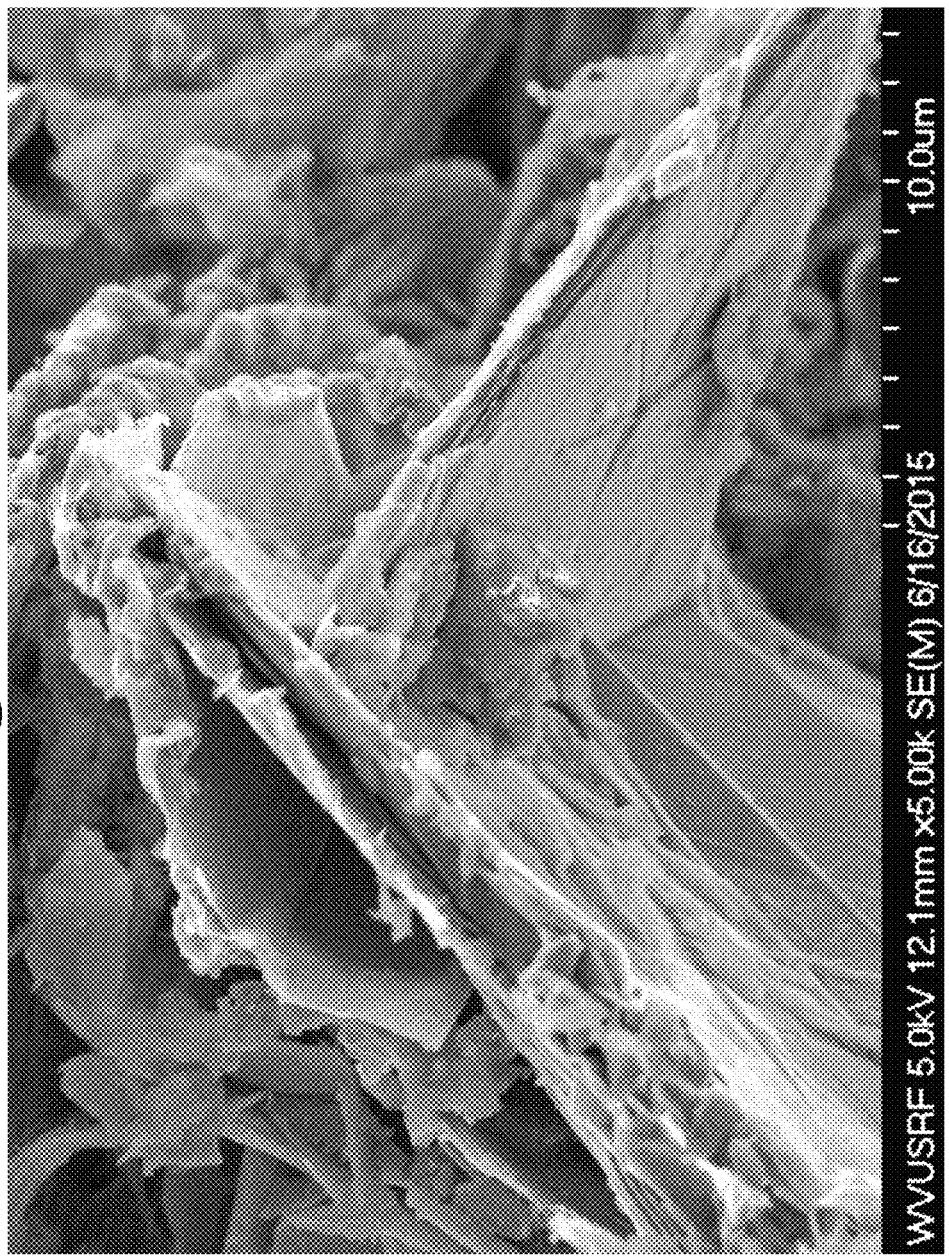
FIG. 46 is a first SEM image showing the elemental carbon material product in Example 6 with use of a potentiostat, Sample D (scale bar 10 microns).

FIG. 46 is a first SEM image showing the carbon product in Example 6 with use of a potentiostat, Sample D (scale bar 10 microns). There are at least two interesting aspects of FIG. 46. The first is that it shows a fin or projection of elemental carbon material that appears to be roughly 90° or perpendicular from the surfaces it is attached to. The second aspect is that the fin or projection seems to be very thin in the third dimension in relation to the other two dimensions.

Figure 47:
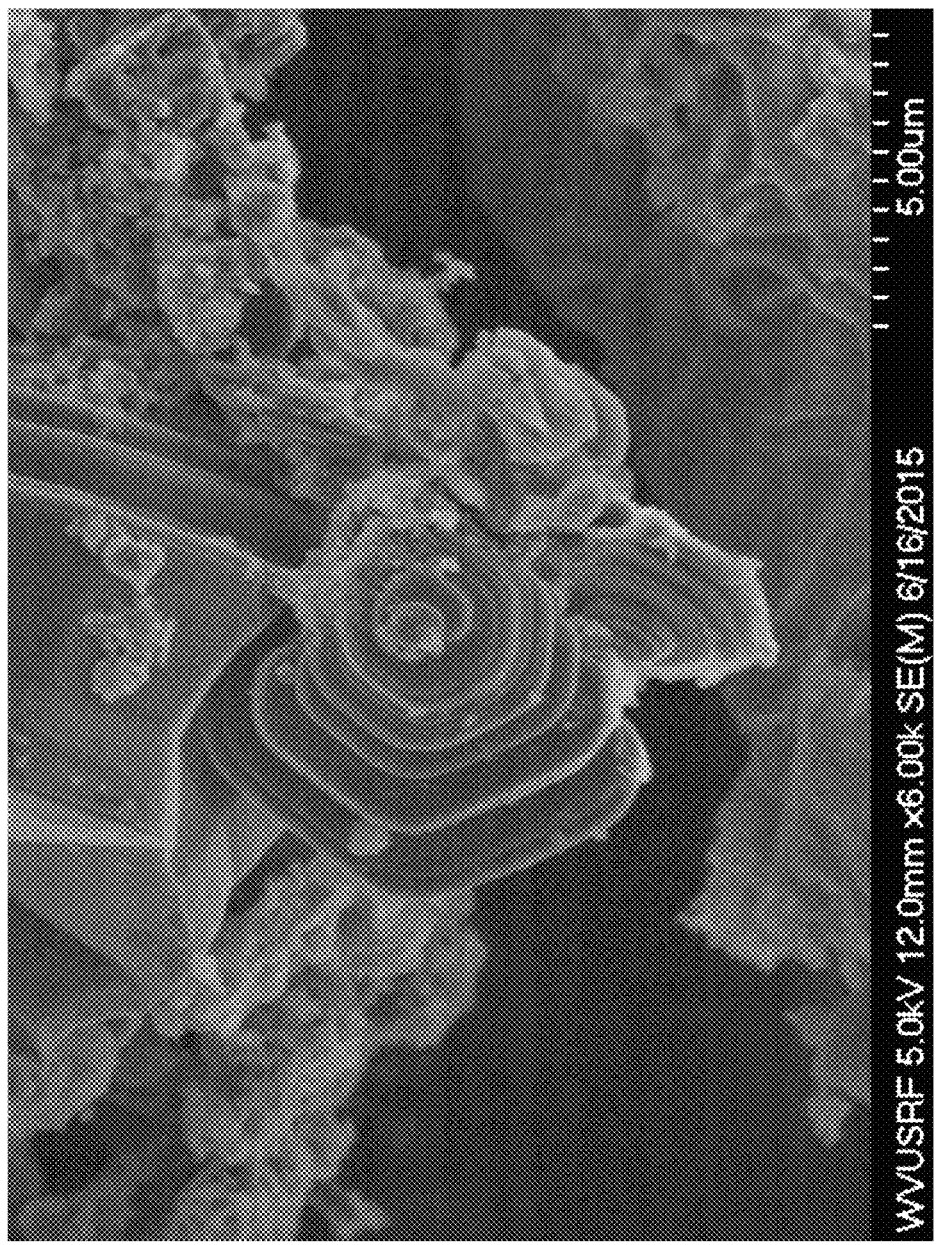
FIG. 47 is an SEM image showing the elemental carbon material product in Example 6 with use of a potentiostat, Sample D (scale bar 5 microns).

FIG. 47 is an SEM image showing the carbon product in Example 6 with use of a potentiostat, Sample D (scale bar 5 microns). FIG. 47 shows tiered graphene hexagons with increasing particle size.

Figure 48:
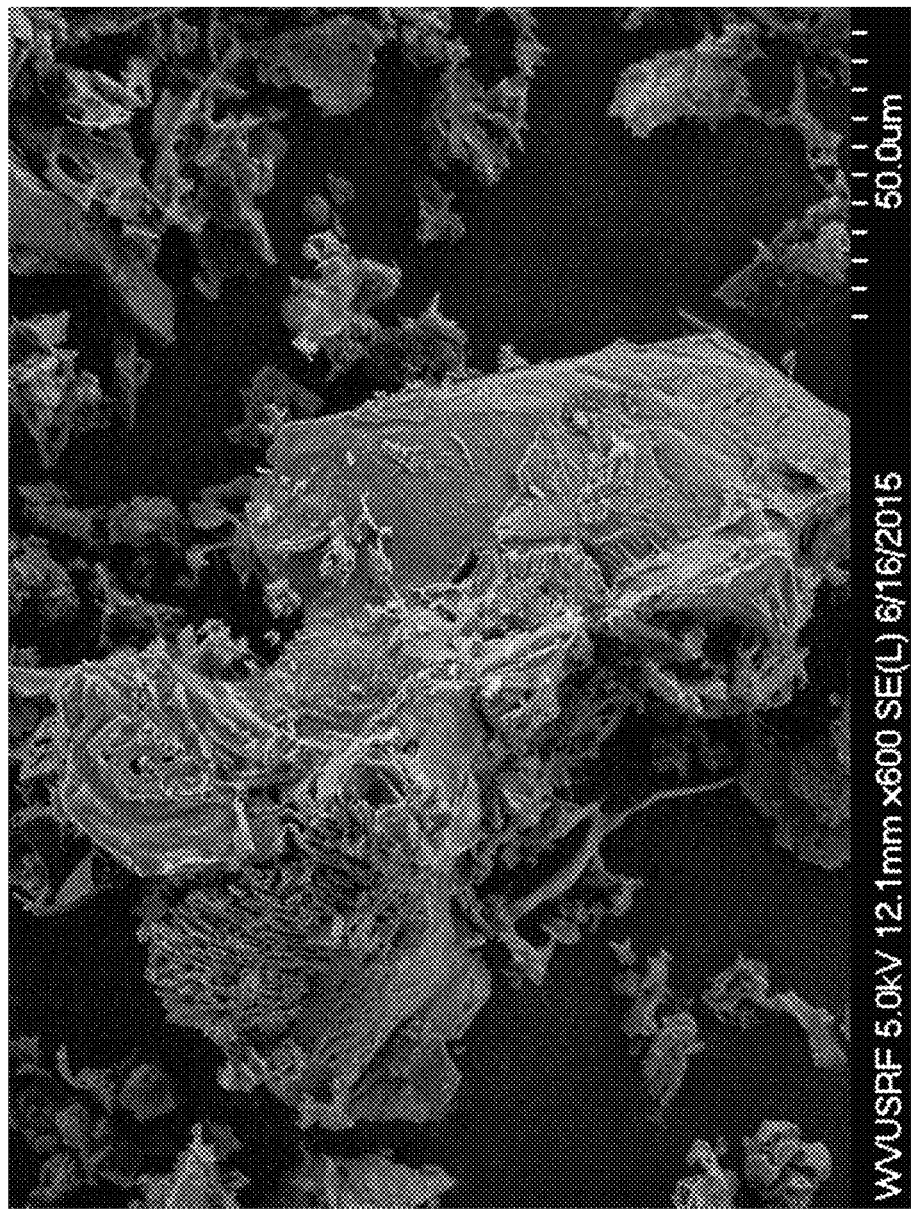
FIG. 48 is an SEM image showing the elemental carbon material product in Example 6 with use of a potentiostat, Sample D (scale bar 50 microns).

FIG. 48 is an SEM image showing the carbon product in Example 6 with use of a potentiostat, Sample D (scale bar 50 microns). The most interesting thing about FIG. 48 is the different characteristics of the elemental carbon material at different points on the particle. FIG. 48 appears to be one solid particle of elemental carbon. On the left hand side towards the top it has a textured appearance with material projecting from the surface. On the right-hand side of the particle appears to be more smooth on the surface. This represents the possibility of producing elemental carbon with different characteristics in the same particle.

Figure 49:
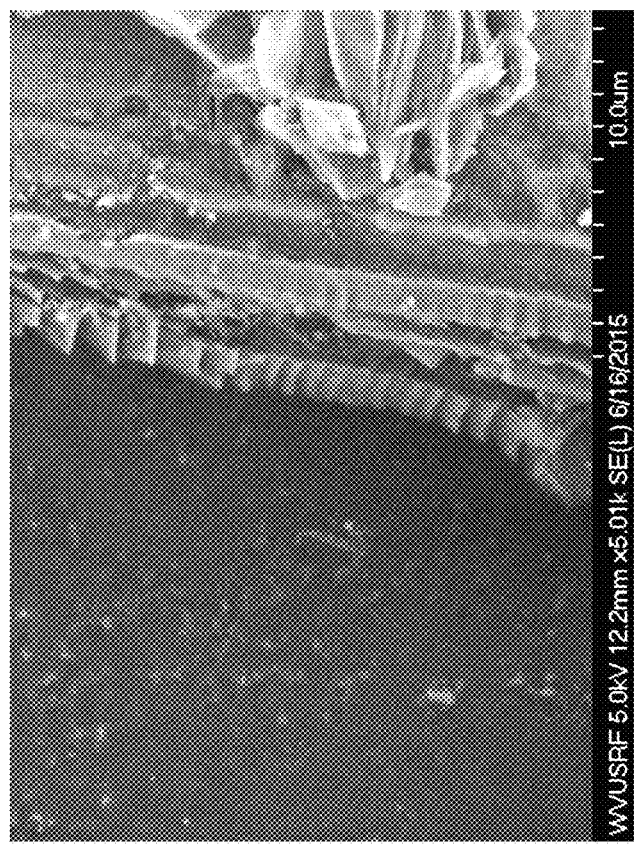
FIG. 49 shows two SEM images showing the elemental carbon material product in Example 6 with use of a potentiostat, Sample D (49 left, scale bar 50 microns; 49 right, scale bar 10 microns).
Figure 49:
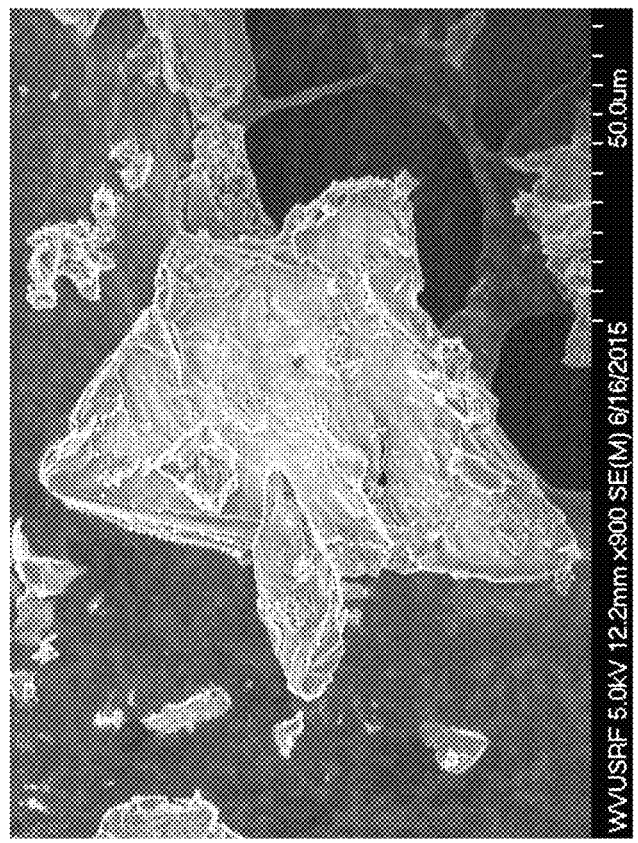

FIG. 49 has two SEM images showing the carbon product in Example 6 with use of a potentiostat, Sample D (scale bar 50 and 10 microns). The image on the left (A) is a two dimensional particle of elemental carbon or graphene. The image on the right (B) shows a magnified portion showing the depth or third dimension of the particle. It appears to have four alternating layers that appear to run in different directions. This figure also represents the possibility of producing particles of elemental carbon with different characteristics and orientations.

Figure 50:
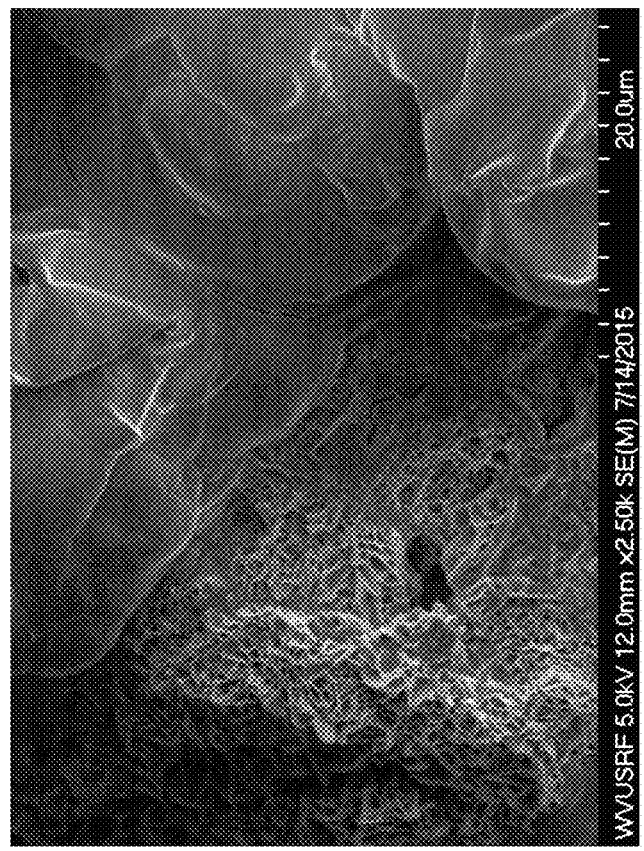
FIG. 50 shows two SEM images showing the elemental carbon material product in Example 6 with use of a potentiostat, Sample D (50 left, scale bar 10 microns; 50 right, scale bar 10 microns).
Figure 50:
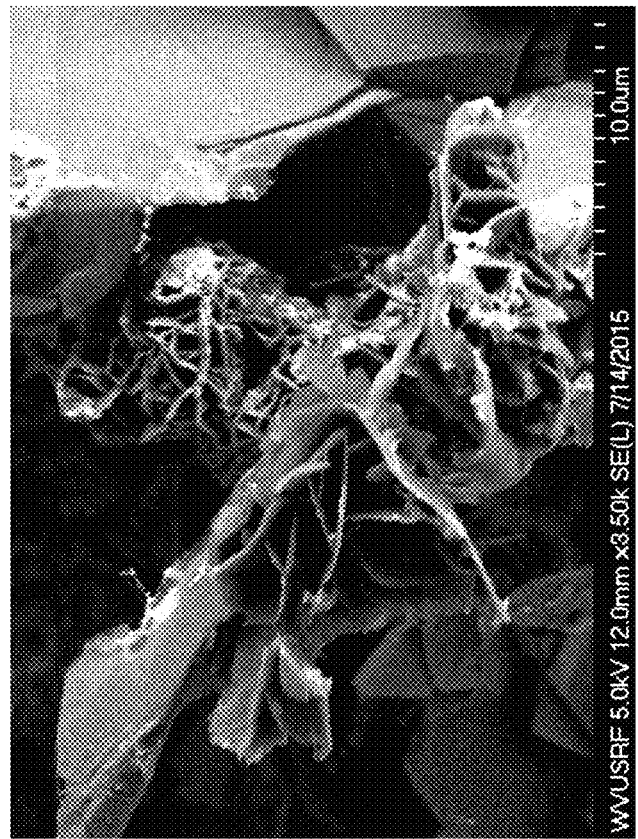

FIG. 50 has two SEM images showing the carbon product in Example 6 with use of a potentiostat, Sample D (scale bar 20 microns, A, and 10 microns, B). The most interesting thing about FIG. 46 is the thickness or depth in the third dimension. FIG. 50 shows elemental carbon material that appears to be very thin in the third dimension relative to the first two dimensions. This elemental carbon also represents the possibility of producing three-dimensional structures of elemental carbon that is mostly "empty space".

Figure 51:
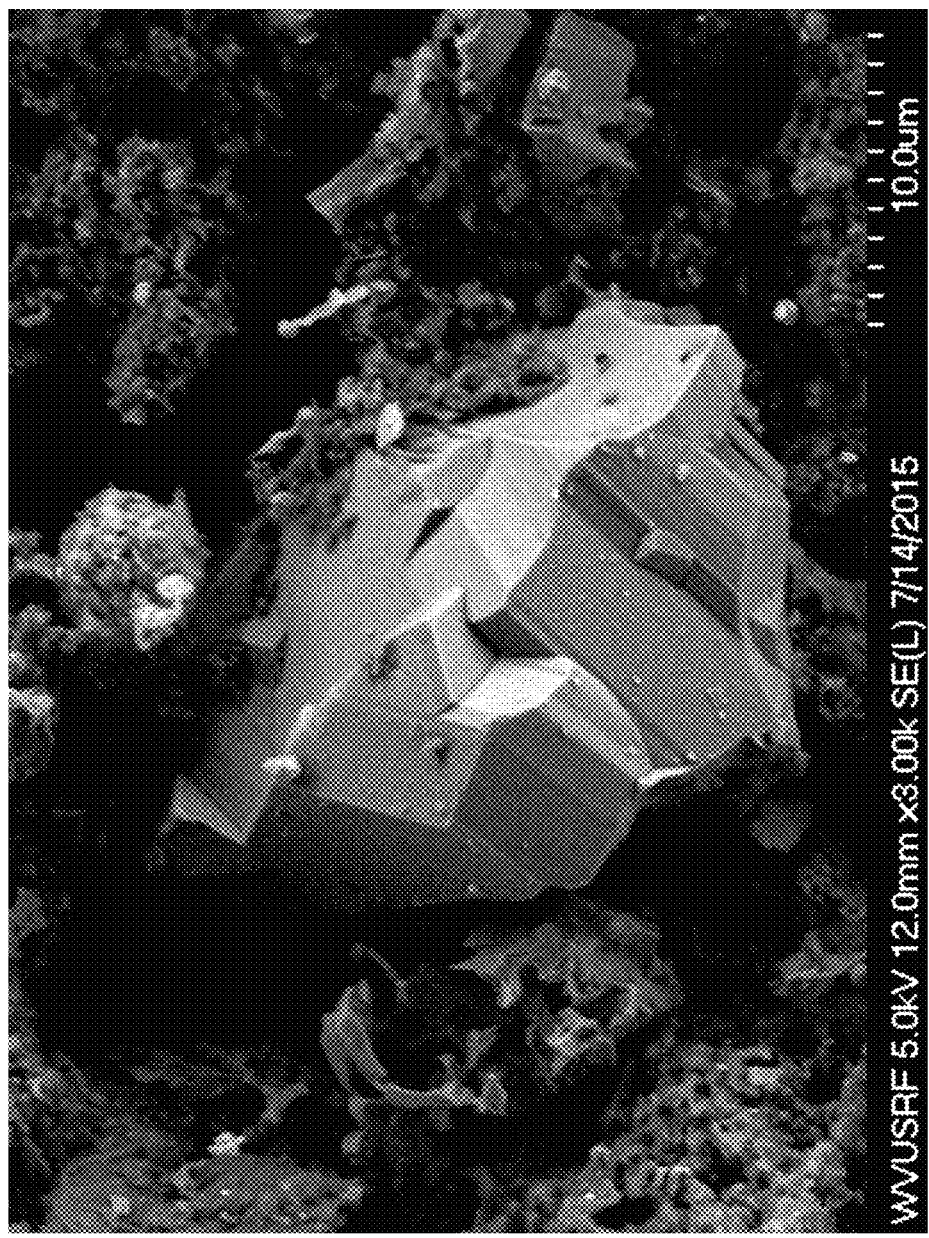
FIG. 51 is an SEM image showing the elemental carbon material product in Example 6 with use of a potentiostat, Sample D (scale bar 10 microns).

FIG. 51 is an SEM image showing the carbon product in Example 6 with use of a potentiostat, Sample D (scale bar 10 microns). FIG. 51 shows a piece of elemental carbon that is sp3 hybridized. It has very distinctly different characteristics than the three-dimensional stacks of graphene-like material.

Figure 52:
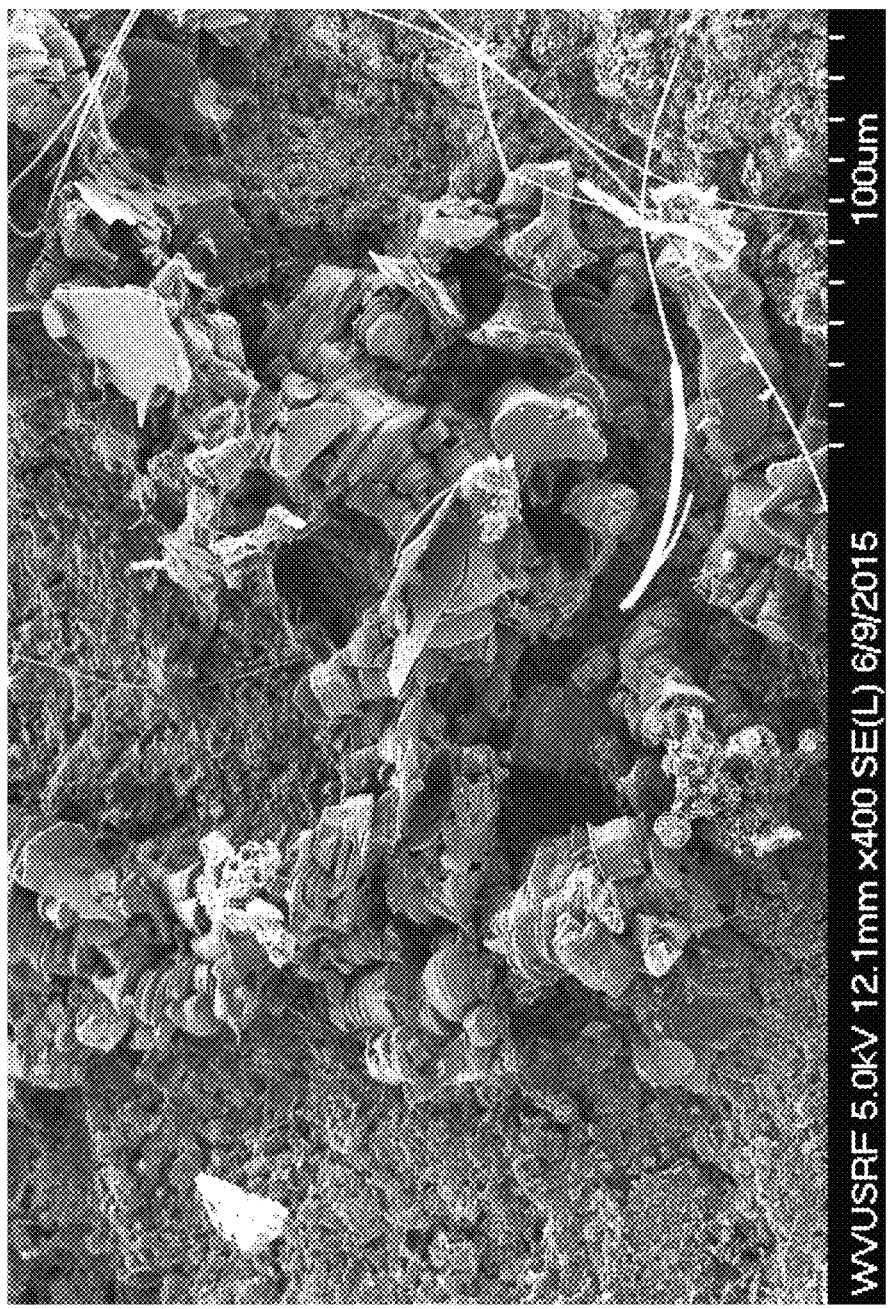
FIG. 52 shows SEM data for the elemental carbon material prepared in Example 6 (scale bar 100 microns).

FIG. 52 shows an image of the bulk material produced in Example 6. Although there is still a high percentage of amorphous looking carbon, the amount of crystalline carbon is much higher than anything seen in the prior thermal reactions (U.S. application Ser. No. 14/213,533 and PCT Application PCT/US2014/028755). This is roughly the same amount of material observed in the previous examples. However, the crystal structure was different. There are more well-defined and varying shapes including two dimensional sheets or plates of elemental carbon. The fibrous material seen on the right side of the image is contamination from the filter used during the separation and purification operations.

Figure 53:
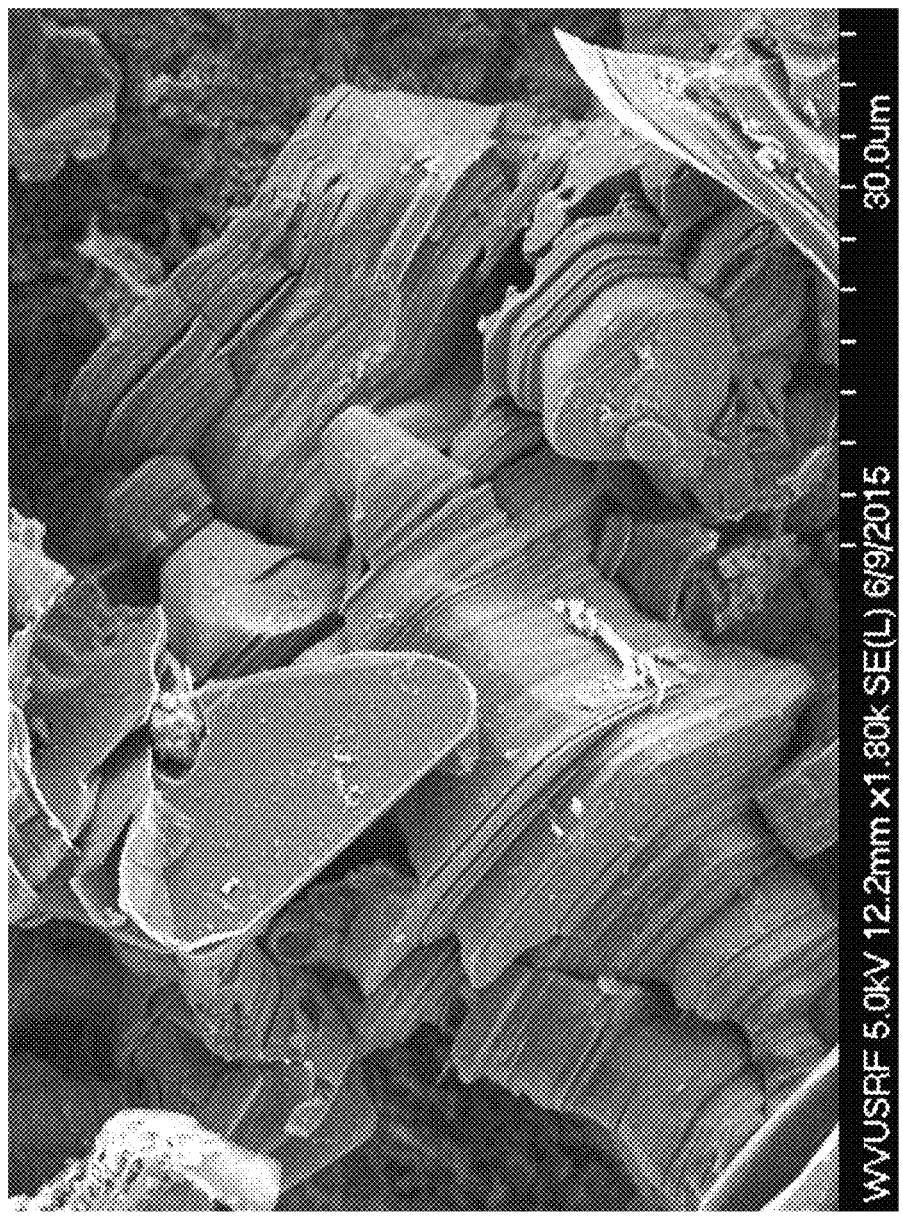
FIG. 53 shows SEM data for the elemental carbon material prepared in Example 6 (scale bar 30 microns).
Figure 65:
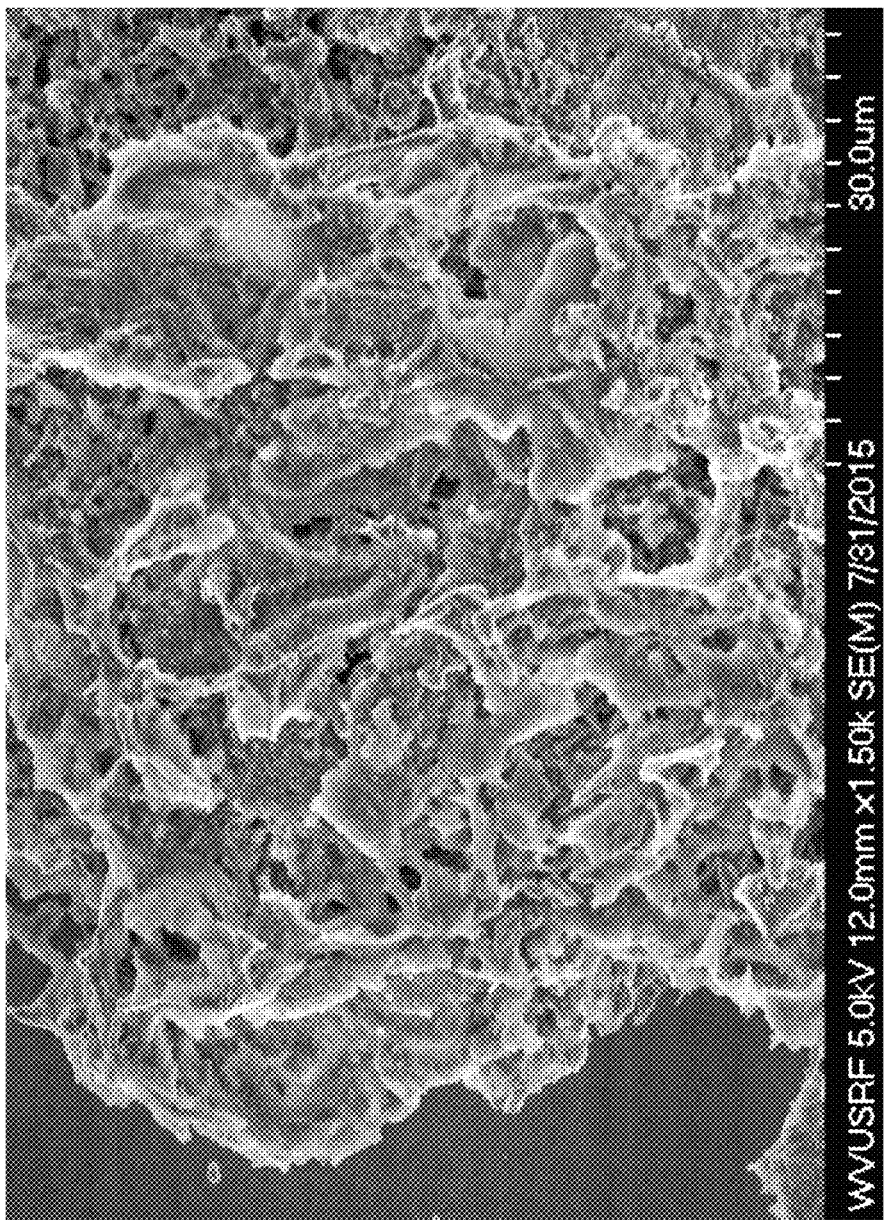
FIG. 65 shows SEM data for the elemental carbon material prepared in Example 10 (scale bar, 30 microns).

FIG. 53 shows a magnified image of the elemental carbon crystalline material seen in the upper right-hand quarter of FIG. 65. Note the well-defined two-dimensional layers of this material.

Figure 54:
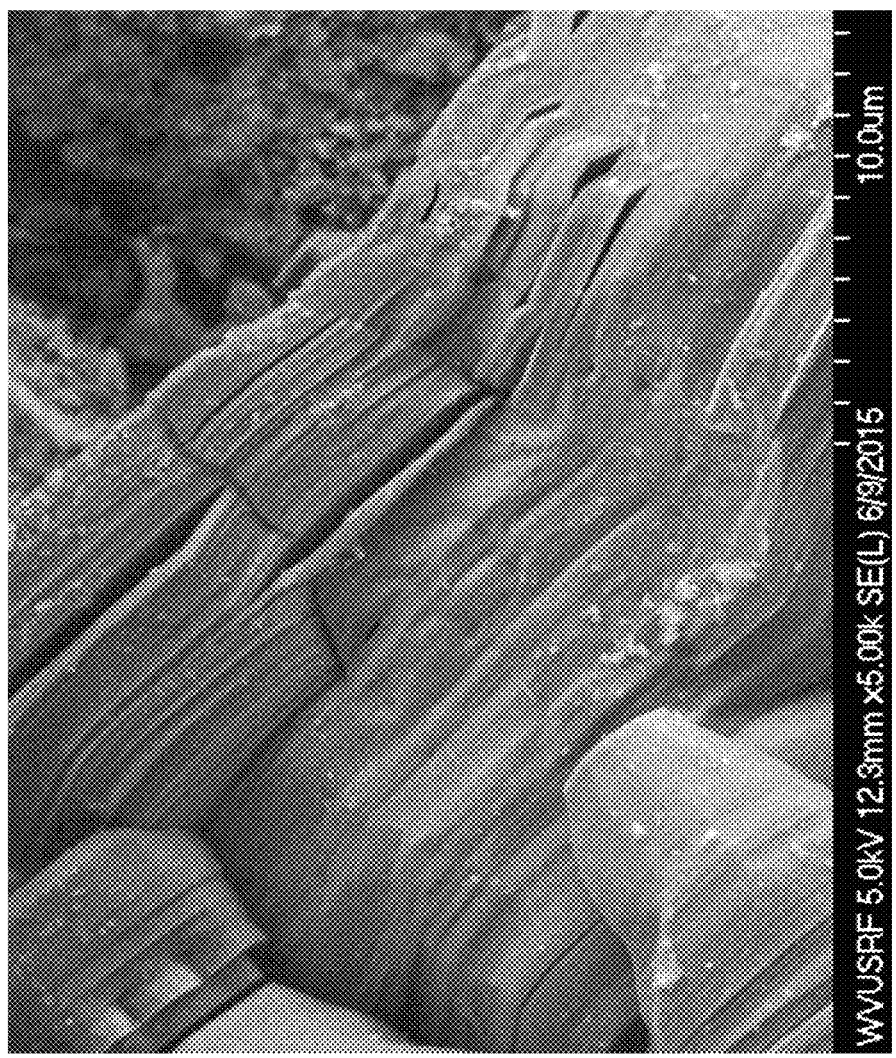
FIG. 54 shows SEM data for the elemental carbon material prepared in Example 6 (scale bar 10 microns).

FIG. 54 provides a further magnified image of FIG. 53 at a scale 10 μm. This more clearly shows the stacked two dimensional structure of the material.

Figure 55:
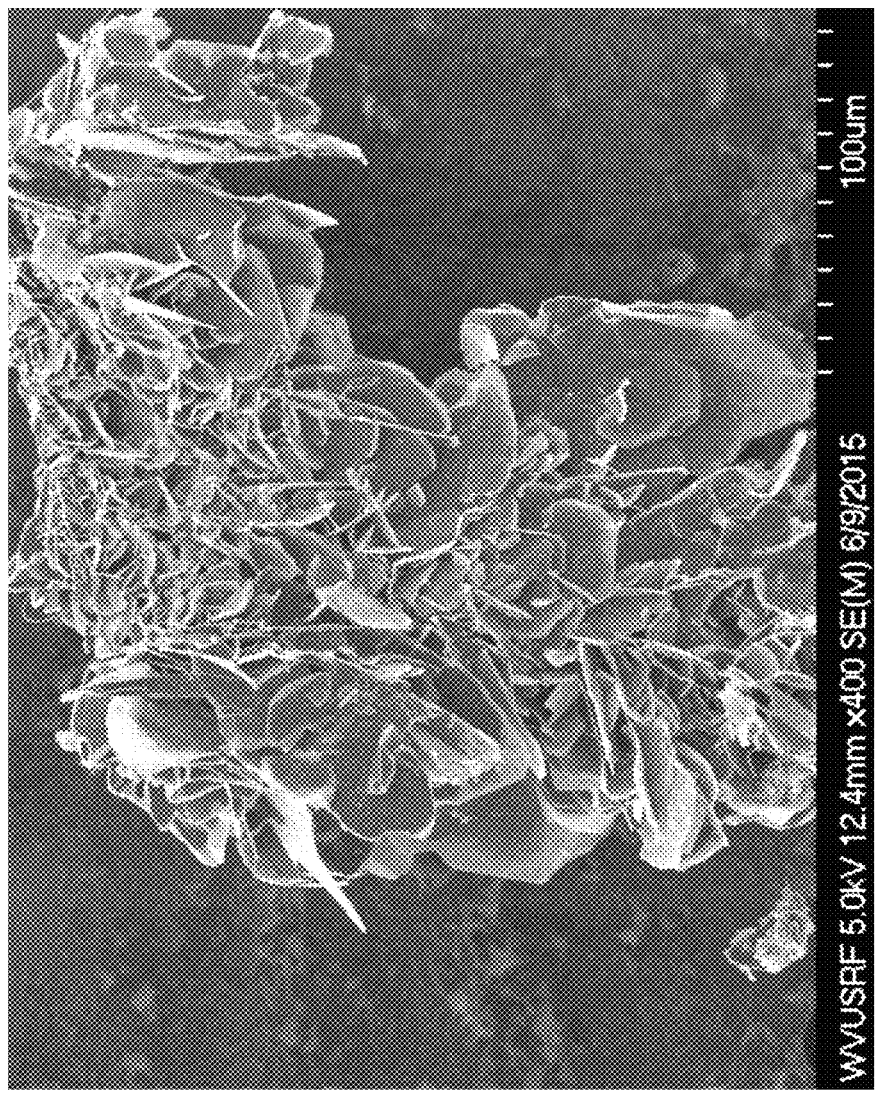
FIG. 55 shows SEM data for the elemental carbon material prepared in Example 6 (scale bar 100 microns).

FIG. 55 provides an image of a large composite piece of elemental carbon at a scale of 100 μm. This three-dimensional structure is a composite of smaller two dimensional plate-like pieces of elemental carbon. This material represents a very high surface area three-dimensional material.

Figure 56:
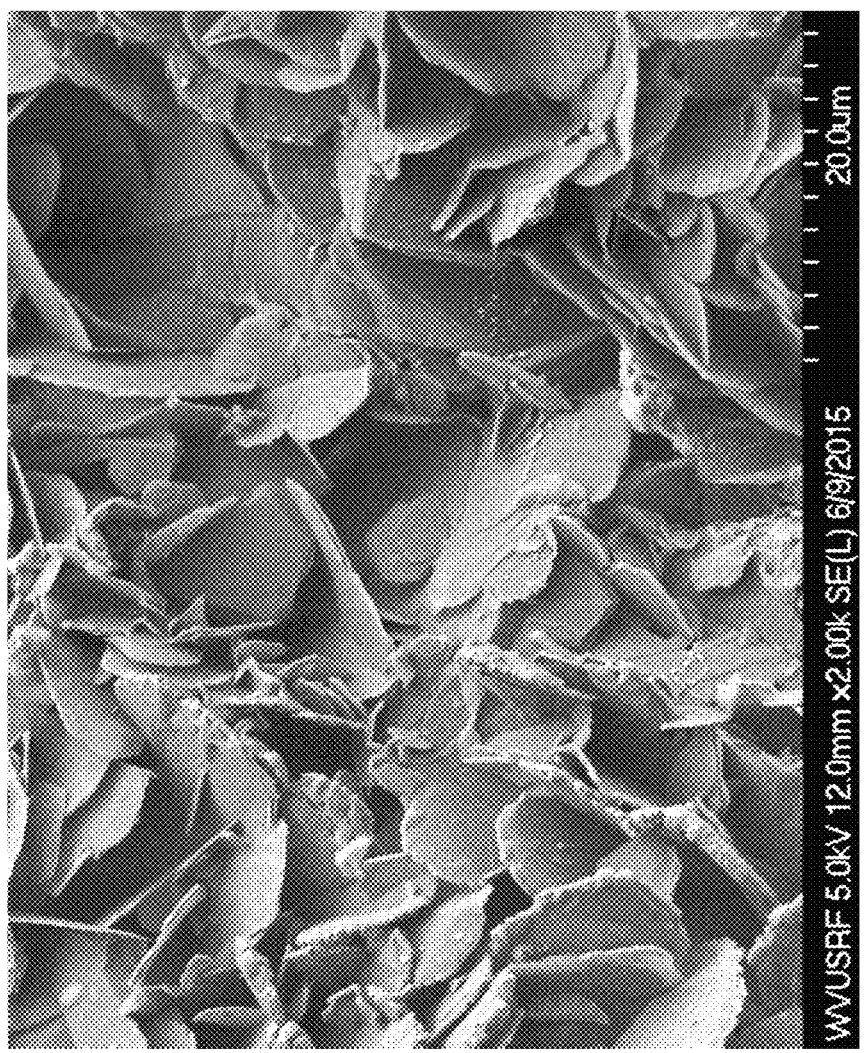
FIG. 56 shows SEM data for the elemental carbon material prepared in Example 6 (scale bar 20 microns).

FIG. 56 provides a magnified image of FIG. 55. Note how the two dimensional elemental carbon pieces form the structure.

Figure 57:
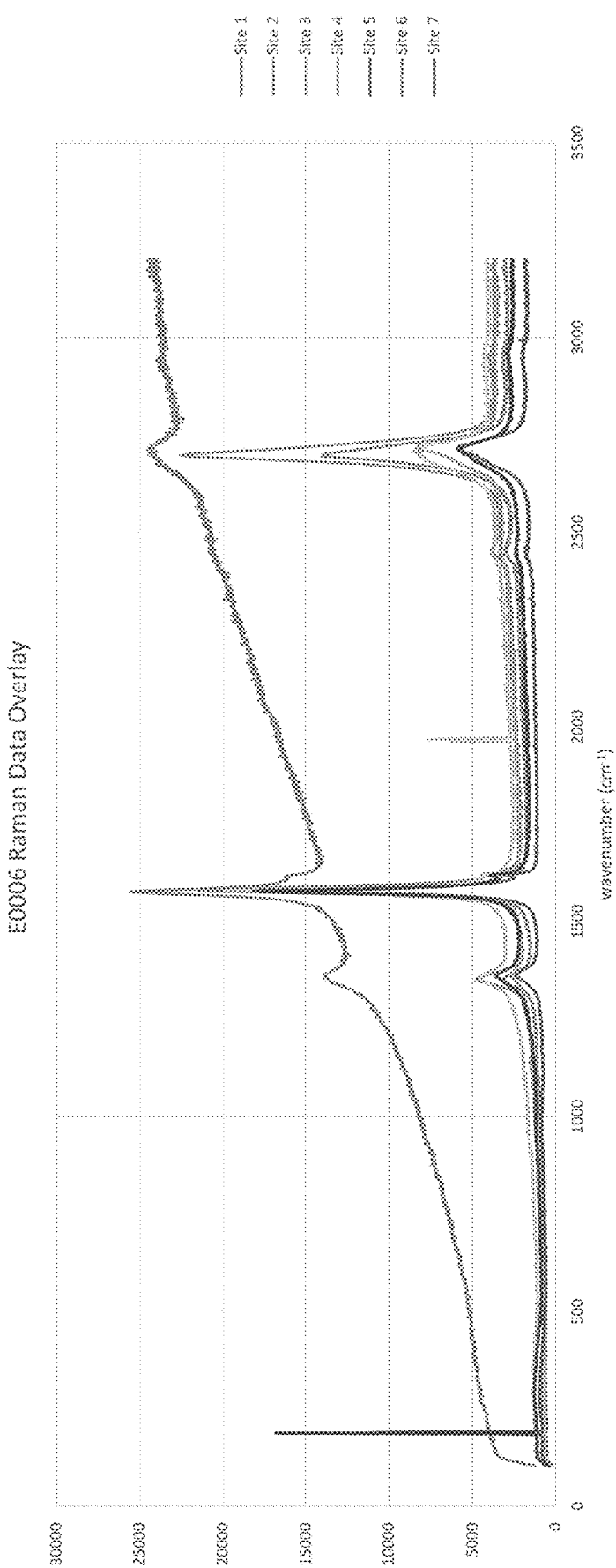
FIG. 57 shows Raman spectral data (seven traces) for the elemental carbon material prepared in Example 6.
Figure 58:
FIG. 58 shows SEM data for the elemental carbon material prepared in Example 8 (scale bar, 50 microns).
Figure 59:
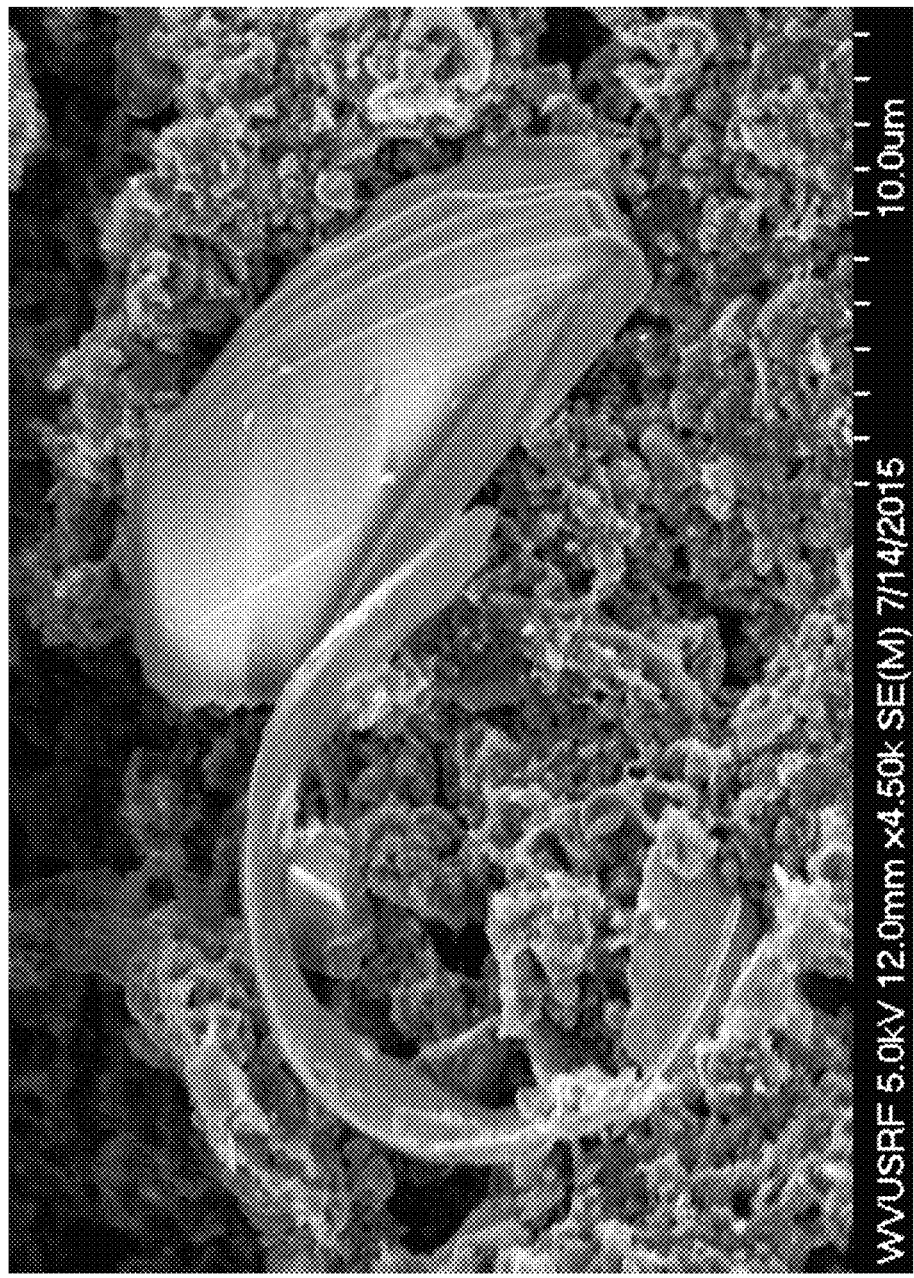
FIG. 59 shows SEM data for the elemental carbon material prepared in Example 8 (scale bar, 10 microns).
Figure 60:
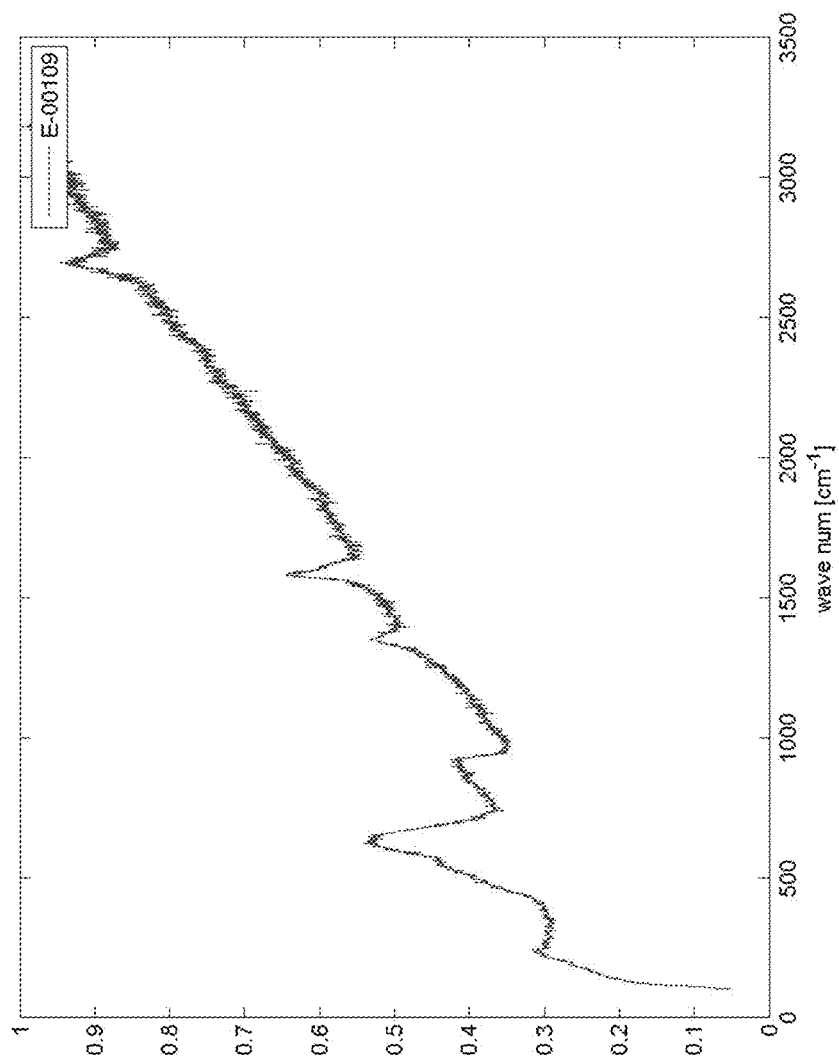
FIG. 60 shows Raman spectral data for elemental carbon material prepared in Example 8.

FIG. 57 shows the Raman spectra at seven different sites taken from a sample of the material produced in Example 6.

Example 7

The apparatus was for an ethanol electrochemical reaction with potentiostat, 3, single $CaC_2$ crystal.

A $Zn/ZnCl_2||CaC_2/CaCl_2$ was set up using saturated salts on both sides in dry ethanol. The zinc is in the form of a zinc rod. A single $CaC_2$ crystal was put in the $CaCl_2$ cell. The $Ag/AgCl_2$ reference cell was placed in the zinc cell. The potentiostat and an ammeter were connected in series between the zinc and $CaC_2$ electrodes.

The objectives were to continue with gather information and data to improve the operation of the electrolysis reaction system, and produce carbon material.

The reaction that was expected to occur was:

$$CaC_2 + ZnCl_2 \rightarrow 2C + CaCl_2 + Zn \qquad (1)$$

In this reaction, $Zn^{+2}$ is reduced to elemental zinc. The carbide anion is oxidized to elemental carbon. The standard reduction potential of either half-cell is not known in ethanol. It has been observed that this reaction occurs spontaneously at room temperature.

With an applied potential of 0V, a current of 150 uA was measured. This is the highest galvanic current measured thus far. When a voltage was applied, the current did not change until a voltage of 2.20V. Then, the current decreased rapidly and changed sign to −150 uA at 2.50V.

The current steadily increased to approximately 1000 uA. The zinc cell appeared to be clear, having consumed the zinc chloride, presumably. More zinc chloride was added. The current increased to 1500 uA. The cell quickly cleared again, and again, more zinc chloride was added. The current increased to 1800 uA. The cell was left overnight.

The next day, the current had reached 2,300 uA. The piece was removed. The bottom of the piece had noticeable black layer on it. Upon the addition of acid in methanol, the black pieces fell off. There was no noticeable acetylene smell until the acid mixture was added.

The material was filtered after sitting in HCl over several days. Large pieces were still visible.

Example 8

The main objective for Example 8, was to react aluminum carbide to produce elemental carbon using the potentiostat to apply a forced external voltage. Nearly the same apparatus and the same experimental procedure as Example 6 were used. The changes made were to accommodate the aluminum carbide which is in the form of −325 mesh fine particle size power. The aluminum carbide used was: Sigma-Aldrich; Aluminum Carbide; Powder, −325 mesh, 99%; Product number: 241837; CAS: 1299-86-1.

The changes to the apparatus are made to the carbide cell and the anode which held the carbide. First, the tea ball strainer was replaced with a platinum basket supporting a platinum crucible to hold the small particle size, powder like aluminum carbide. The platinum holder replaced the stainless steel holder to eliminate any surface effects between the holder and the carbide. Normally the calcium carbide is placed in the platinum mesh basket. But with the small particle size of the aluminum carbide, the mesh platinum basket supported a solid crucible which held the aluminum carbide. A smaller diameter hole was drilled in a new rubber stopper acting as a cap for the carbide cell. A platinum wire was fed tightly through the opening in a loop was fabricated on the end of the wire inside of the cell. The basket, which had a holding rod attached with a hook, was connected to the platinum wire exiting the carbide cell. The platinum wire would then be connected to the potentiostat and amp meter. It had been observed in previous experiments that no vapor was being produced which needed to be vented from the carbide cell. Therefore, there was no longer need for the bubbler or the hollow tube exiting the cell to vent any vapors formed.

The reaction that is expected to occur is:

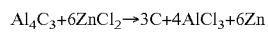

$$Al_4C_3 + 6ZnCl_2 \rightarrow 3C + 4AlCl_3 + 6Zn$$

In this reaction, $Zn^{+2}$ is reduced to elemental zinc. The carbide anion is oxidized to elemental carbon. The standard reduction potential of either half-cell is not known in ethanol. It has been observed that this reaction occurs spontaneously at room temperature. $CaCl_2$ was added to the aluminum cell to provide conductivity and available chloride anions.

A forced external voltage of 1.0 V was applied. Initially, a current of 580 uA was measured. The current steadily increases from this value. All of the excess $ZnCl_2$ dissolved or was consumed within a few minutes. The aluminum cell appears opaque white. Eventually, a clear layer formed on the bottom of the aluminum cell. It should be noted, since $Al_4C_3$ is a fine powder, so no agitation was used in the aluminum cell, as it would cause the carbide to come out of the crucible.

Products of reaction were subjected to the same cleaning and purification operations as Example 6 with one exception. Due to the problem with contamination, the fiber filter was replaced with a silver filter. The silver filter provided the same high flow rate efficiency but was much more structurally solid and did not contaminate the samples produced. One note with the aluminum carbide reaction is that less elemental carbon was recovered due to the stoichiometry of the chemical reaction. Because less was recovered, the analysis was performed on the sample collected on the filter. Therefore, an accurate weight for this experiment could not be determined. An estimate for the recovery would be roughly one tenth of a gram. The sample was analyzed using the SEM and Ramen spectroscopy.

Figure 68:
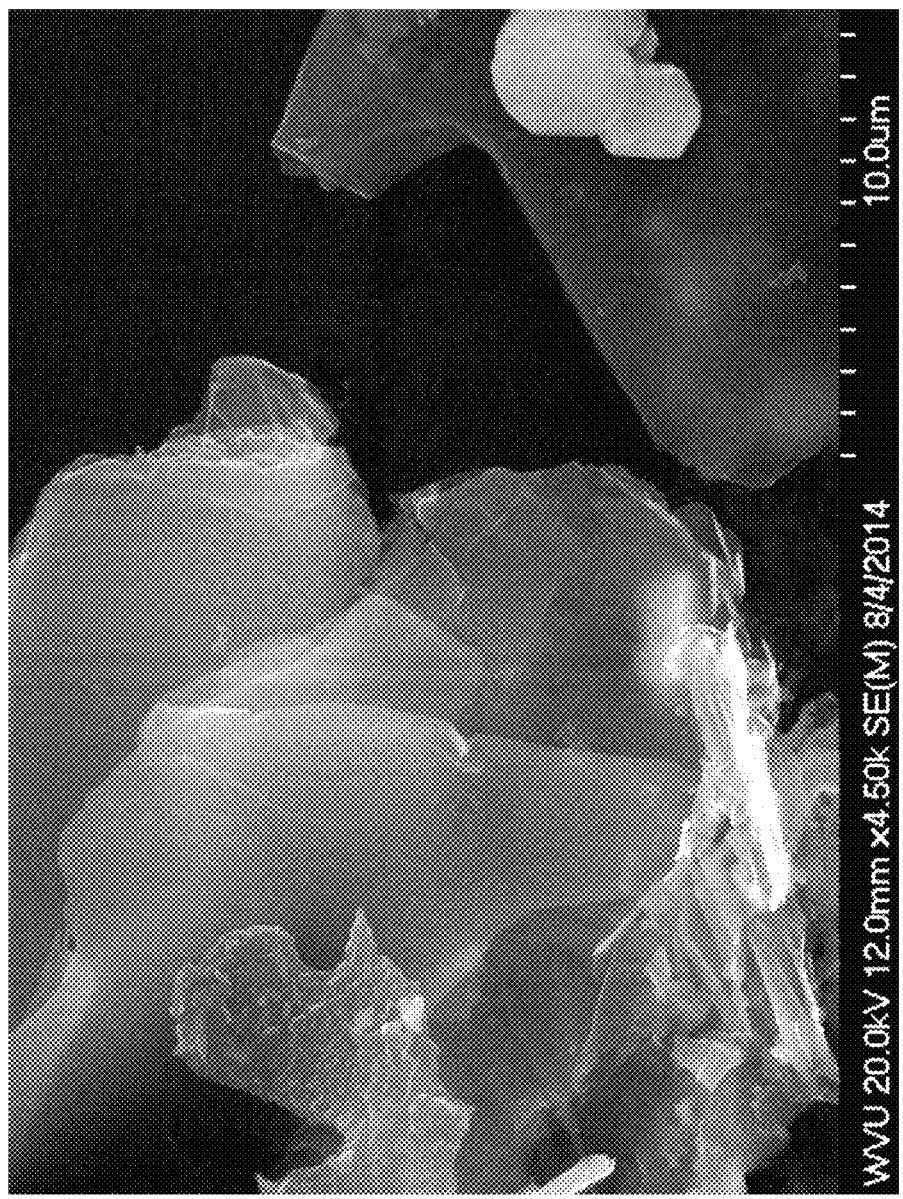
FIG. 68 shows SEM data for the elemental carbon material prepared in Example 11 (scale bar, 10 microns).

FIG. 68 is an SEM image of the bulk sample produced from Example 8. It appears that a high percentage of the material produced was amorphous carbon with a smaller percentage of crystalline carbon like the thermal reactions (U.S. application Ser. No. 14/213,533 and PCT Application PCT/US2014/028755). It did appear that a slightly larger amount of the material was crystalline as opposed to amorphous as produced in the thermal reactions. However, this is unclear because the aluminum carbide was in the form of −325 mesh powder.

Figure 69:
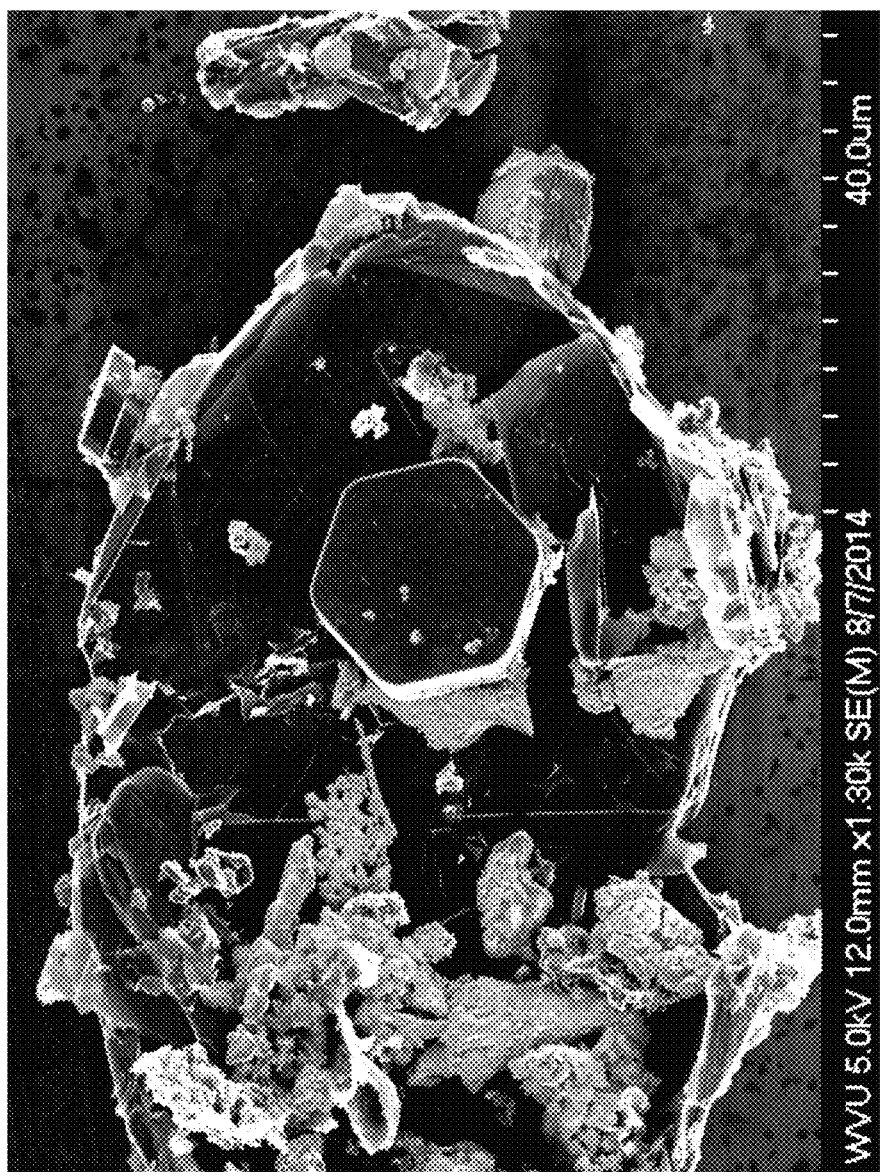
FIG. 69 shows SEM data for the elemental carbon material prepared in Example 11 (scale bar, 40 microns).

FIG. 69 is an image of the crystalline material produced in Example 8. The two things of note are the piece of curved two dimensional material and the shape, structure, and overall appearance of the other piece of elemental carbon. This SEM images unique in that two pieces of elemental carbon with characteristics that have not yet been observed are seen side by side.

Figure 70:
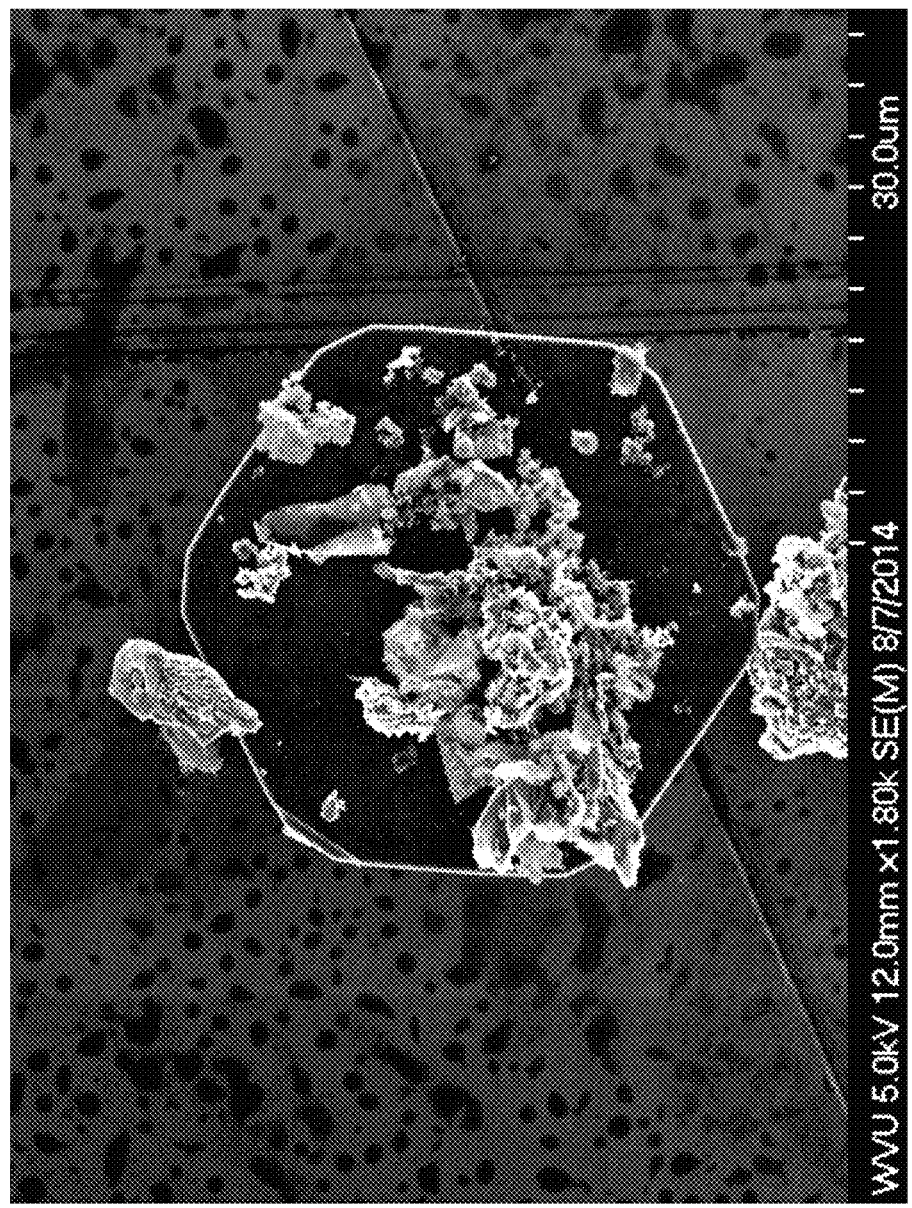
FIG. 70 shows SEM data for the elemental carbon material prepared in Example 11 (scale bar, 30 microns).

FIG. 70 is the Raman spectra of the products produced by Example 8. This picture shows evidence of the standard sp2 carbon peaks. Also, towards the left side of the spectrum, there are additional peaks that are not well defined. These peaks may indicate additional forms of carbon, but could also be contaminants or undesired products of reaction that were not removed and the separation and purification operations or simply contaminates in the carbide. The separation and purification operations were difficult in this experiment due to the small particle size of the calcium carbide used as a reactant.

Example 9

The main objective for Example 9 was to perform an experiment where the standard carbide cell including calcium carbide immersed in a solution of ethanol and calcium chloride was reacted with a cathode of elemental tin immersed in a solution of ethanol and stannous chloride. The second objective of this experiment was to apply a forced external voltage to this reaction system using the potentiostat.

The same apparatus and procedure was used for Example 9 as was used in Example 8 with three differences. The first difference is that the elemental zinc cathode immersed in a solution of ethanol and zinc chloride was replaced with an elemental tin cathode immersed in a solution of ethanol and stannous chloride. The second was that Example 9 used calcium carbide instead of aluminum carbide. The third was in the platinum carbide holder used as part of the anode in the particle size of the carbide. The carbide holder was altered simply by removing the solid crucible from the mesh basket. The mesh basket includes a mesh open top cylinder roughly ¾ of an inch in diameter and 2 inches high. One solid piece of calcium carbide roughly 2 cm was placed inside the holder.

The reaction that is expected to occur is:

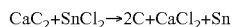

$CaC_2 + SnCl_2 \rightarrow 2C + CaCl_2 + Sn$

In this reaction, $Sn^{+2}$ is reduced to elemental zinc. The carbide anion is oxidized to elemental carbon. The standard reduction potential of either half-cell is not known in ethanol. It has been observed that this reaction occurs spontaneously at room temperature. $CaCl_2$ was added to the aluminum cell to provide conductivity and available chloride anions.

A forced external voltage of 1.0 V was applied. Initially, a current of 5100 uA was measured. The current steadily increases from this value. All of the excess $ZnCl_2$ dissolved or was consumed within a few minutes. This current stayed constant for approximately 5 hours, then steadily rose to 8000 uA.

At the conclusion of the reaction, the products of the calcium cell were filtered on a silver membrane filter, then treated with HCl. The product appears to be a black powder.

Figure 61:
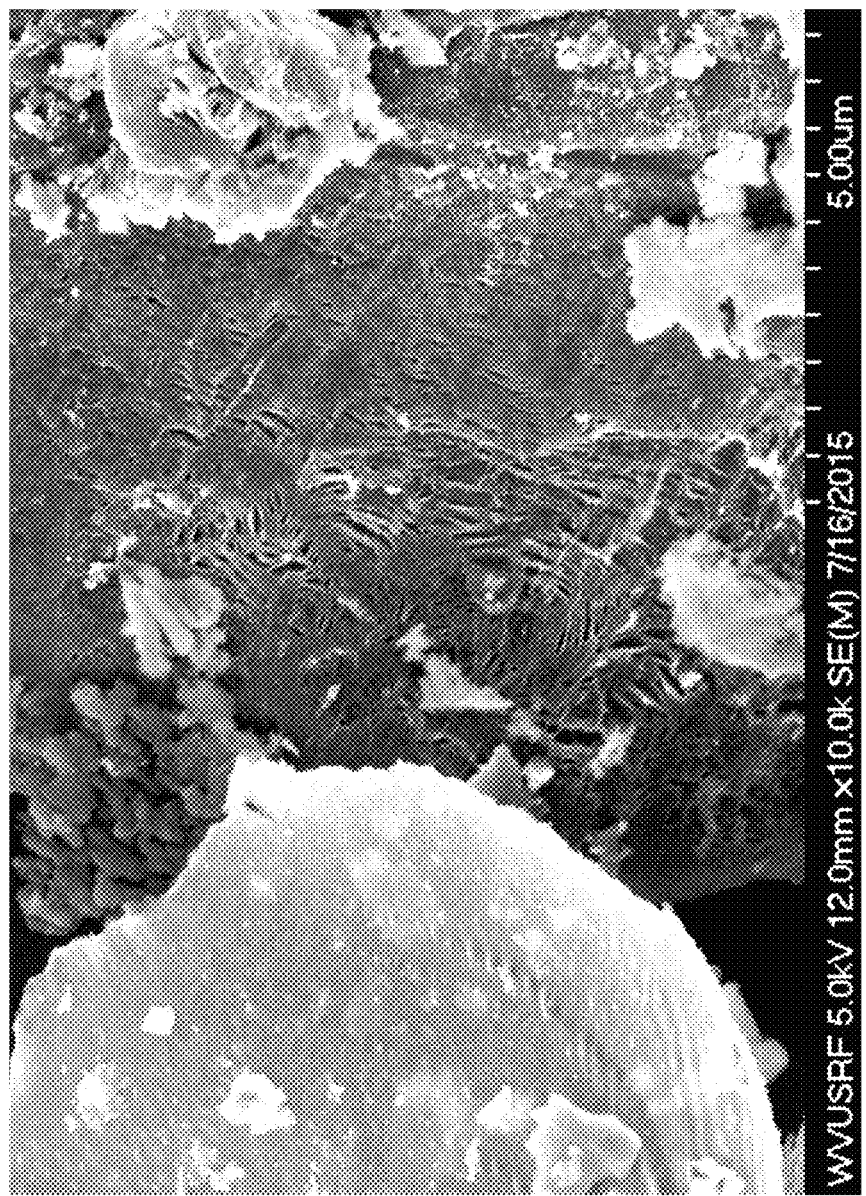
FIG. 61 shows SEM data for the elemental carbon material prepared in Example 9 (scale bar, 5 microns).

FIG. 61 shows an SEM image of elemental carbon produced in Example 9. The carbon appears to have a stacked nature similar to that of the hexagonal shapes sheets. However it is different in that it is not consistent and seems to be "bunched up".

Figure 62:
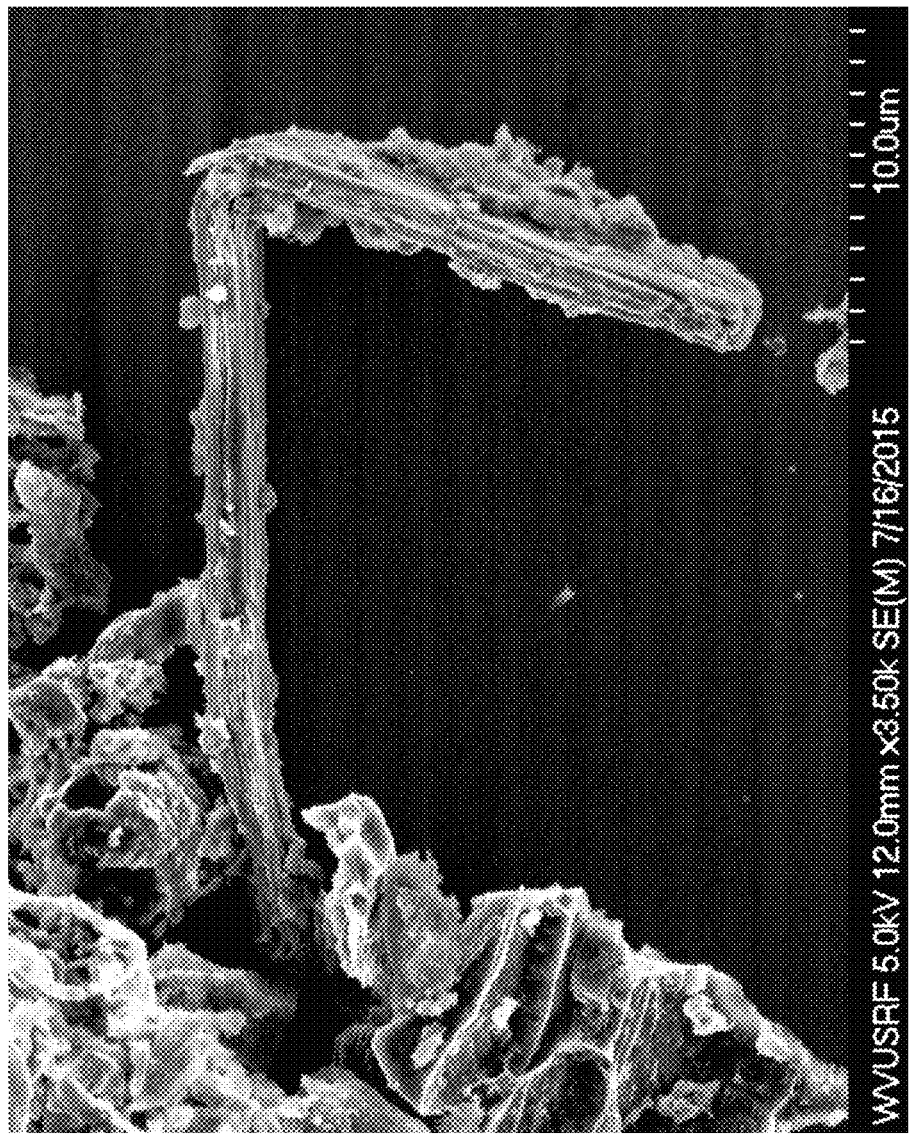
FIG. 62 shows SEM data for the elemental carbon material prepared in Example 9 (scale bar, 10 microns).

FIG. 62 shows an SEM image of the carbon bent at an acute angle. This is a unique image in that it shows the material on edge. In this orientation, you can clearly see the nature of the angle of the material.

Figure 63:
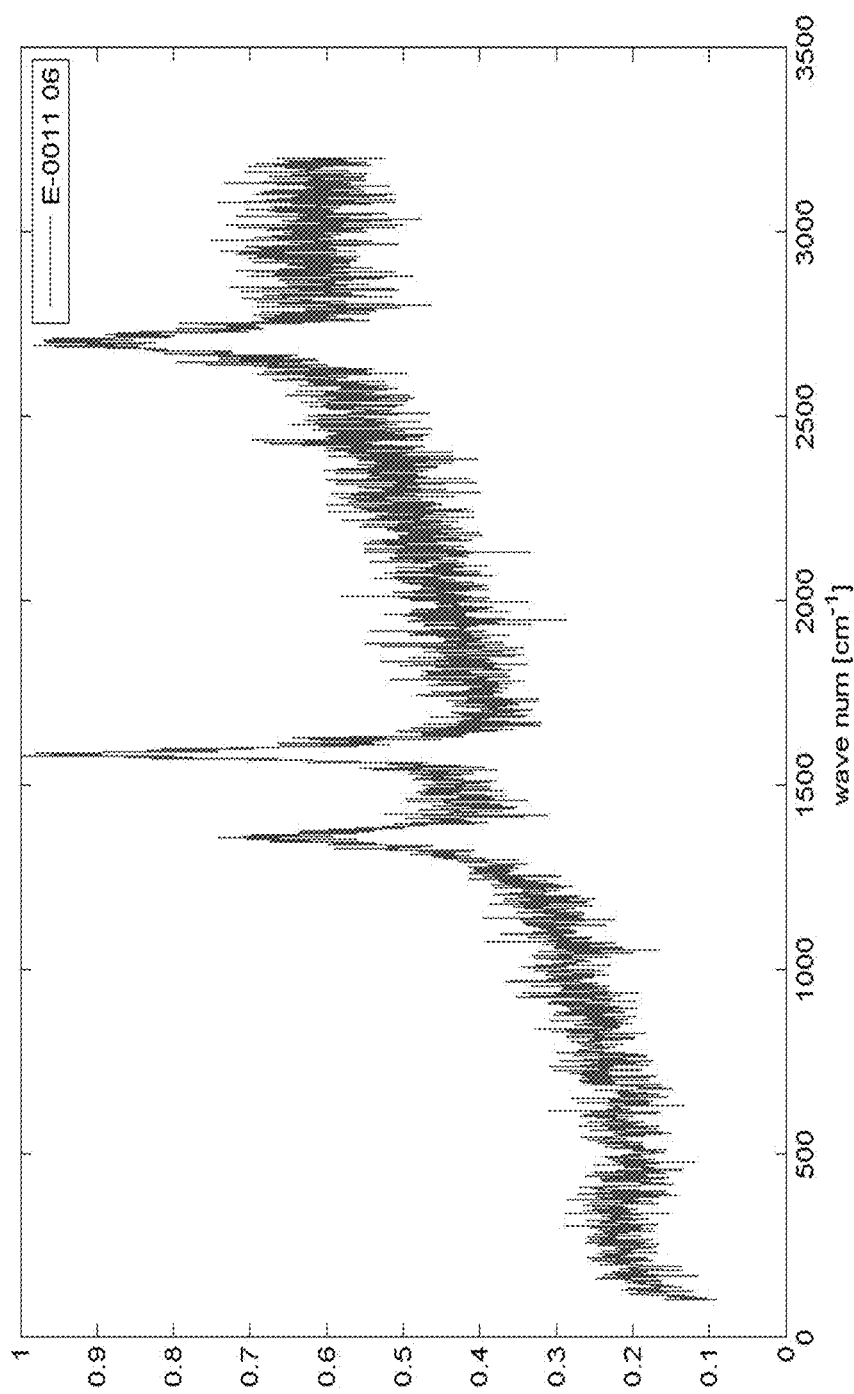
FIG. 63 shows Raman spectral data for elemental carbon material prepared in Example 9.

FIG. 63 represents the Raman spectra for the material produced in Example 9.

Example 10

Example 10 represents an experiment performed using an updated design of a newly fabricated small bench scale glass reaction apparatus. The new reactor can be seen in FIG. 18. There were several improvements and changes made to the new reactor. The main purpose for the new reactor design was to accommodate an ion exchange membrane used in place of the glass fritted filter from the reactor in FIG. 17. The ion exchange membrane not only prevents solid materials from migrating between the cells, it does not permit mass transfer at all. It is also selective with respect to charge of the ions that are capable of passing through the membrane. For instance, one membrane will permit cations from passing through and not permit anions from passing. Another membrane will permit and ions and resist cations from passing through.

Since the ion exchange membrane will need to be replaced whereas the glass fritted filter did not, the reactor was designed as two pieces connected with a clamp and sealed together with an O-ring gasket and vacuum grease. This connection was made in the salt bridge where the ion exchange membrane can be replaced and altered between experiments. Also in the salt bridge was a larger stopcock to accommodate the larger diameter of the salt bridge and permit greater migration of ions from one cell to the other. A further design change of the new reactor is that the diameter of the two cells was increased several centimeters to facilitate better agitation from the stirring bar and accommodate a wider range of anodes and cathodes for future testing.

The final change of the reactor design was to add additional ports to each cell on the opposite side of the connection to the salt bridge. These ports enter the cell at a 45° angle and can be sealed using a glass plug due to the glass ground joint. These ports are to accommodate reference electrodes or to allow access to the cell or any future reactions.

The reaction performed was the standard $Zn/ZnCl_2 \| CaC_2/CaCl_2$ was set up using saturated salts on both sides in dry ethanol. The zinc is in the form of a zinc rod. The zinc rod was submerged into saturated zinc chloride in ethanol along with a Ag/AgCl reference electrode. $CaC_2$ is available as a single large piece (about 2 cm). It was placed in a platinum crucible that was placed in the platinum cage. The cage is used to provide support for the crucible. The cage and crucible were submerged in a solution of $CaCl_2$ in ethanol. The potentiostat was hooked up with the data acquisition system. A voltage of 1.0 V was applied.

The reaction that is expected to occur is:

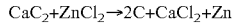

$CaC_2 + ZnCl_2 \rightarrow 2C + CaCl_2 + Zn$

In this reaction, $Zn^{+2}$ is reduced to elemental zinc. The carbide anion is oxidized to elemental carbon. The standard reduction potential of either half-cell is not known in ethanol. It has been observed that this reaction occurs spontaneously at room temperature. $CaCl_2$ was added to the calcium carbide cell to provide conductivity and available chloride anions.

After being allowed to run for four several days, the calcium piece turned opaque white and appeared to form layers. When the piece was placed in acid, some black pieces fell off of the larger white mass, and the white mass appeared to be unaffected by the acid. However, after setting in the acid for 30 minutes, the piece eventually dissolved. Very little black material remained.

By the end of the reaction, the calcium cell was a clear yellow color. The zinc cell was a translucent white. The zinc growth on the rod was considerable, and visible through the solution with a flashlight. The ion exchange membrane gained a brownish color on the calcium side and a black color on the zinc side. The black color, however, was not present at the point of liquid contact. It was above the level of the liquid.

Figure 64:
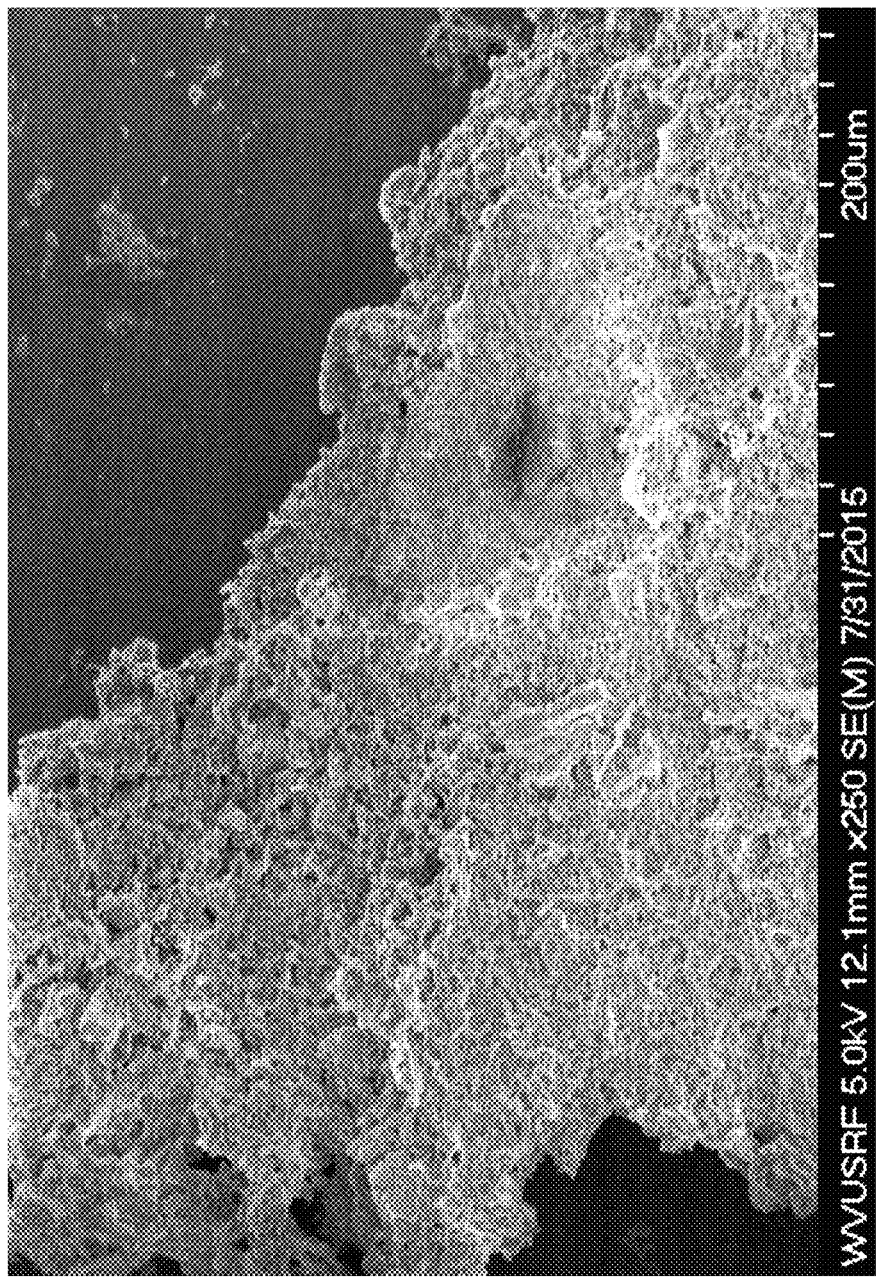
FIG. 64 shows SEM data for the elemental carbon material prepared in Example 10 (scale bar, 200 microns).

FIG. 64 shows an SEM image at a scale of 200 μm of the products of reaction from Example 10 or the first reaction using an exchange membrane with the updated reactor. The material has an appearance similar to that of the amorphous carbon. However, as will be seen in the next several figures, this material appears to be crystalline with an appearance of the surface of the material being "chewed up".

FIG. 65 shows a magnified image of the material seen in FIG. 64 at a scale of 30 μm. This more clearly shows that the material is crystalline elemental carbon and not the amorphous elemental carbon.

Figure 66:
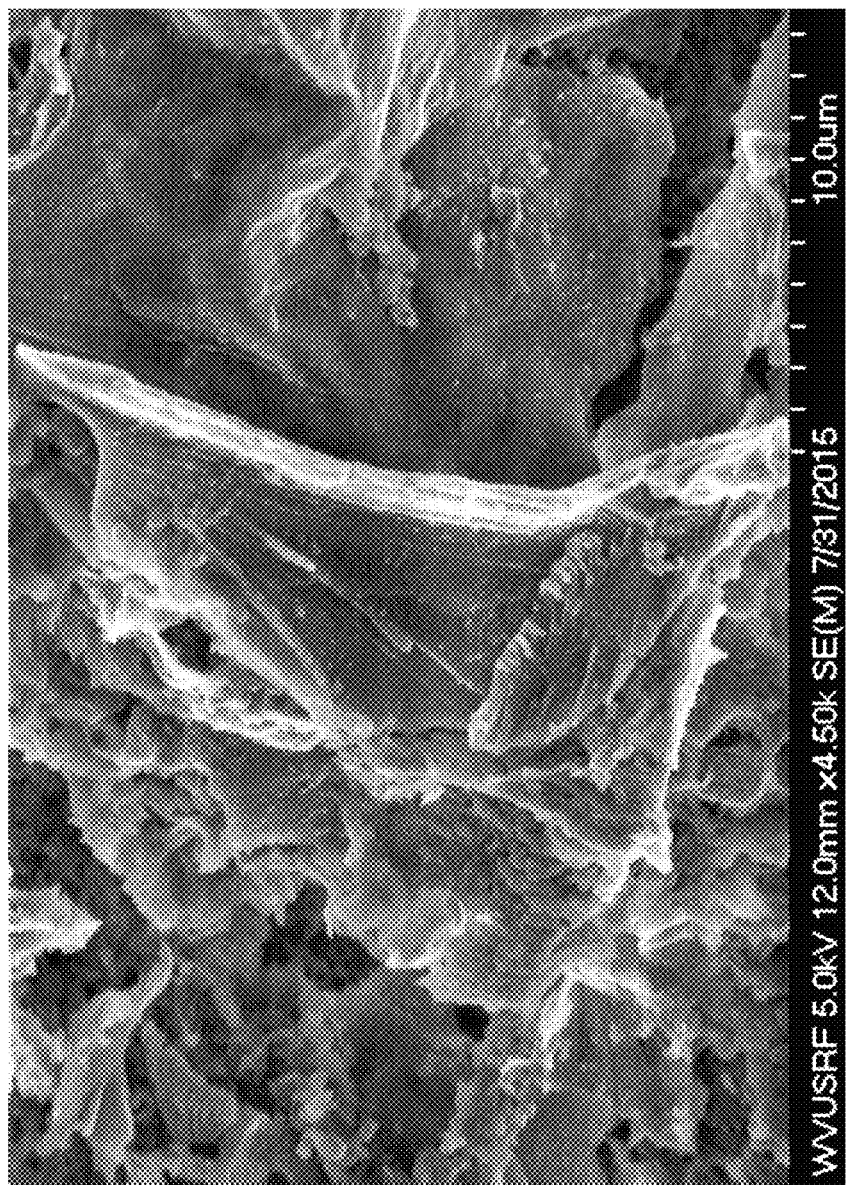
FIG. 66 shows SEM data for the elemental carbon material prepared in Example 10 (scale bar, 10 microns).

FIG. 66 shows an even more magnified image of the material seen in FIGS. 65 and 66 at a scale of 10 μm. It is clear from this image that the material is crystalline and not the amorphous carbon.

Figure 67:
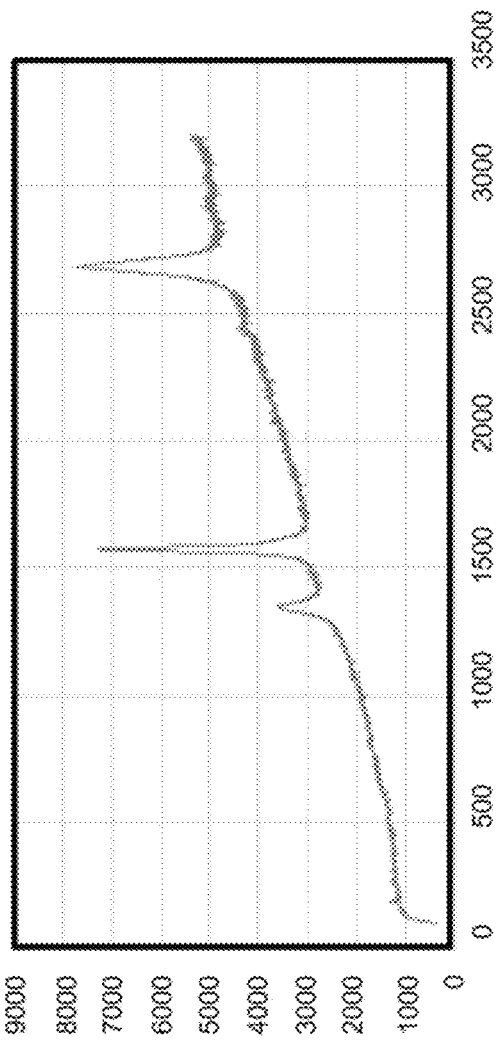
FIG. 67 shows Raman spectra for Example 10.

FIG. 67 shows the Ramen spectra from the analysis of the products of Example 10.

Example 11: Reaction of Calcium Carbide with Zinc Chloride in Methanol

The organic solvent reaction was a relatively simple reaction used to show that the calcium carbide was conductive and would react at room temperature in a solution of a solvent and dissolved metallic salt.

The experiment was prepared in the controlled argon atmosphere of the glove box. 300 mL of dried methanol was placed in a standard 500 mL Erlenmeyer flask. 100 g of zinc chloride was also added to the Erlenmeyer flask. A magnetic stir bar was also placed in the flask and a rubber stopper was fitted to seal it. Calcium carbide was crushed to a coarse particle size of roughly less than 1 cm. The calcium carbide was then added to the flask and the rubber stopper placed on it to seal. The sealed flask now contained 20 g of calcium carbide, 300 mL of dried methanol, 100 g of zinc chloride, and a magnetic stir bar.

The sealed flask was removed from the glove box and placed on a stir plate. The reaction was allowed to proceed for three days. It was then stopped and removed from the stir plate. The flask was opened and the contents subjected to the standard separation and purification operations. There was very little product remaining after the cleaning and separation procedure. This was expected due to the conductivity of calcium carbide and the expected low rate of reaction. There was enough material to be analyzed under the SEM and with Ramen spectroscopy.

FIG. 68 shows an image of an elemental carbon material that appears to be two dimensional and very thin. This is evident from the fact that the electron beam can "see" through the material.

FIG. 69 shows a very consistent stack of elemental carbon hexagonal sheets with a cross-sectional area of roughly 20 cm. This hexagonal stack is sitting on top of a larger piece of what appears to be stacked two dimensional elemental carbon.

FIG. 70 shows a second well-defined stack of hexagonal sheets of two-dimensional carbon. This image, along with FIG. 69, shows that this reaction is possible at room temperature and atmospheric pressure.

Figure 71:
FIG. 71 shows Raman spectral data for elemental carbon material prepared in Example 11.

FIG. 71 shows the Raman analysis from a sample of the products of Example 11. This further shows that it is possible to produce elemental carbon at room temperature via this reaction technology.

Example 12

Example 12 describes small particle size graphene exfoliation in the ultrasonic bath with a low sonication energy.

A small portion (about 0.1 g) of the cleaned products were placed in glass centrifuge tubes which were then filled with NMP. The centrifuge tube was then immersed a lower power ultrasonic bath (Cole-Parmer Model: 8854). The graphene in NMP was sonicated for four hours and then removed from the bath.

The tubes were then centrifuged and examined. The NMP in the tubes with the smaller particle size sample had exfoliated graphene that remained in solution.

INSTRUMENTATION: The following instruments were used for the working examples: Hitachi S-4700 Scanning Electron Microscope and a Renishaw InVia Raman Microscope.

What is claimed is:

1. An apparatus comprising at least one electrochemical cell comprising:
   at least one anode comprising at least one carbide chemical compound, and
   at least one cathode,
   wherein the electrochemical cell apparatus is a galvanic cell apparatus and is capable of producing an elemental carbon material, and
   wherein the carbide chemical compound is a salt-like carbide, an aluminum carbide, or a beryllium carbide.

2. The apparatus of claim 1, wherein the carbide chemical compound has an electronic conductivity of at least $10^{-8}$ S/cm.

3. The apparatus of claim 1, wherein the carbide chemical compound is in the form of individual pieces or particles.

4. The apparatus of claim 1, wherein the carbide chemical compound is in the form of individual pieces or particles having a size of less than one cm.

5. The apparatus of claim 1, wherein the carbide chemical compound contacts at least one electrically conductive material.

6. The apparatus of claim 1, wherein the carbide chemical compound is held in an electrically conductive container.

7. The apparatus of claim 1, wherein the electrochemical cell apparatus cathode is a metal cathode.

8. The apparatus of claim 1, wherein the electrochemical cell apparatus comprises at least one salt bridge or at least one ion exchange membrane.

9. The apparatus of claim 1, wherein the electrochemical cell apparatus comprises an external voltage source to regulate an oxidation reaction of carbide in the carbide chemical compound.

10. The apparatus of claim 1, wherein the apparatus further comprises at least one solution comprising at least one solvent and at least one dissolved salt, and the solution is free of dissolved carbide chemical compound.

11. The apparatus of claim 1, wherein the anode comprises at least one electronically conductive structural element different from the carbide chemical compound and contacting the at least one carbide chemical compound.

12. The apparatus of claim 11, wherein the carbide chemical compound is methanide, acetylide, or sesquicarbide.

13. The apparatus of claim 11, wherein the carbide chemical compound is calcium carbide, aluminum carbide, sodium carbide, magnesium carbide, lithium carbide, or beryllium carbide.

14. The apparatus of claim 11, wherein the carbide chemical compound is in the form of individual pieces or particles having a size of less than one cm.

15. The apparatus of claim 11, wherein the carbide chemical compound is in the form of individual pieces or particles having a size of at least one micron.

16. The apparatus of claim 11, wherein the carbide chemical compound is divided into separate portions which are each contacted with at least one electrically conductive structural element.

17. The apparatus of claim 11, wherein the carbide chemical compound is at least about 95% pure.

18. The apparatus of claim 11, wherein the electronically conductive structural element is a binder for the carbide chemical compound.

19. The apparatus of claim 11, wherein the electronically conductive structural element is a container and the carbide chemical compound is held in the container.

20. The apparatus of claim 11, wherein the electronically conductive structural element is a container and the carbide chemical compound is held in the container, and the container has openings which allow fluid to enter the container and contact the carbide chemical compound.

21. The apparatus of claim 11, wherein the electronically conductive structural element is a metallic container and the carbide chemical compound is held in the metallic container.

22. The apparatus of claim 11, wherein the electronically conductive structural element comprises at least one conductive rod.

23. The apparatus of claim 11, wherein the electronically conductive structural element of the electrode structure comprises at least one current collector.

24. The apparatus of claim 11, wherein the electrode structure is adapted for use as an anode in an electrochemical cell apparatus for production of the elemental carbon material.

25. The apparatus of claim 11, wherein the electrode structure is adapted for use as an anode in a galvanic cell apparatus for production of the elemental carbon material.

26. The apparatus of claim 11, wherein the carbide chemical compound has an electronic conductivity of at least $10^{-8}$ S/cm.

27. The apparatus of claim 11, wherein the carbide chemical compound is in the form of individual pieces or particles.

28. The apparatus of claim 1, wherein each of the at least one anode and the at least one cathode is contacted with a solution comprising at least one organic solvent and at least one dissolved salt.

29. An apparatus comprising at least one electrochemical cell comprising:
at least one anode comprising at least one carbide chemical compound, and
at least one cathode,
wherein the electrochemical cell apparatus is a galvanic cell apparatus and is capable of producing an elemental carbon material, and
wherein the carbide chemical compound is in the form of individual pieces or particles having a size of less than one cm.

30. The apparatus of claim 29, wherein the carbide chemical compound is a salt-like carbide or an intermediate transition metal carbide.

31. The apparatus of claim 29, wherein the carbide chemical compound is a salt-like carbide.

32. The apparatus of claim 29, wherein the carbide chemical compound is calcium carbide or aluminum carbide.

33. The apparatus of claim 29, wherein the carbide chemical compound contacts at least one electrically conductive material.

34. The apparatus of claim 29, wherein the electrochemical cell apparatus cathode is a metal cathode.

35. The apparatus of claim 29, wherein the electrochemical cell apparatus comprises at least one salt bridge or at least one ion exchange membrane.

36. The apparatus of claim 29, wherein the electrochemical cell apparatus comprises an external voltage source to regulate an oxidation reaction of carbide in the carbide chemical compound.

37. The apparatus of claim 29, wherein the apparatus further comprises at least one solution comprising at least one solvent and at least one dissolved salt, and the solution is free of dissolved carbide chemical compound.

38. The apparatus of claim 29, wherein the anode comprises at least one electronically conductive structural element different from the carbide chemical compound and contacting the at least one carbide chemical compound.

39. The apparatus of claim 29, wherein each of the at least one anode and the at least one cathode is contacted with a solution comprising at least one organic solvent and at least one dissolved salt.

* * * * *